United States Patent
Kayanuma et al.

[11] Patent Number: 6,124,987
[45] Date of Patent: Sep. 26, 2000

[54] ZOOM LENS

[75] Inventors: Yasunobu Kayanuma; Kazuo Ikari, both of Saitama, Japan

[73] Assignee: Fuji Photo Film Co., Ltd., Kanagawa, Japan

[21] Appl. No.: 09/338,564

[22] Filed: Jun. 23, 1999

[30] Foreign Application Priority Data

Jun. 26, 1998 [JP] Japan .................................. 10-180389

[51] Int. Cl.$^7$ ................................... G02B 15/14
[52] U.S. Cl. ........................ 359/692; 354/691; 354/684; 354/683
[58] Field of Search ..................... 359/684, 691, 359/683, 692

[56] References Cited

U.S. PATENT DOCUMENTS 5,430,576 7/1995 Hamano .................... 359/684
5,530,592 6/1996 Tochigi .................... 359/687
5,818,646 10/1998 Hamano .................... 359/684

FOREIGN PATENT DOCUMENTS 62-76312 5/1987 Japan .

*Primary Examiner*—Scott J. Sugarman
*Assistant Examiner*—Tim Thompson

[57] ABSTRACT

A zoom lens includes a front lens group having a negative power as a whole and a rear lens group having a positive power as a whole, and a stop included therein. For zooming, the front and rear lens groups are moved relative to each other on an optical axis. For focusing, only a rearmost positive lens of the rear lens group is moved. The zoom lens satisfies the following conditions:

$$0.5 < ff/fR < 5.0$$

$$0.01 < \beta f < 1.00$$

$$-1.0 \leq r1/r2 \leq 0.3$$

wherein fR represents a synthetic focal length of the rear lens group, ff represents a focal length of the rearmost positive lens, βf represents an image magnification of the rearmost positive lens, r1 represents a radius of curvature of an object side surface of the rearmost positive lens, and r2 represents a radius of curvature of an image side surface of the rearmost positive lens.

16 Claims, 42 Drawing Sheets

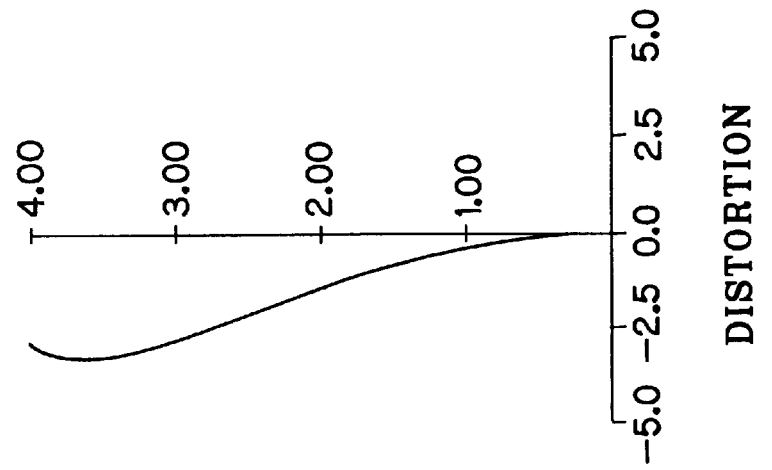
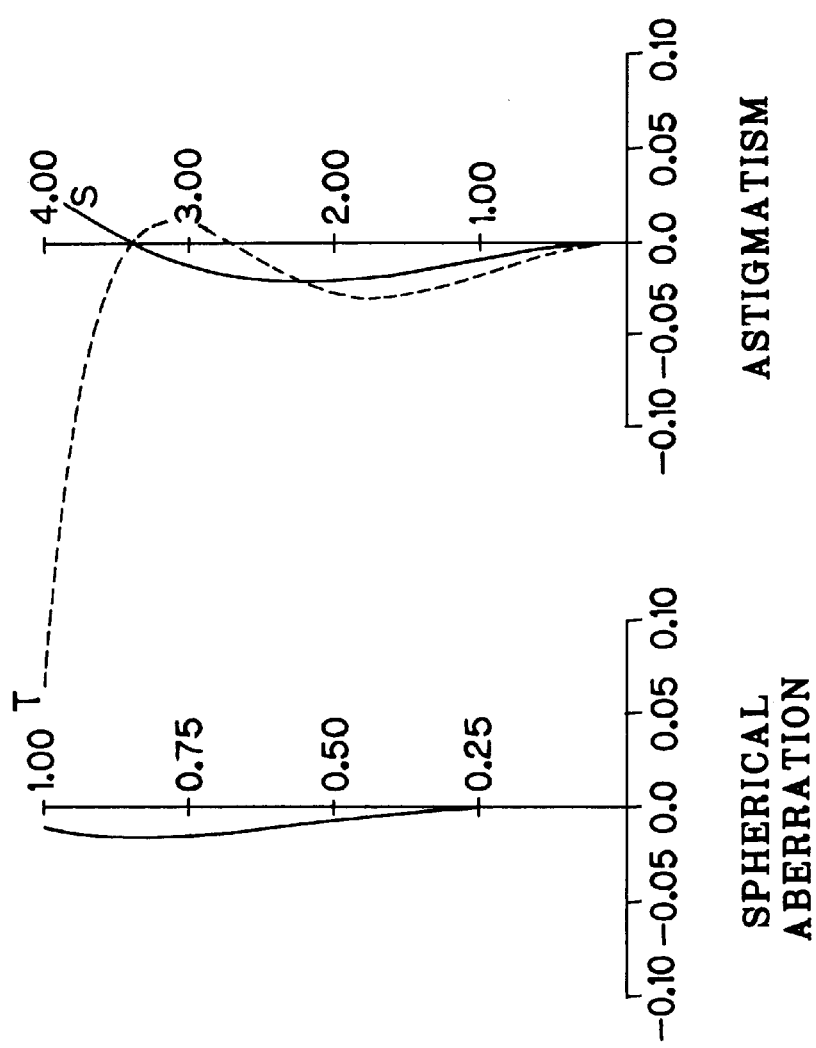

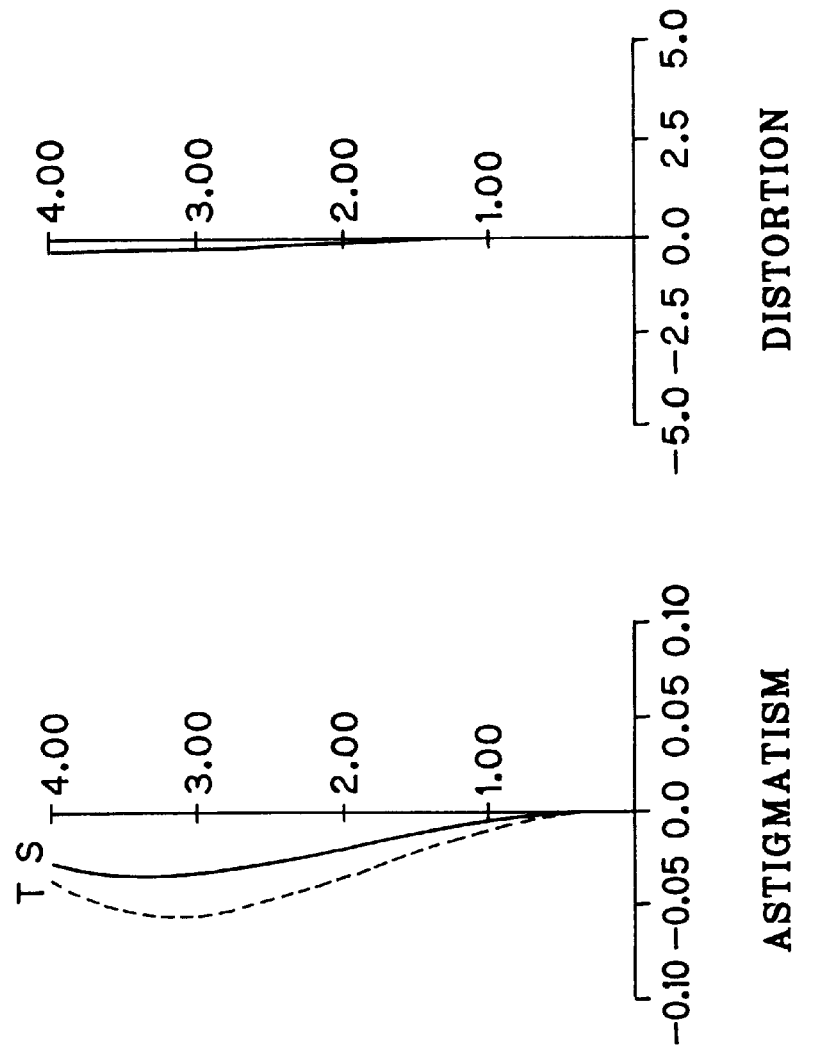
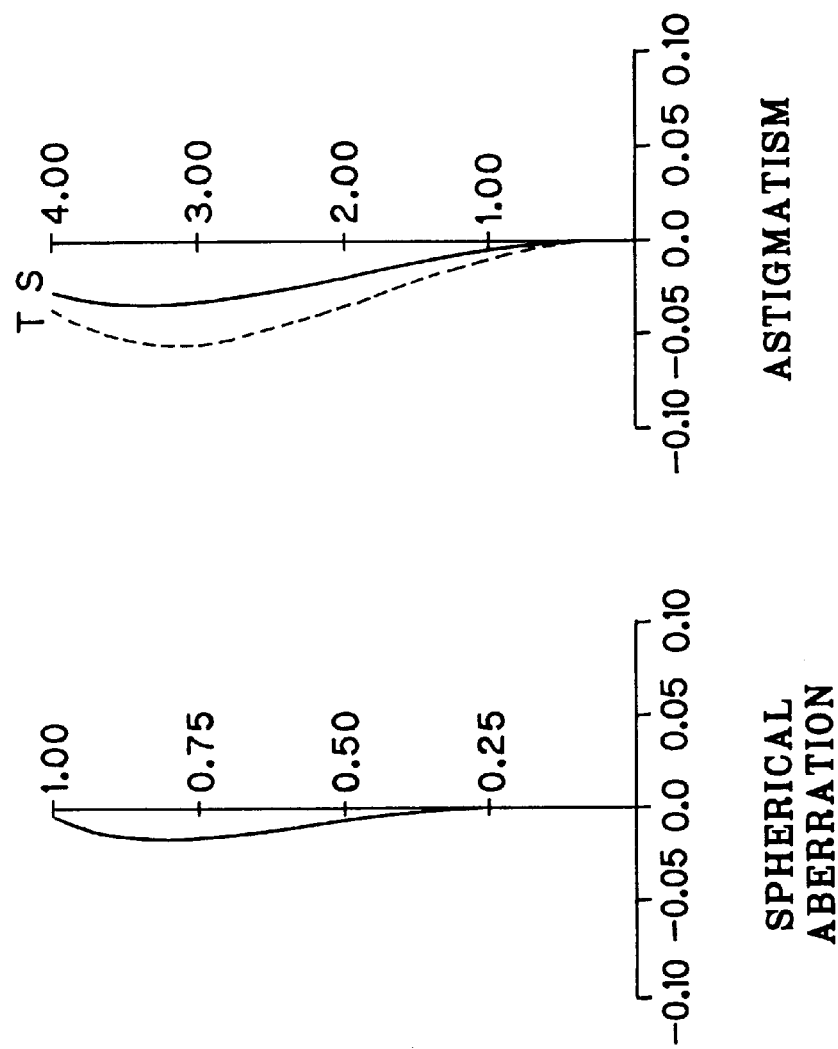

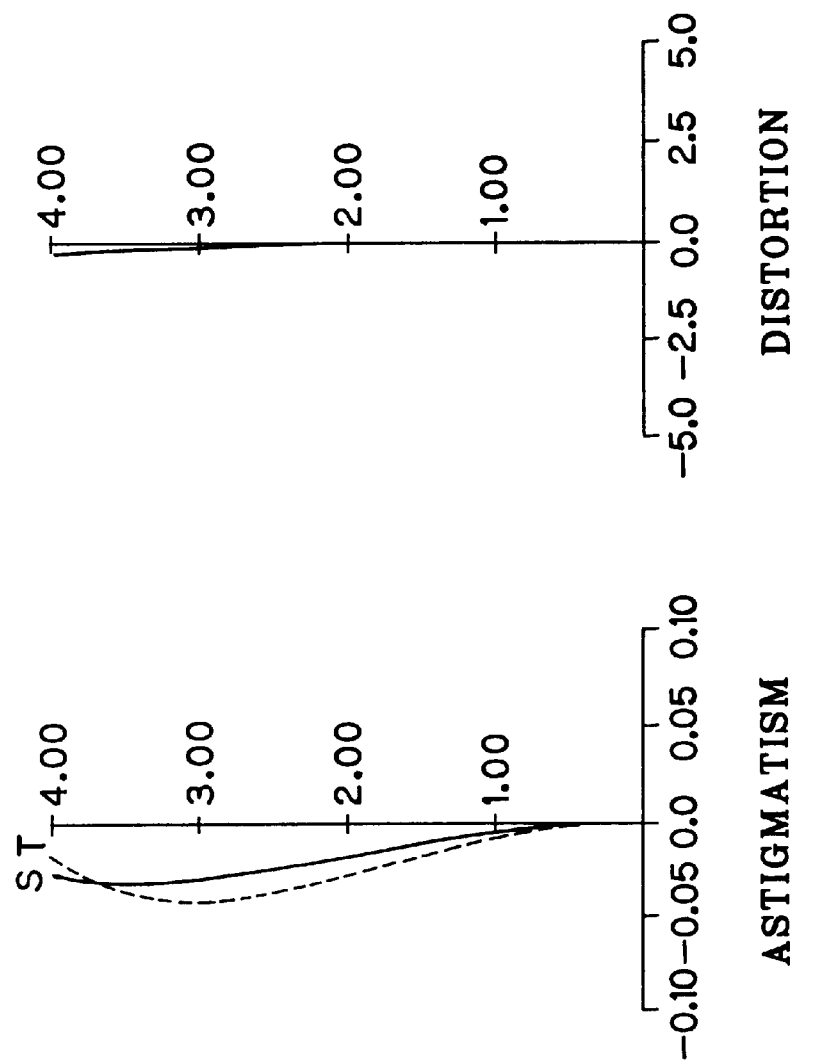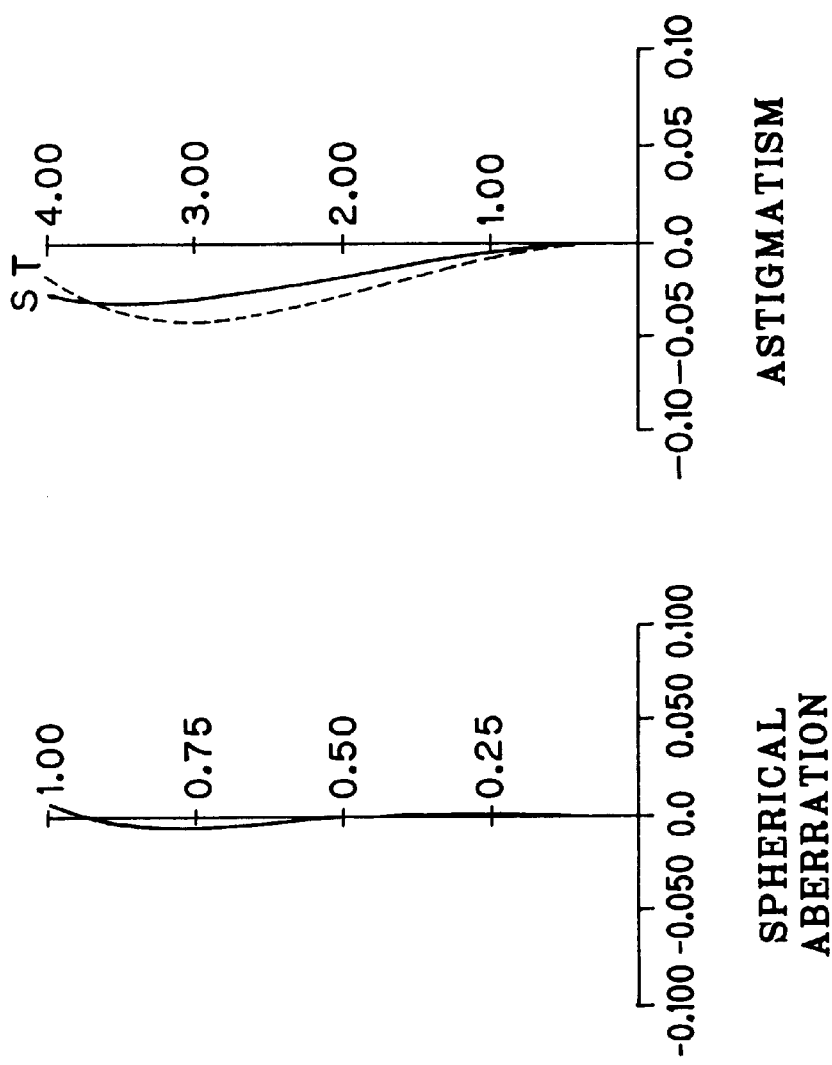

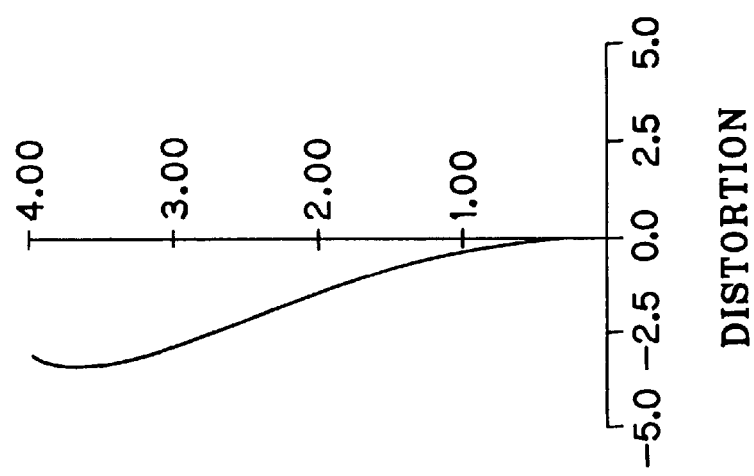
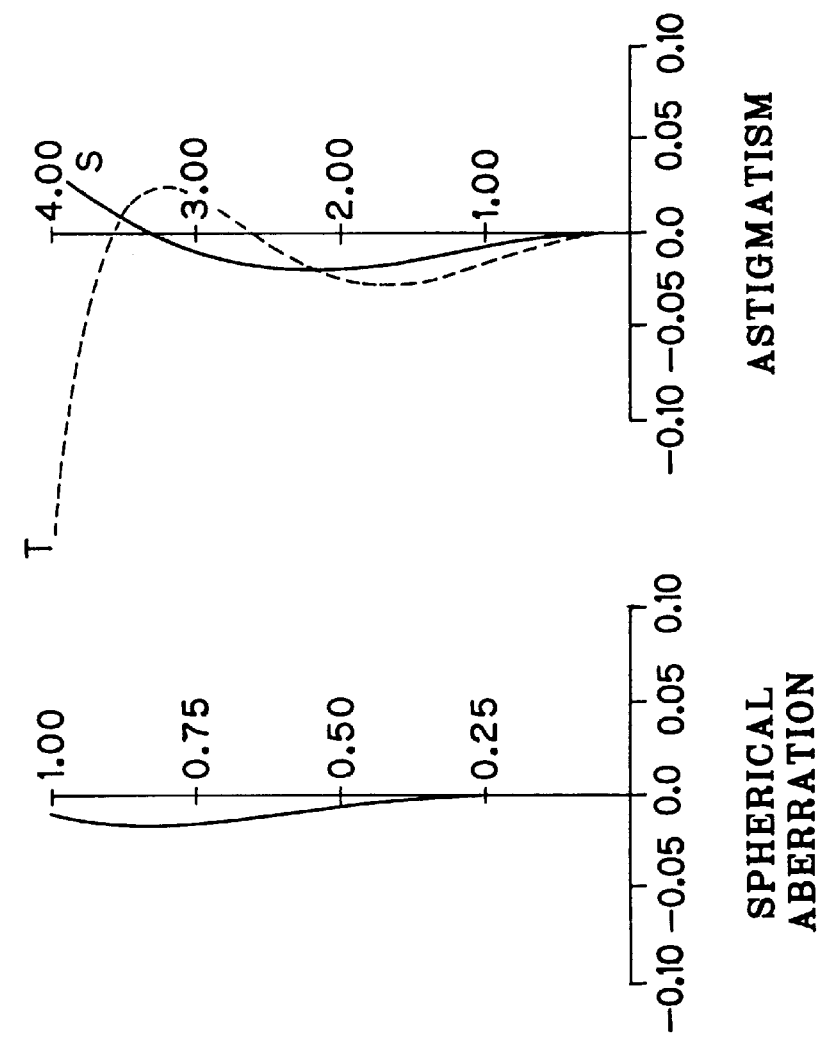

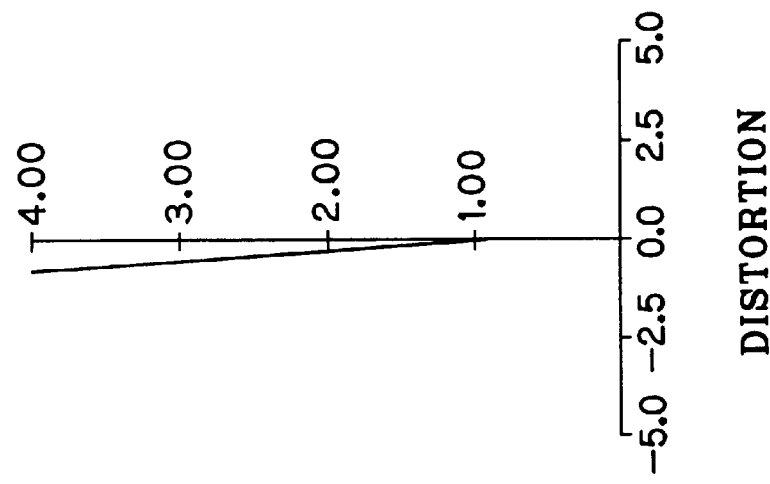
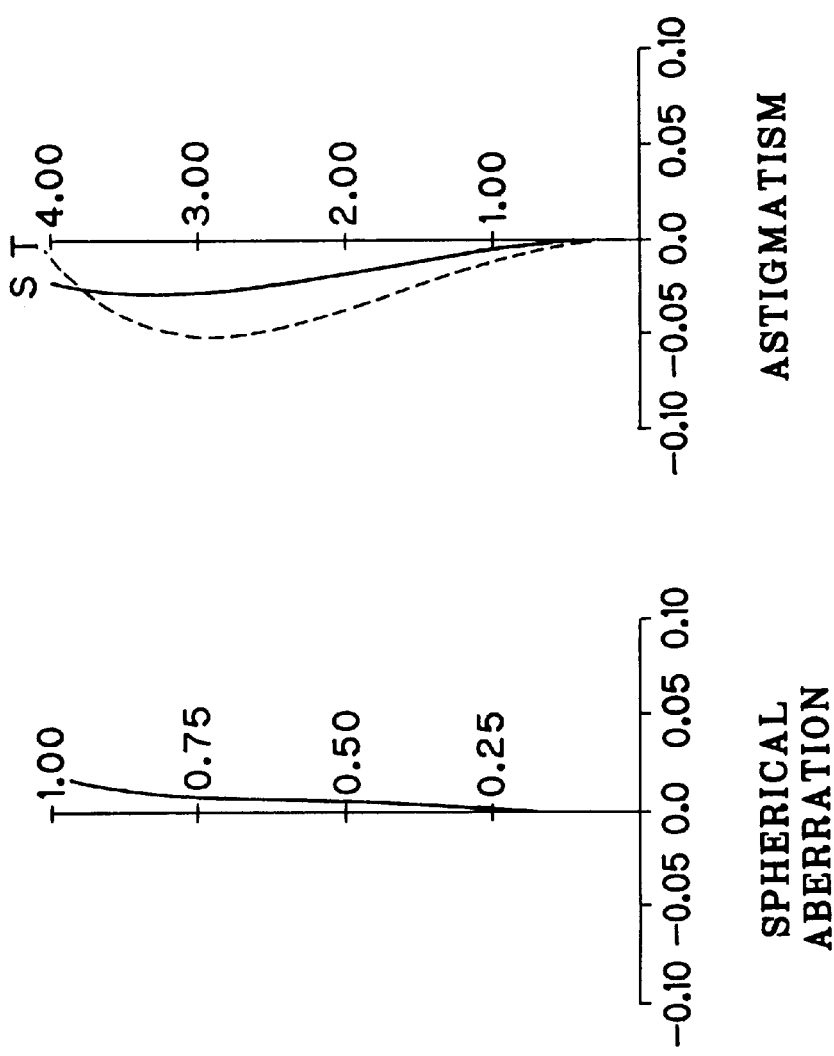

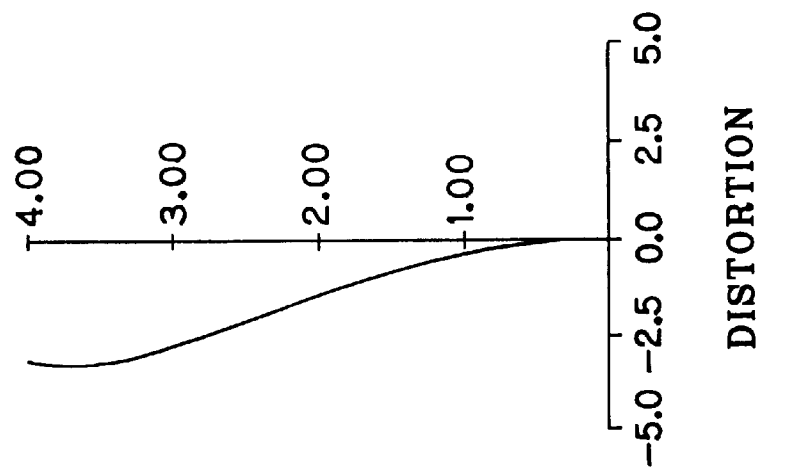
FIG. 12C  FIG. 12B  FIG. 12A
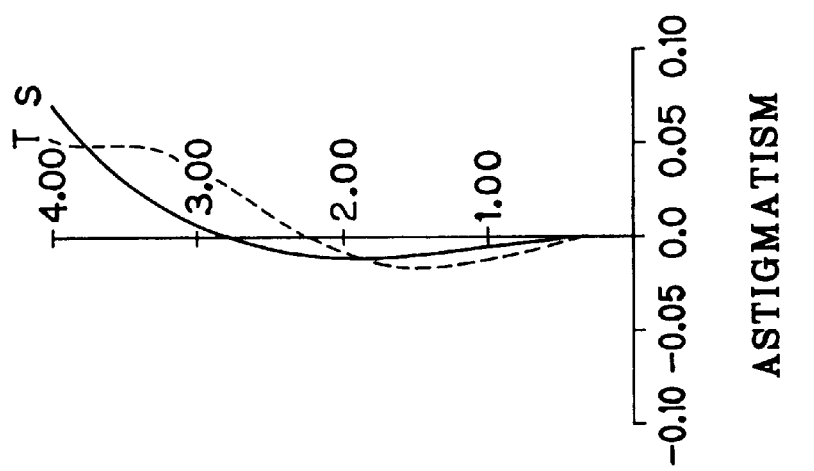
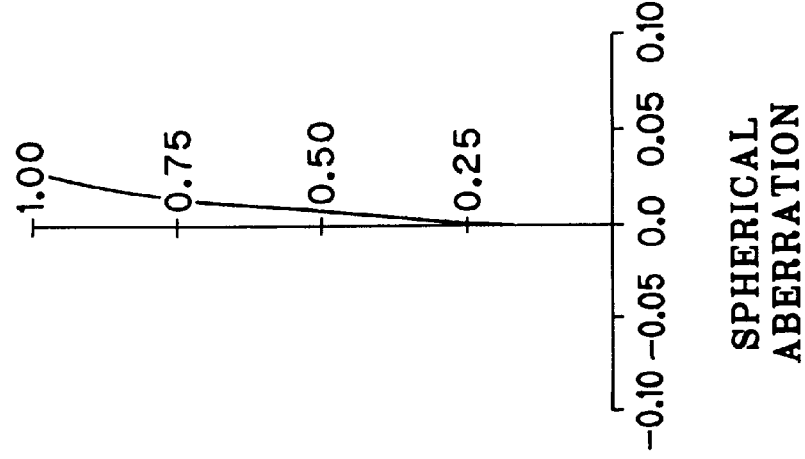

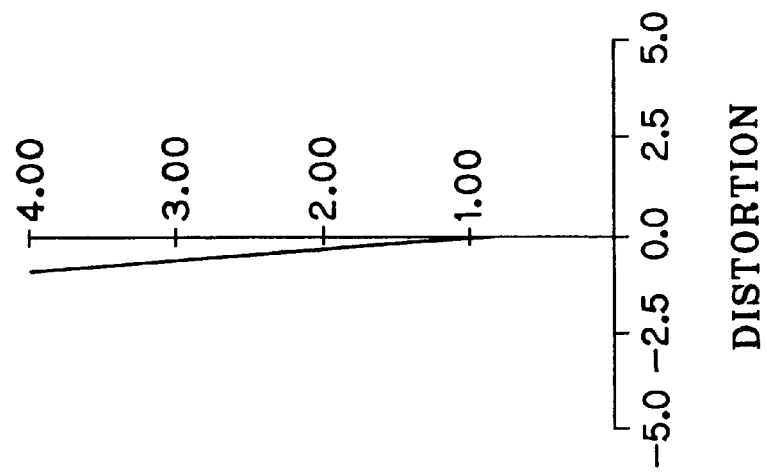
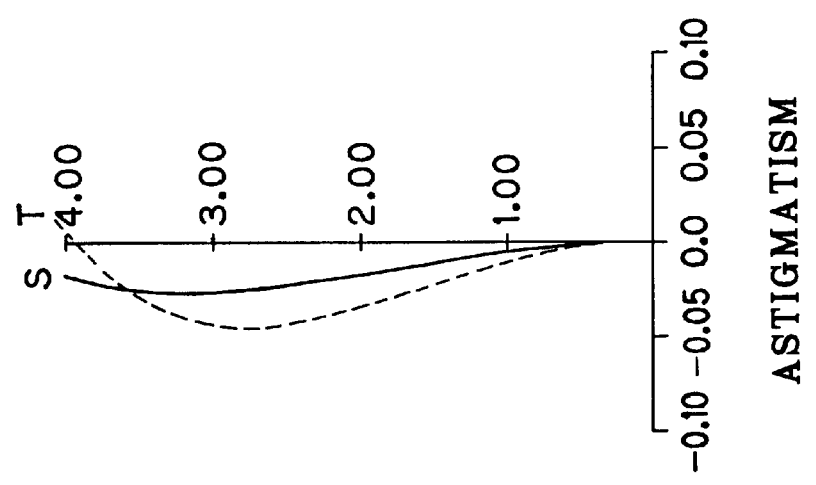
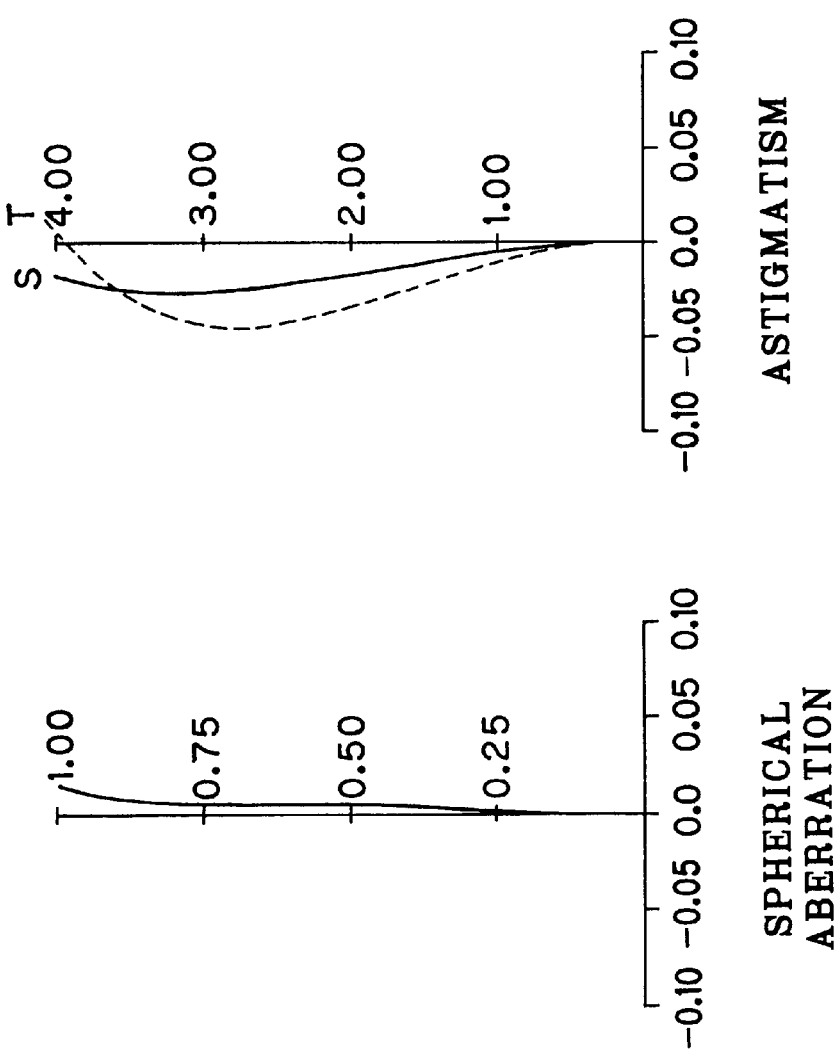

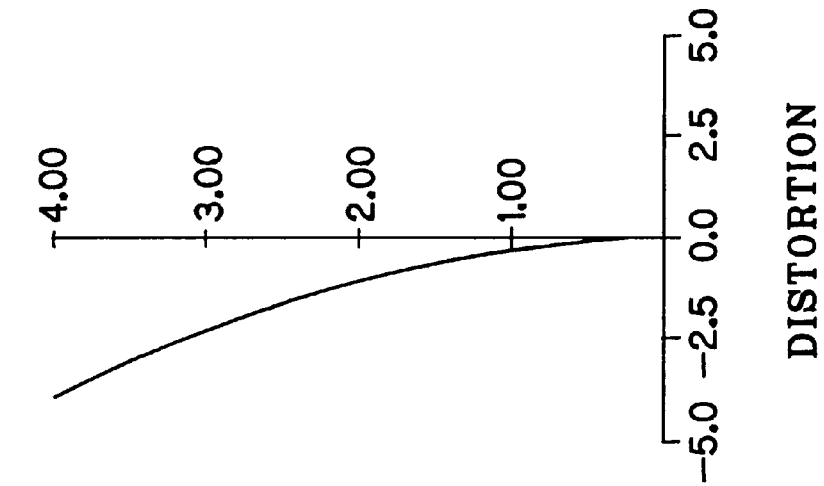
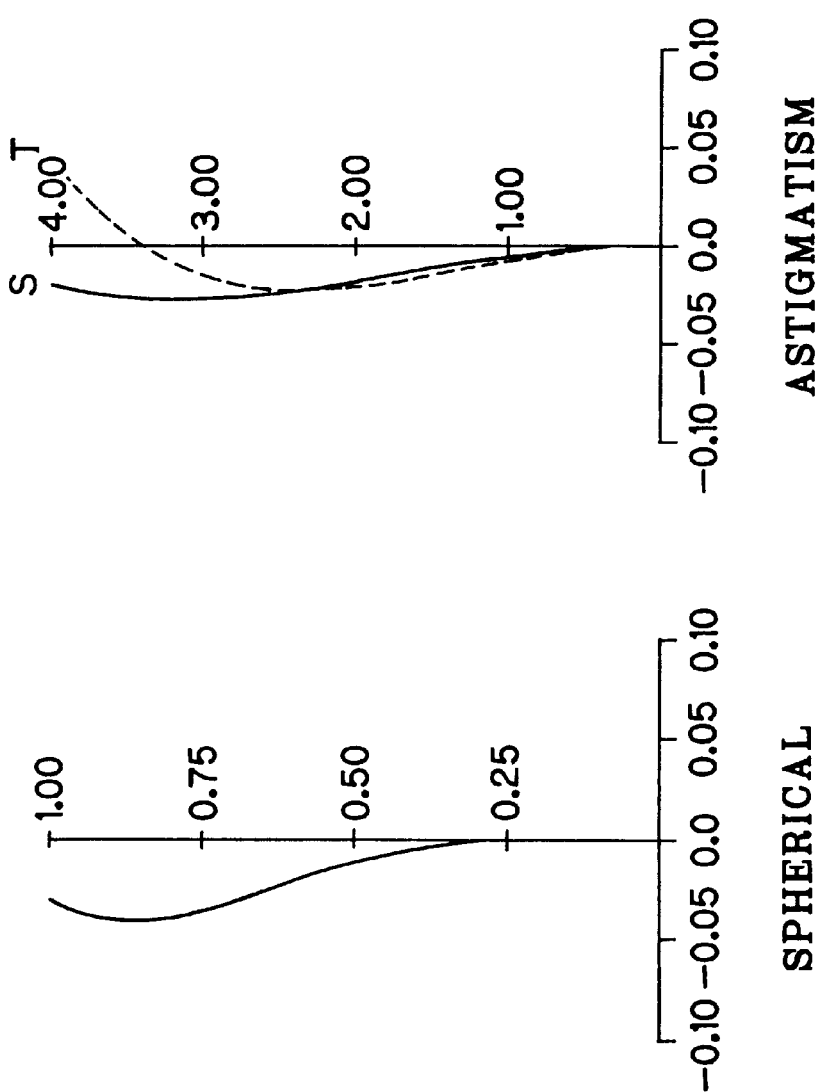

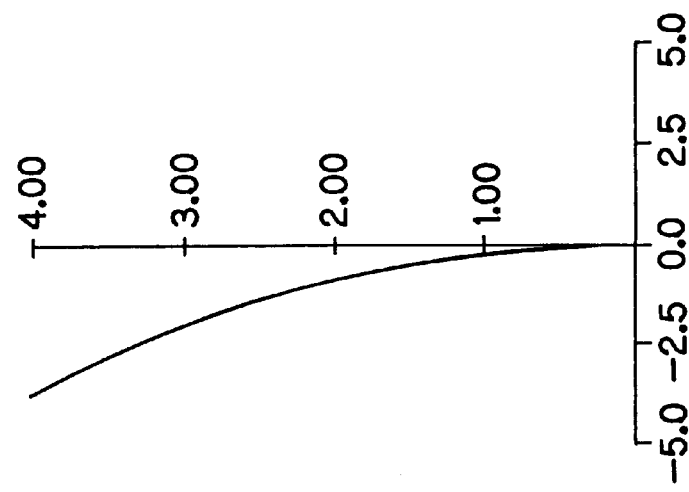
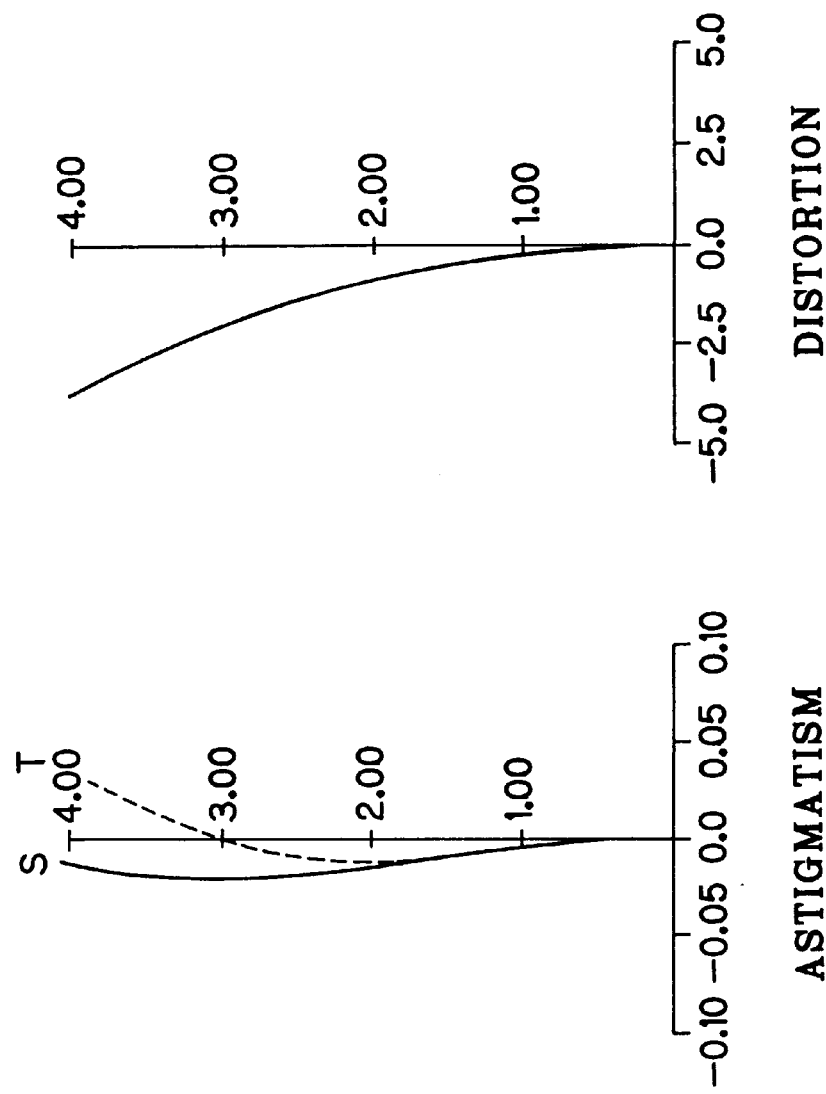
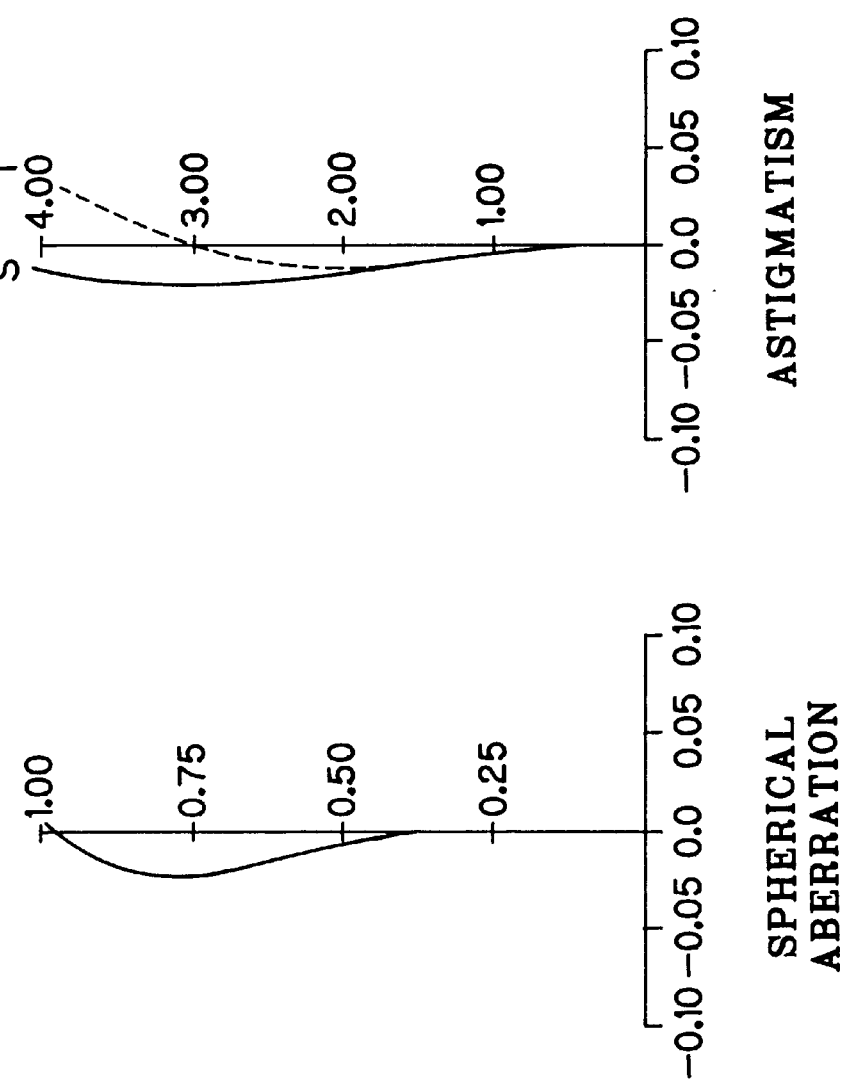

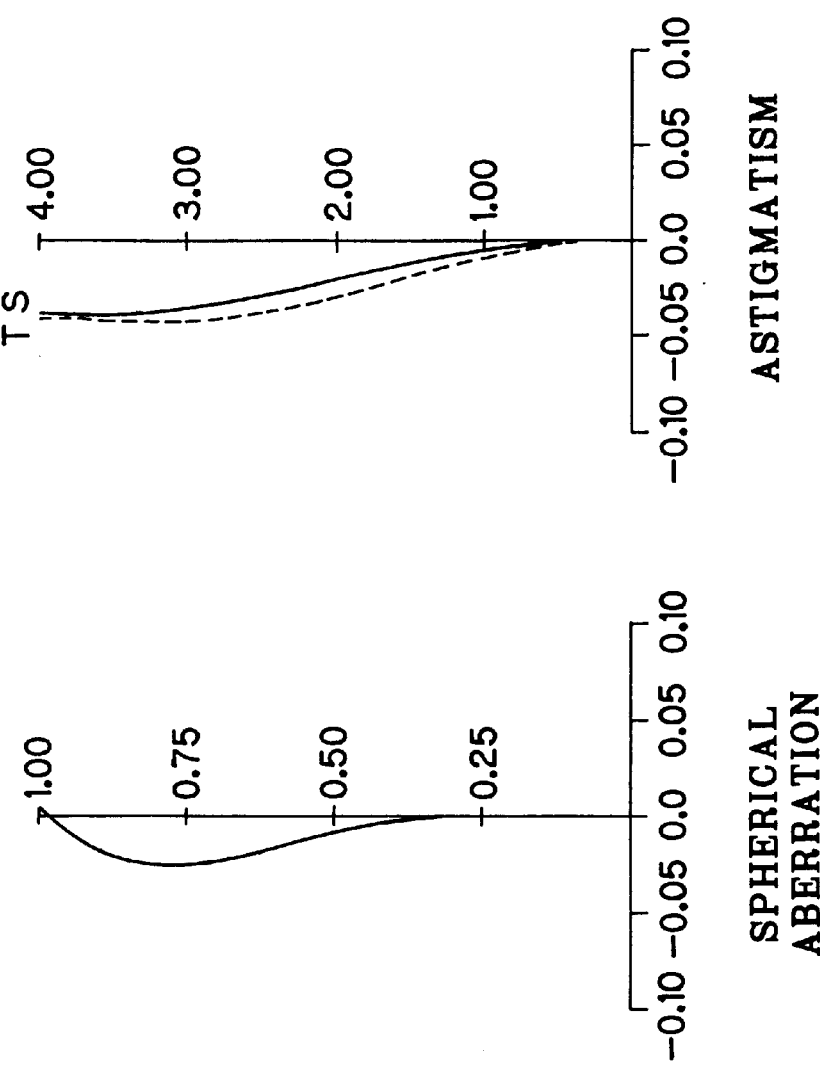

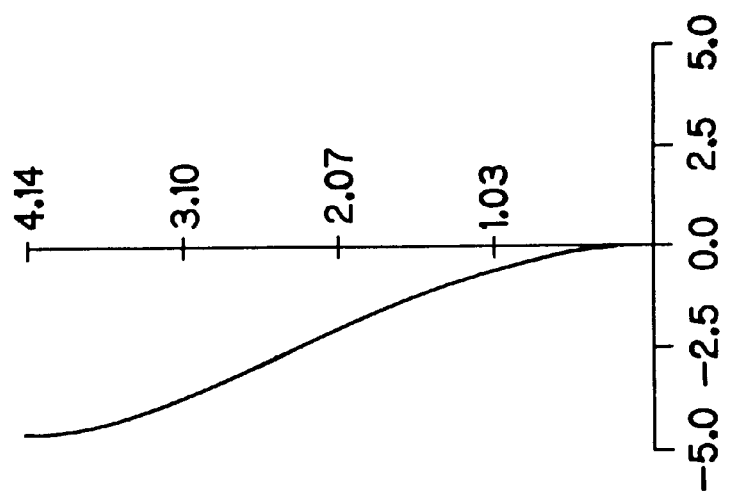
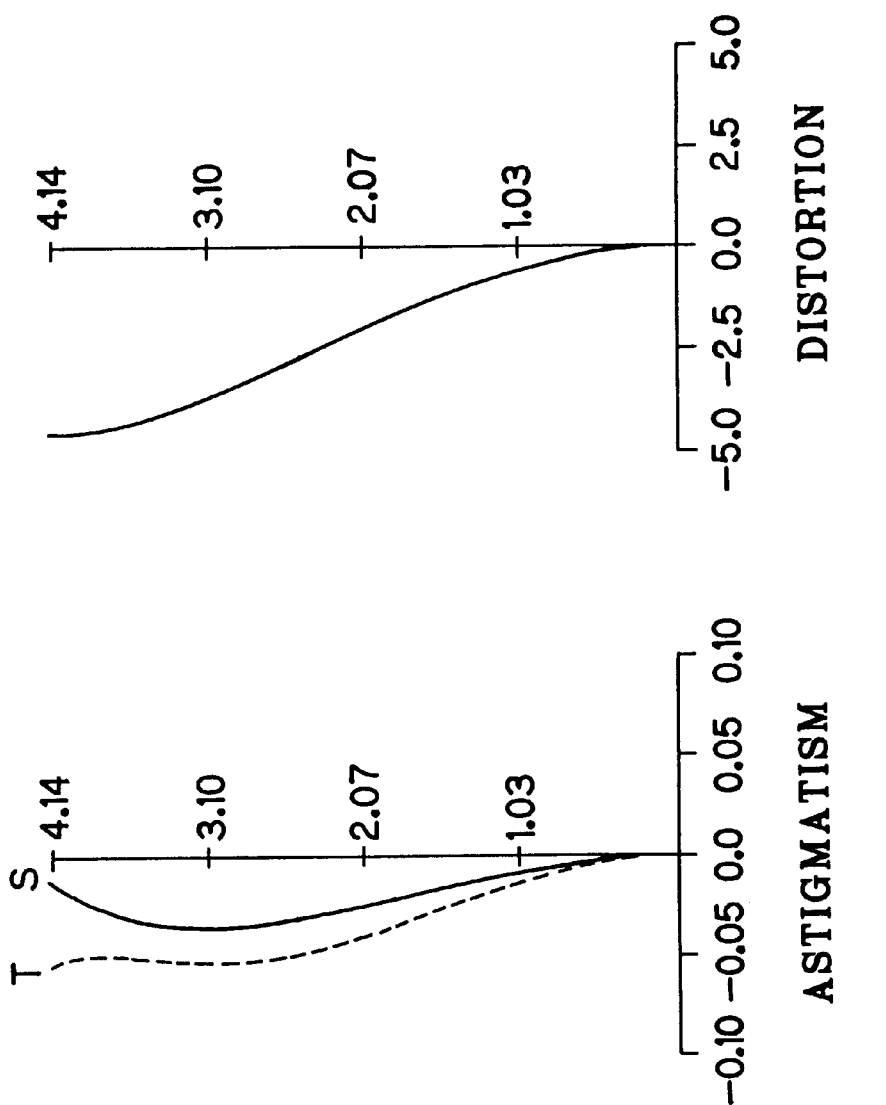
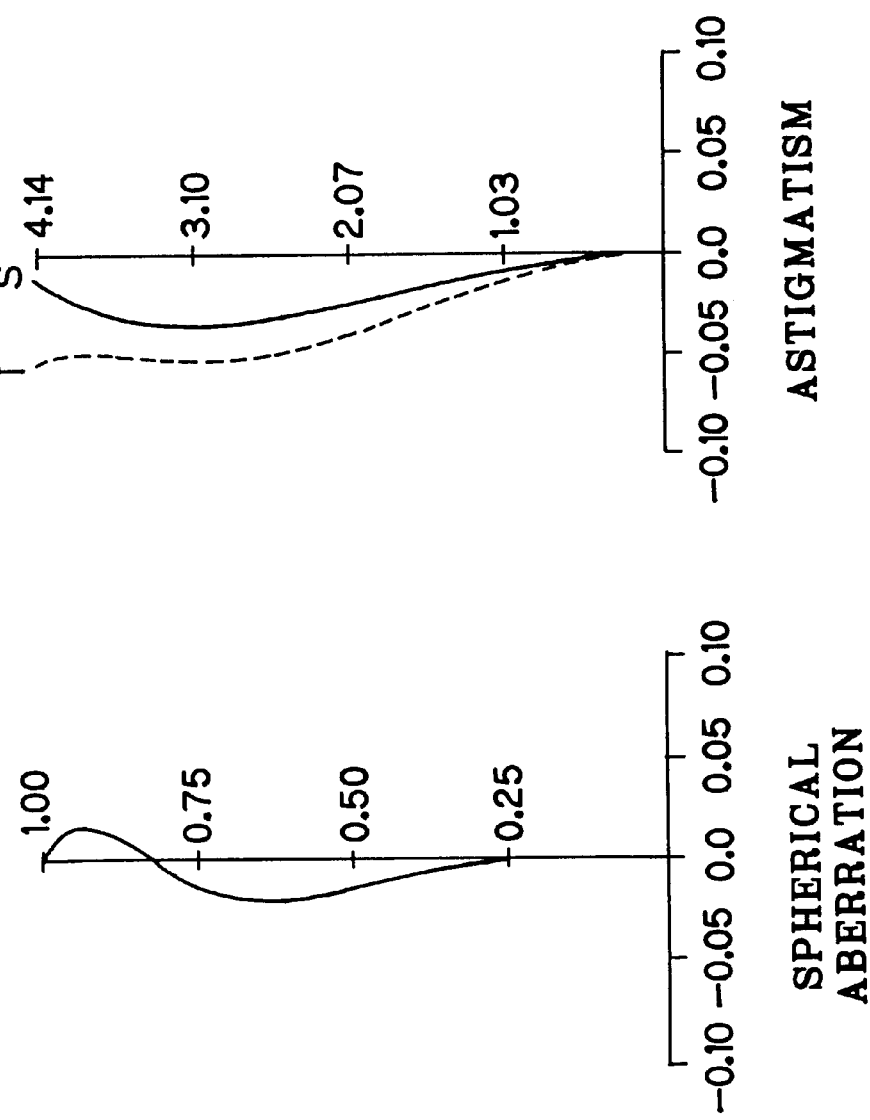

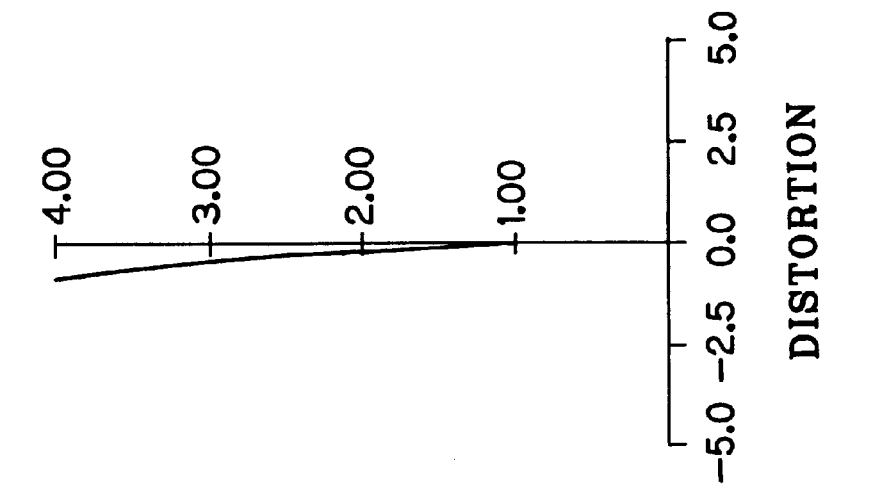
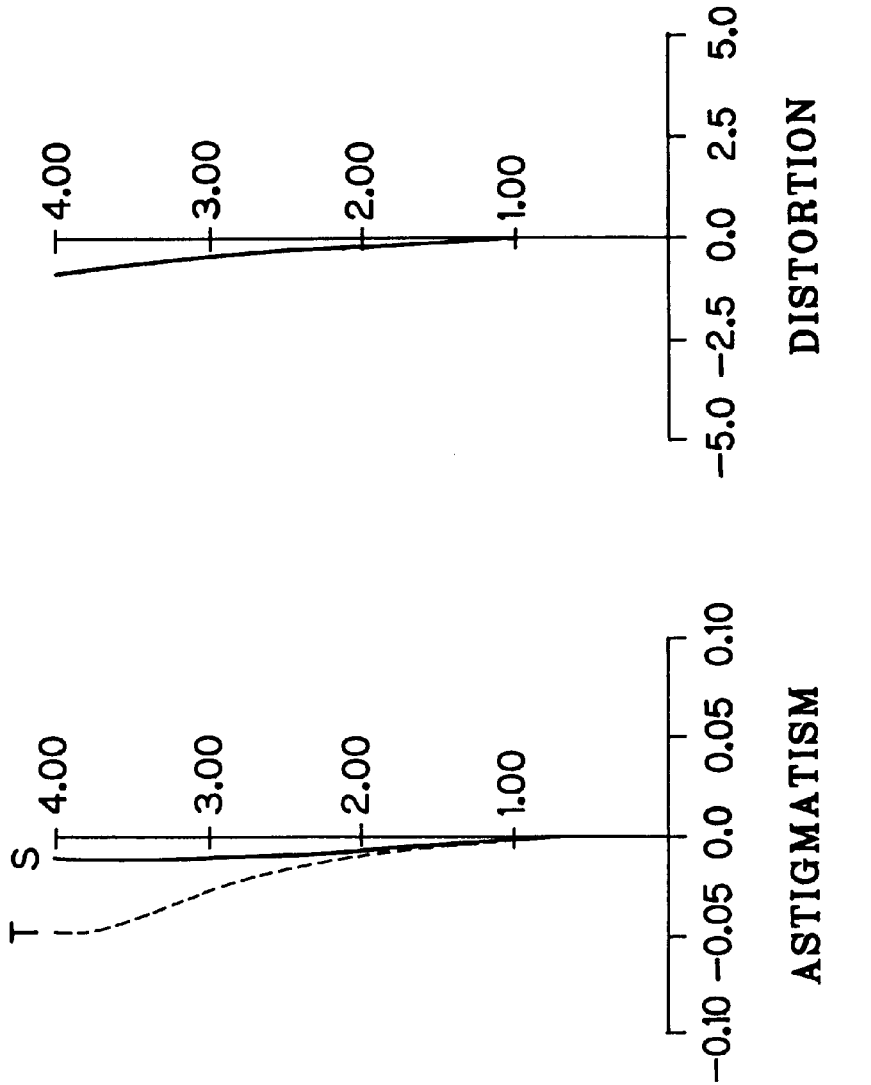
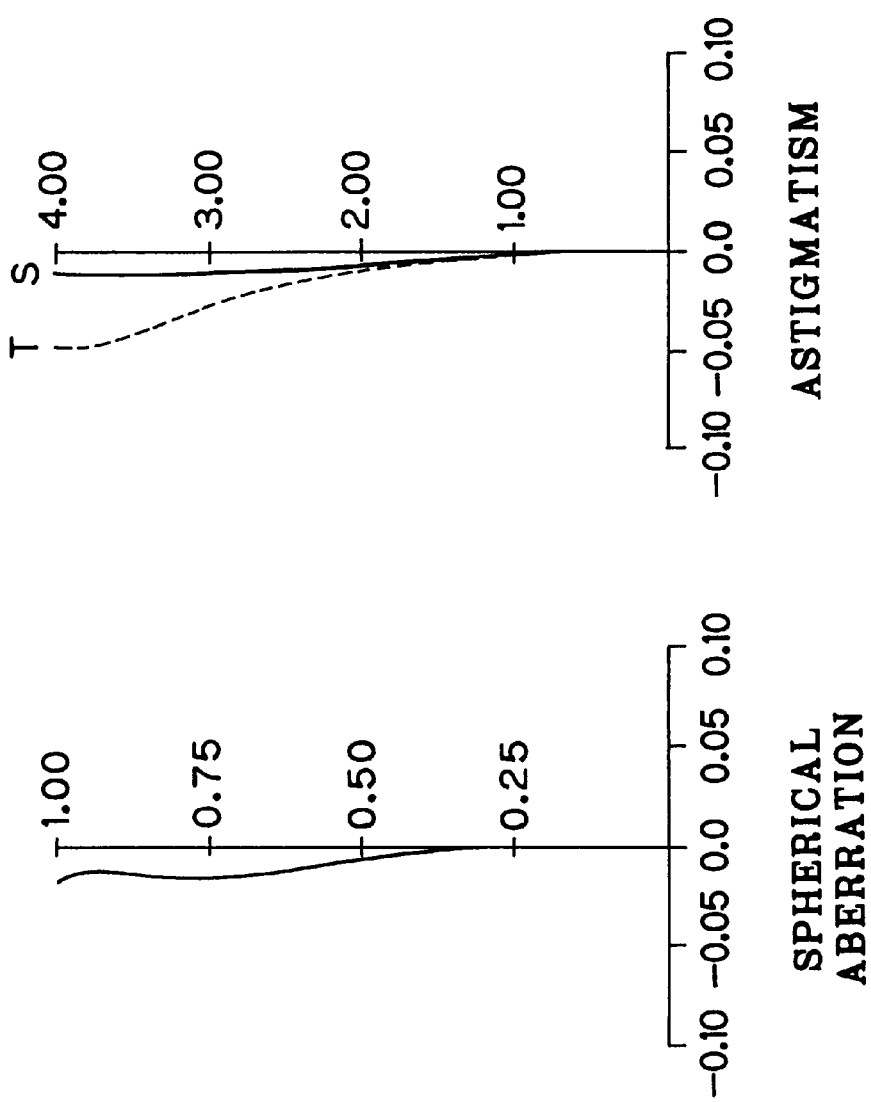

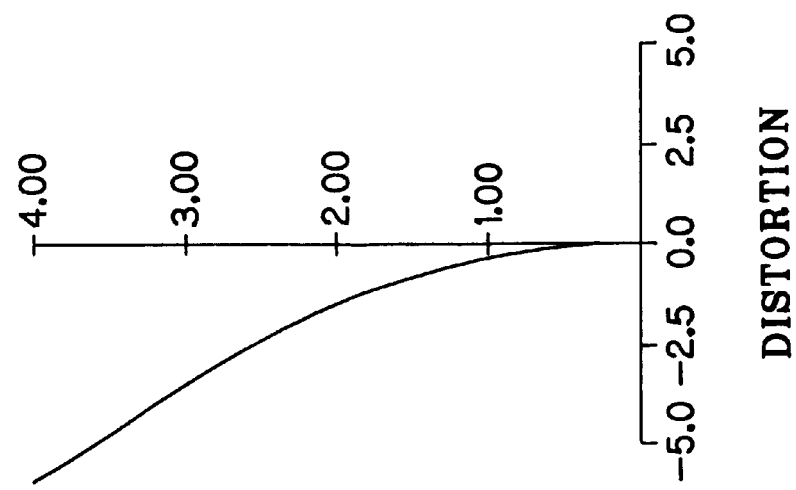
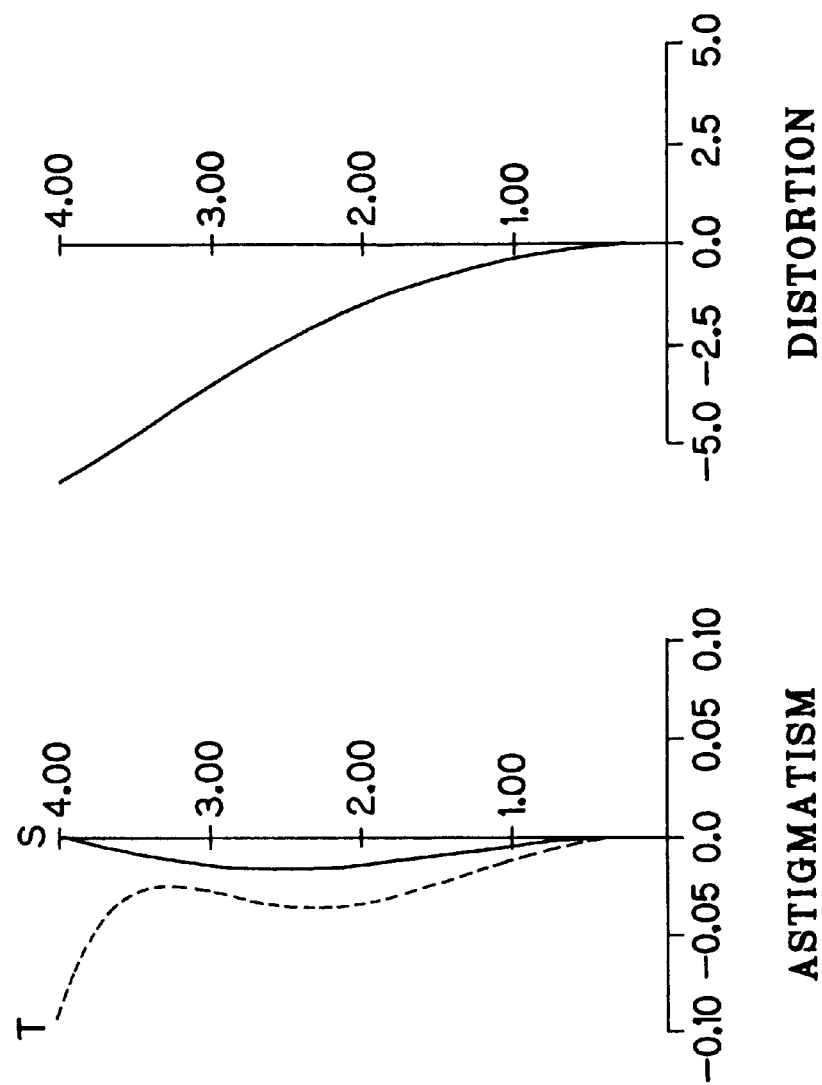
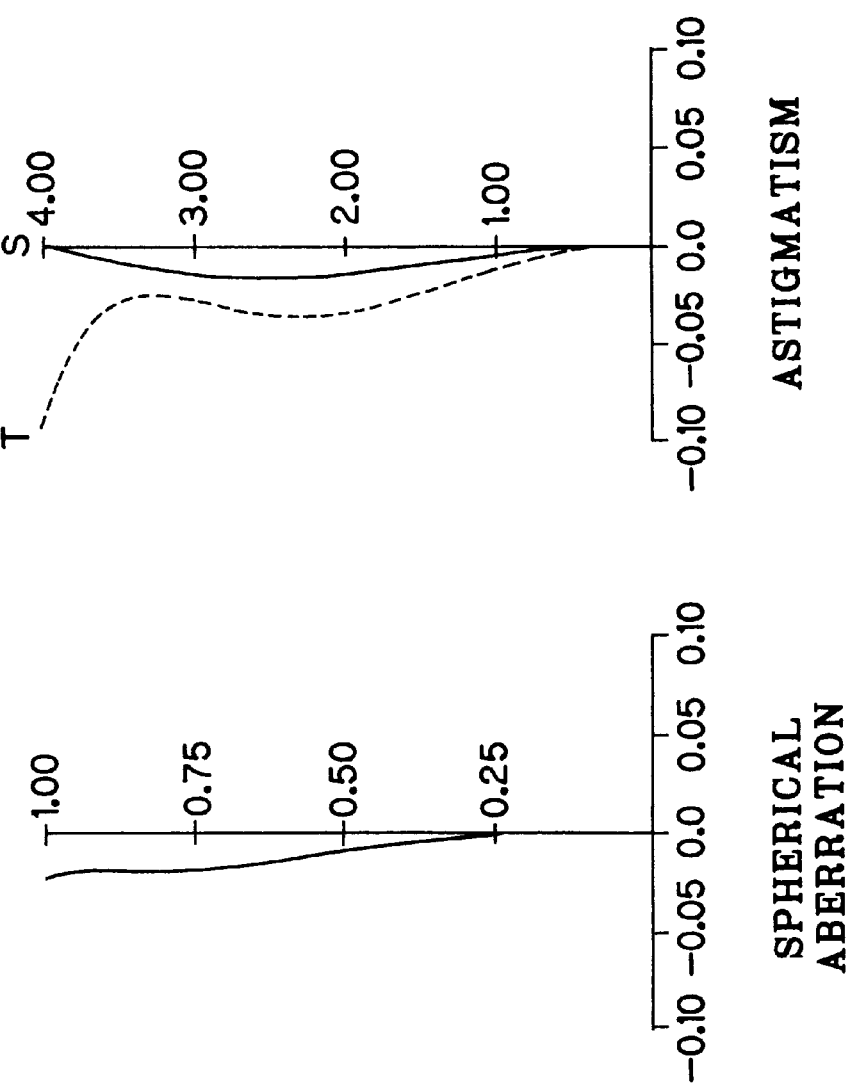

SPHERICAL ABERRATION

ASTIGMATISM

DISTORTION

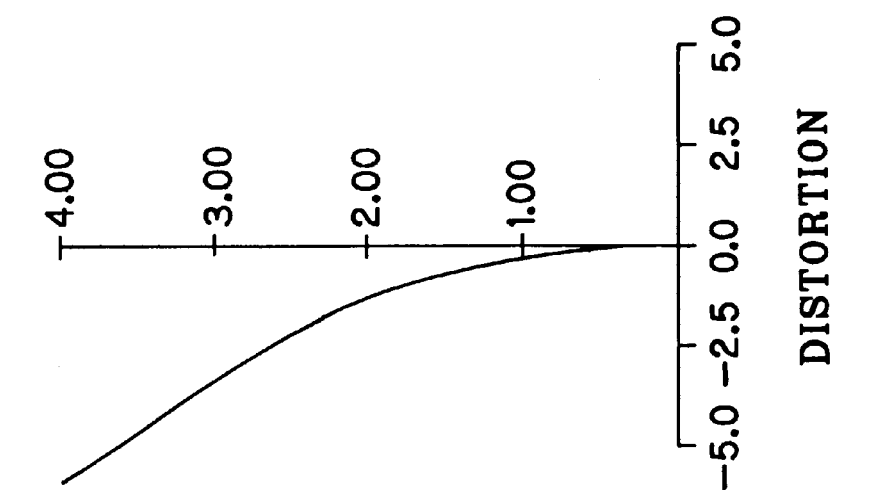
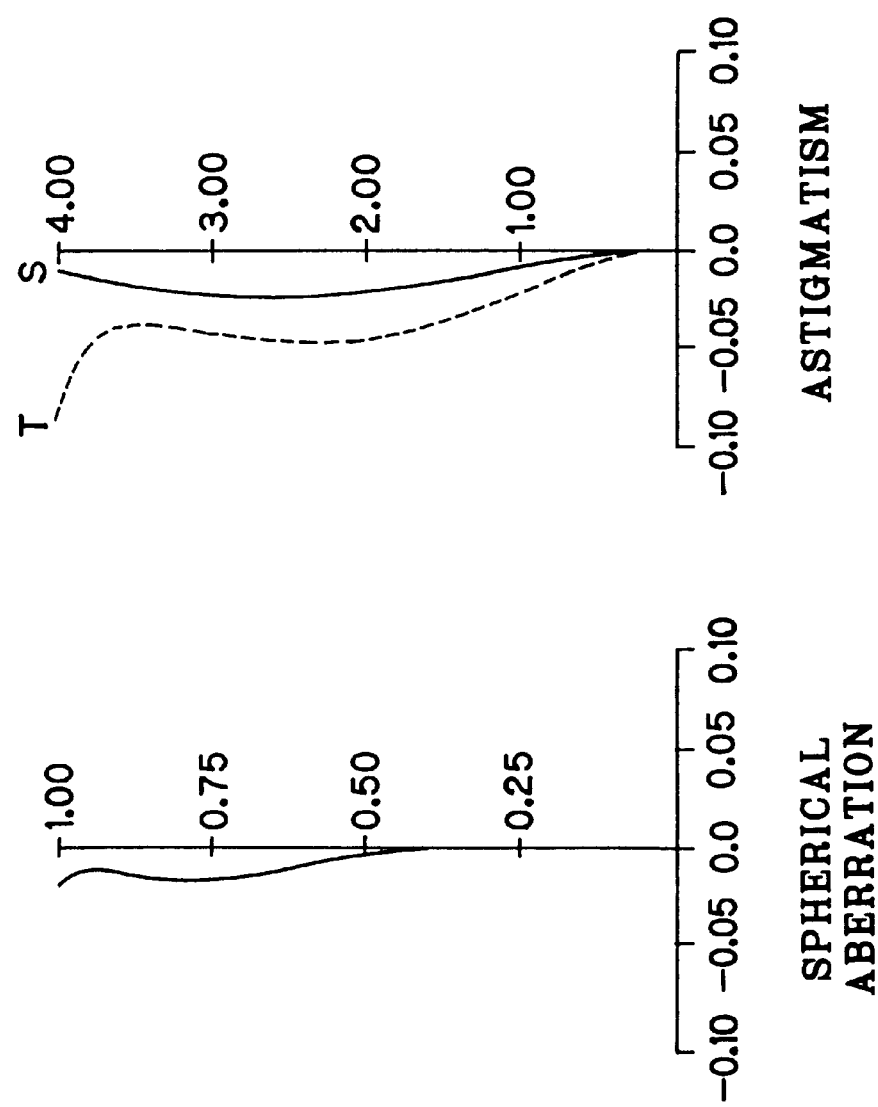

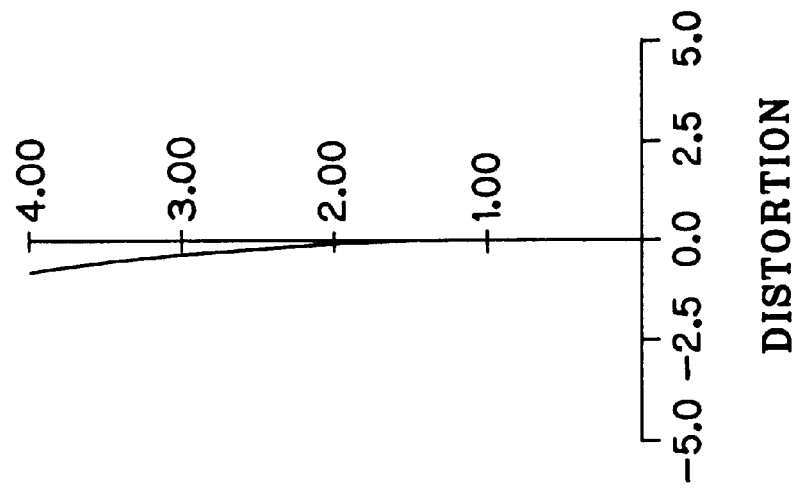
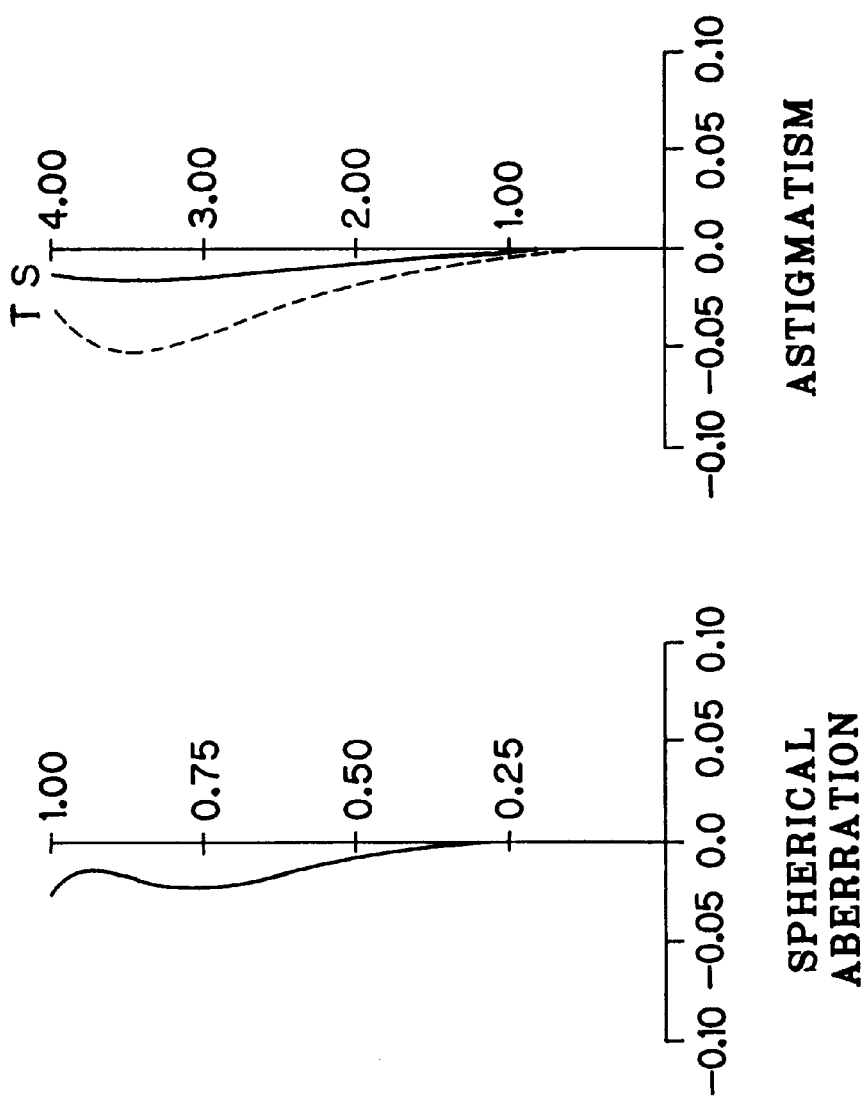
FIG. 38A  FIG. 38B  FIG. 38C

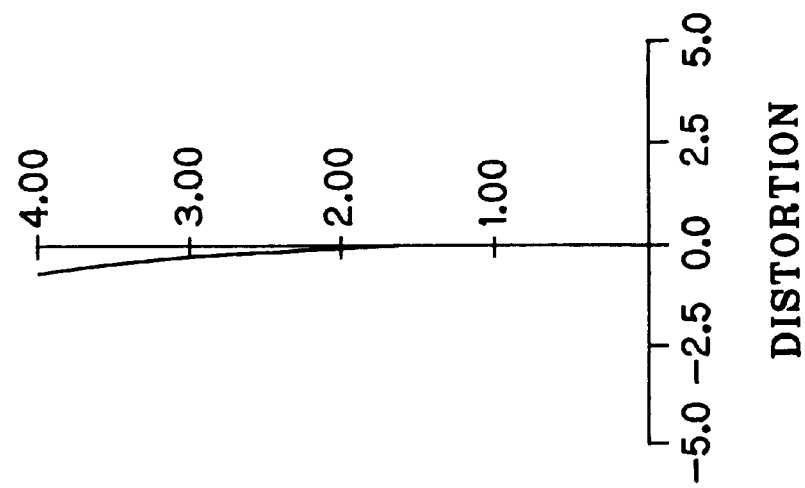
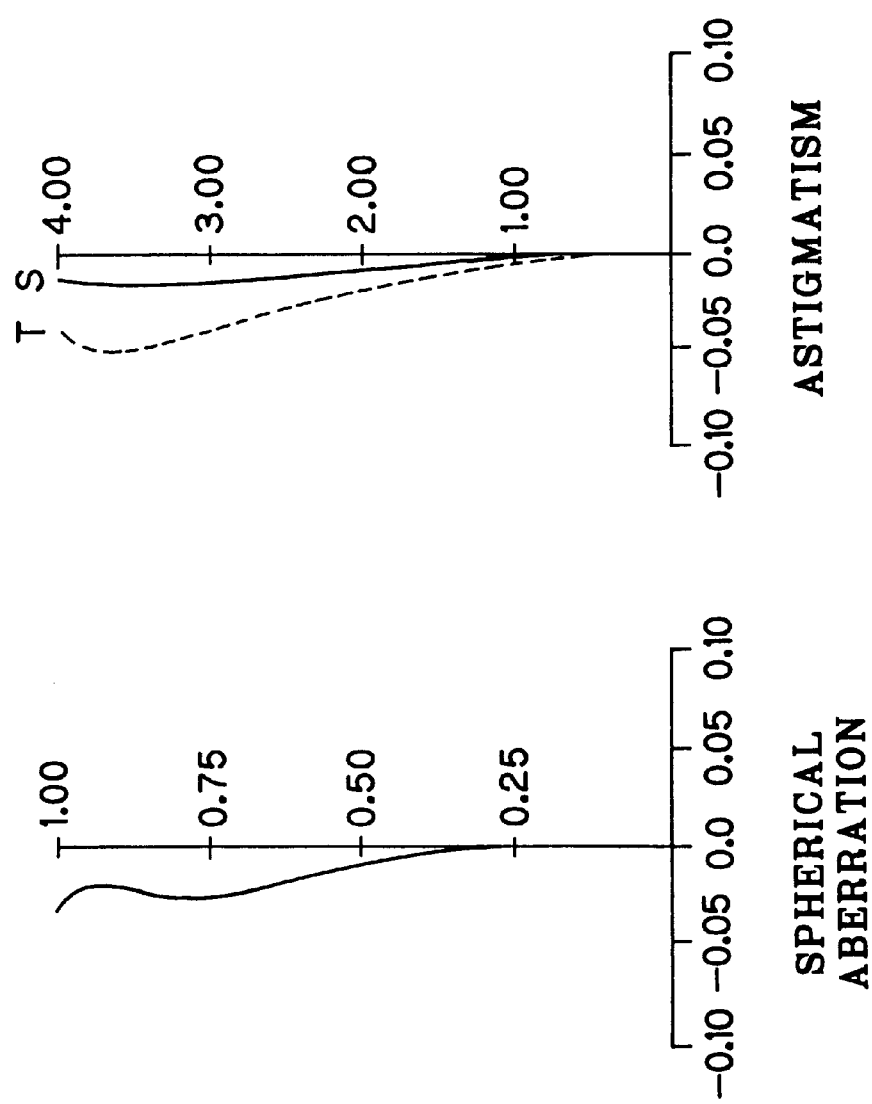
FIG. 41A  FIG. 41B  FIG. 41C

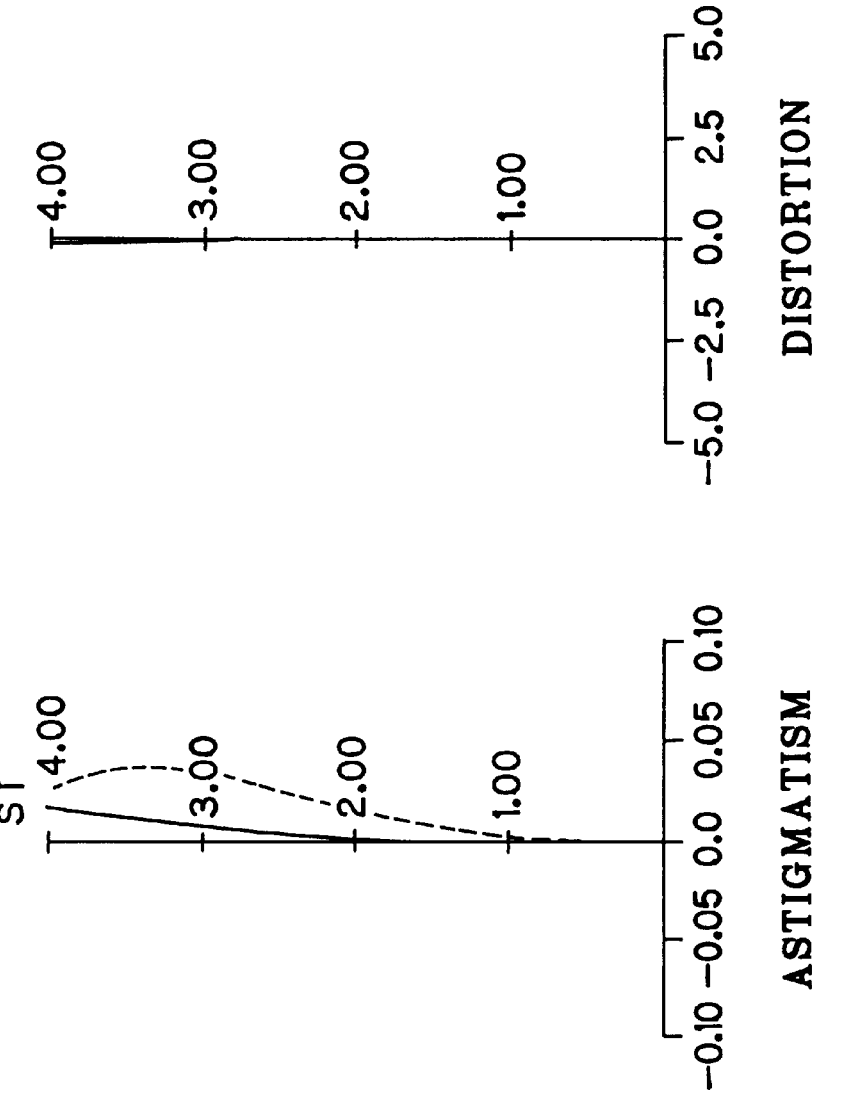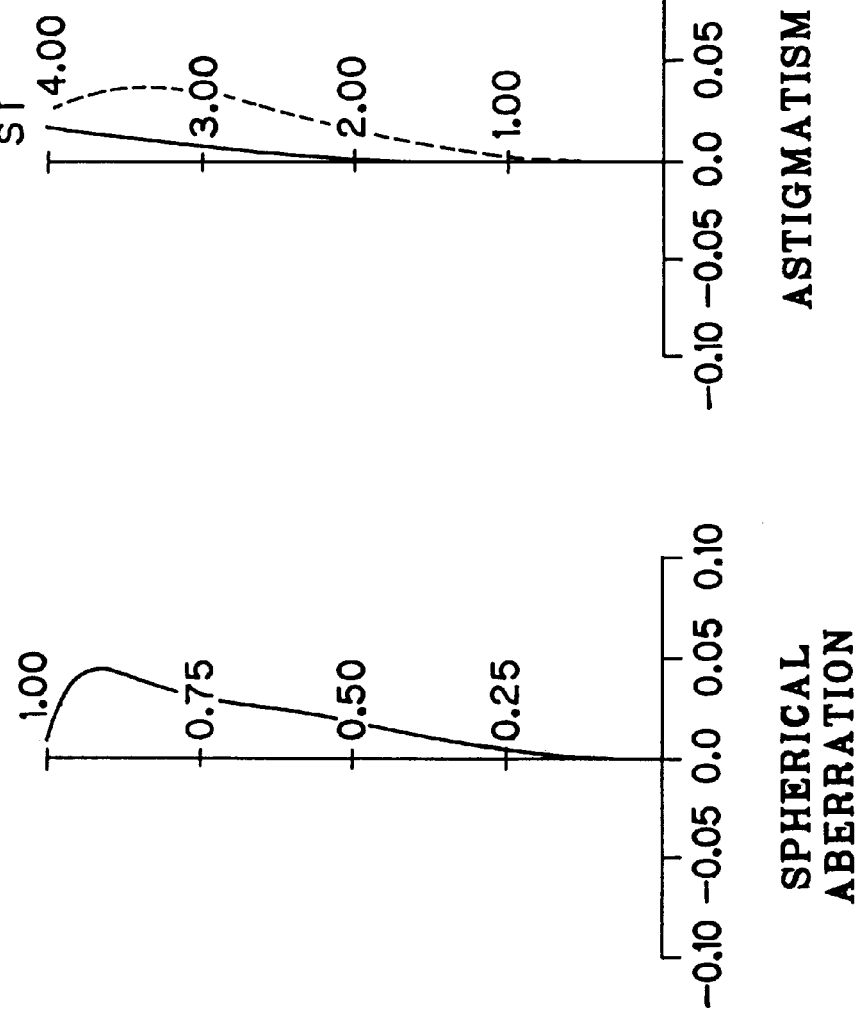

ZOOM LENS

BACKGROUND OF THE INVENTION

1. Field of the Invention

The present invention relates to a zoom lens suitable for use in video cameras or electronic still cameras, wherein an image of a subject is formed on a solid state imaging device.

2. Background Arts

In video cameras and electronic still cameras, an image of a subject is formed on a photo-receptive surface of a solid state imaging device, wherein a matrix of micro-lenses are put on the photo-receptive surface, and an optical low-pass filter is usually placed in front of the photo-receptive surface. In order to improve photosensitivity of the solid state imaging device, it is important to prevent shading. For this purpose, light from the subject should fall onto the micro-lenses in a substantially perpendicular direction to the photo-receptive surface and thus to the micro-lenses.

For this reason, a retrofocus lens consisting of a front lens group having a negative power and a rear lens group having a positive power has conventionally been used as a zoom lens for forming an image on the solid state imaging device while changing its focal length from a wide-angle position to a telephoto position. It is to be noted that "front" means the object side and "rear" means the image side of any lens system in the following description. Since the retrofocus lens has a longer back focus or back focal distance than its focal length or front focal distance, and also the exit pupil is located distant from the lens, the light from the subject falls onto the micro-lenses substantially perpendicularly.

As for the retrofocus type zoom lens consisting of a negative front lens group and a negative rear lens group, the front lens group is moved together to the object side for focusing. According to this configuration, the lens must have a large diameter in order to obtain a sufficient brightness of the edge of image field while the zoom lens is focused on a near distance. As a result, the conventional retrofocus type zoom lens tends to be large in scale. Moreover, since it is necessary to move a plurality of lens elements of the front lens group together for focusing, a large driving system that can bear a large load for moving the plurality of lens is necessary, and it also enlarges variations in aberrations such as spherical aberrations, astigmatism and distortion.

To solve this problem, JPU No. 62-76312 discloses a retrofocus type zoom lens whose rear lens group is divided into a positive lens group having a positive power and a negative lens group having a negative power which are arranged in this order from the objective side, wherein either one of the positive and negative lens groups is moved for focusing. However, placing a negative lens in the rearmost position, i.e., the nearest position to the image side, of the lens system makes its exit pupil closer to the lens system. As such it is impossible to get a sufficient back focus. Also, the lens system as a whole would have a stronger positive power of refraction, making it hard to balance aberrations.

SUMMARY OF THE INVENTION

In view of the foregoing, an object of the present invention is to provide a zoom lens that is small in size, reduces variations in aberrations caused by the focusing movement of the zoom lens, and has a sufficient back focus and a distant exit pupil.

To achieve the above object, a zoom lens according to the present invention is composed of a front lens group having a negative power as a whole and a rear lens group having a positive power as a whole. The rear lens group includes a stop therein, and the front and rear lens groups are moved relative to each other on an optical axis for zooming. The rearmost lens of the rear lens group has a positive power, and only the rearmost positive lens is moved for focusing. The zoom lens of the invention satisfies the following conditions:

$$0.5 < ff/fR < 5.0 \tag{1}$$

$$0.01 < \beta f < 1.00 \tag{2}$$

$$-1.0 \leq r1/r2 \leq 0.3 \tag{3}$$

wherein fR represents a synthetic focal length of the rear lens group, ff represents a focal length of the rearmost positive lens, $\beta f$ represents an image magnification of the rearmost positive lens, r1 represents a radius of curvature of an object side surface of the rearmost positive lens, and r2 represents a radius of curvature of an image side surface of the rearmost positive lens.

By locating a positive lens in the rearmost position of the zoom lens, the exit of pupil is put away from the lens, and the zoom lens has a sufficiently long back focus. Because light bundles travel through the rearmost positive lens in a substantially parallel direction to the optical axis, the curvature of the field little varies along with the focusing movement of the rearmost positive lens. Therefore, variations in aberrations caused by the focusing movement are reduced in comparison with the conventional zoom lens where the front lens group is moved together for focusing. Because the front lens group does not move for focusing, the brightness of the edge of image field is sufficient even when the zoom lens is focused on the nearest range without the need for enlarging the diameter of the front lens group. Also, the load on the lens driving system necessary for the focusing movement is remarkably reduced in comparison with the case where the front lens group is moved together for focusing. Therefore, the lens driving system can be small, and the small lens driving system is easy to accommodate in a lens barrel of a relatively small diameter.

Below the lower limit of the condition (1), the rearmost positive lens should move so largely for focusing that the entire length of the zoom lens would be too long. Above the upper limit of the condition (1), aberrations vary so much during the focusing that it is impossible to correct aberrations.

Below the lower limit of the condition (2), curvature of the field varies so much during the focusing that it is impossible to maintain a high production accuracy. Above the upper limit of the condition (2), there are two conjugate points on opposite sides of an equal magnification position, so it is impossible to determine the focal position.

Below the lower limit of the condition (3), the image side surface of the rearmost positive lens would be a convex surface with such a large curvature that the spherical aberration would be too large to compensate. Above the upper limit of the condition (3), the image side surface of the rearmost positive lens would be a concave surface with such a large curvature that the exit of pupil gets closer, and the back focus gets short.

In order to keep the exit of pupil sufficiently away from the lens, and obtain a sufficient brightness of the edge of image field at a close-up position where the zoom lens is focused on a nearest range, the zoom lens preferably satisfies the following condition:

$$0.3 \leq d/fW \leq 1.5 \tag{4}$$

wherein d represents a surface distance between the rearmost positive lens and a lens placed on the object side of the rearmost positive lens in a position where the zoom lens is focused on infinity, and fW represents a focal length of the zoom lens as a whole at a wide-angle terminal.

Below the power limit of the condition (4), it is hard to keep the exit of pupil sufficiently away from the lens, and also it is impossible to provide an enough space for the rearmost positive lens to move for focusing. Above the upper limit of the condition (4), the entire length of the zoom lens would be too large to achieve the object of providing a small zoom lens.

According to a preferred embodiment of the invention, the front lens group is composed of a meniscus negative lens and a positive lens arranged in this order from the object side, whereas the rear lens group is composed of one or two positive lenses, a negative lens having concave surfaces on opposite sides, and the positive lens, arranged in this order from the object side. This configuration is desirable for reducing the total size of the zoom lens.

To improve optical properties, the lenses composing the front and rear lens groups preferably have aspherical surfaces.

BRIEF DESCRIPTION OF THE DRAWINGS

The above and other objects and advantages of the present invention will become apparent from the following detailed description of the preferred embodiments when read in connection with the accompanying drawings, wherein like reference numerals designate like or corresponding parts throughout the several views, and wherein:

FIGS. 2A, 2B and 2C show aberration curves of the zoom lens of the first example in a position where the zoom lens is focused on infinity at the wide-angle terminal;

FIGS. 3A, 3B and 3C show aberration curves of the zoom lens of the first example in a position where the zoom lens is focused on infinity at the middle focal length position;

FIGS. 4A, 4B and 4C show aberration curves of the zoom lens of the first example in a position where the zoom lens is focused on infinity at the telephoto terminal;

FIGS. 5A, 5B and 5C show aberration curves of the zoom lens of the first example in a position where the zoom lens is at the wide-angle terminal and is focused on a near subject placed 500 mm from the zoom lens;

FIGS. 10A, 10B and 10C show aberration curves of the zoom lens of the second example in a position where the zoom lens is focused on infinity at the middle focal length position;

FIGS. 12A, 12B and 12C show aberration curves of the zoom lens of the second example in a position where the zoom lens is focused on the near subject at the wide-angle terminal;

FIGS. 13A, 13B and 13C show aberration curves of the zoom lens of the second example in a position where the zoom lens is focused on the near subject at the middle focal length position;

FIGS. 17A, 17B and 17C show aberration curves of the zoom lens of the third example in a position where the zoom lens is focused on infinity at the middle focal length position;

FIGS. 18A, 18B and 18C show aberration curves of the zoom lens of the third example in a position where the zoom lens is focused on infinity at the telephoto terminal;

FIGS. 21A, 21B and 21C show aberration curves of the zoom lens of the third example in a position where the zoom lens is focused on the near subject at the telephoto terminal;

FIGS. 26A, 26B and 26C show aberration curves of the zoom lens of the fourth example in a position where the zoom lens is focused on the near subject at the wide-angle terminal;

FIGS. 31A, 31B and 31C show aberration curves of the zoom lens of the fifth example in a position where the zoom lens is focused on infinity at the middle focal length position;

FIGS. 33A, 33B and 33C show aberration curves of the zoom lens of the fifth example in a position where the zoom lens is focused on the near subject at the wide-angle terminal;

FIGS. 37A, 37B and 37C show aberration curves of the zoom lens of the sixth example in a position where the zoom lens is focused on infinity at the wide-angle terminal;

FIGS. 38A, 38B and 38C show aberration curves of the zoom lens of the sixth example in a position where the zoom lens is focused on infinity at the middle focal length position;

FIGS. 41A, 41B and 41C show aberration curves of the zoom lens of the sixth example in a position where the zoom lens is focused on the near subject at the middle focal length position; and FIGS. 42A, 42B and 42C show aberration curves of the zoom lens of the sixth example in a position where the zoom lens is focused on the near subject at the telephoto terminal.

Figure 1A:
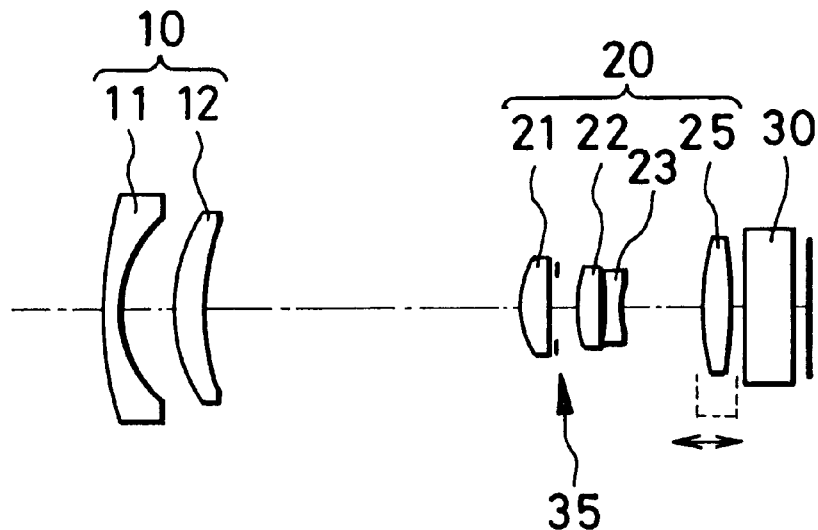
FIGS. 1A, 1B and 1C show a zoom lens according to a first example of the invention at a wide-angle terminal, a middle focal length position and a telephoto terminal respectively.

In the drawings, the curves of spherical aberration represent spherical aberration relative to d-line (587.6 nm), and the curves S and T represent astigmatism relative to sagittal image surface and tangential image surface respectively.

DETAILED DESCRIPTION OF THE PREFERRED EMBODIMENT

EXAMPLE 1

Figure 1B:
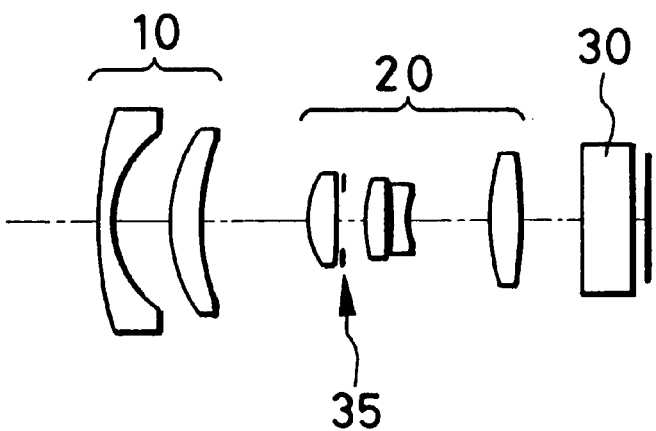
Figure 1C:
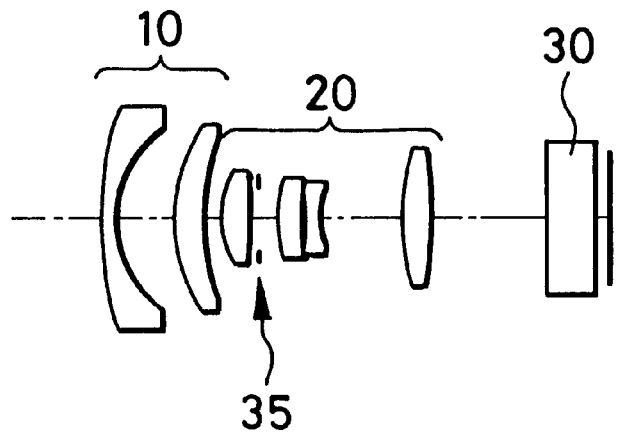
Figure 6C:
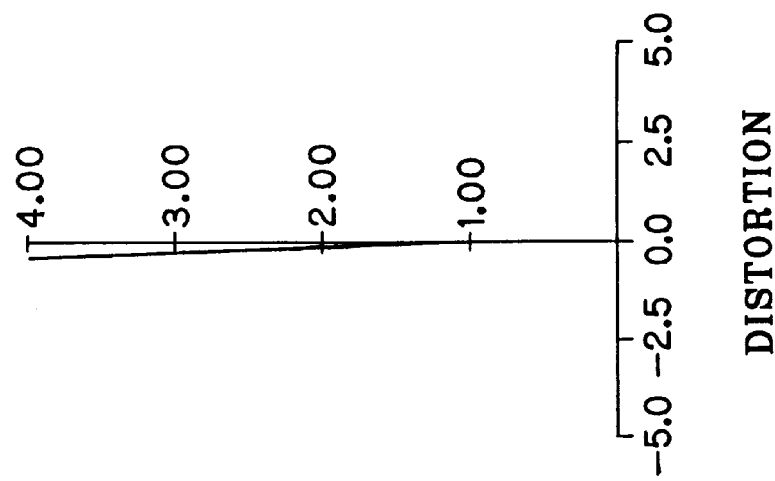
FIGS. 6A, 6B and 6C show aberration curves of the zoom lens of the first example in a position where the zoom lens is focused on the near subject at the middle focal length position.
Figure 6B:
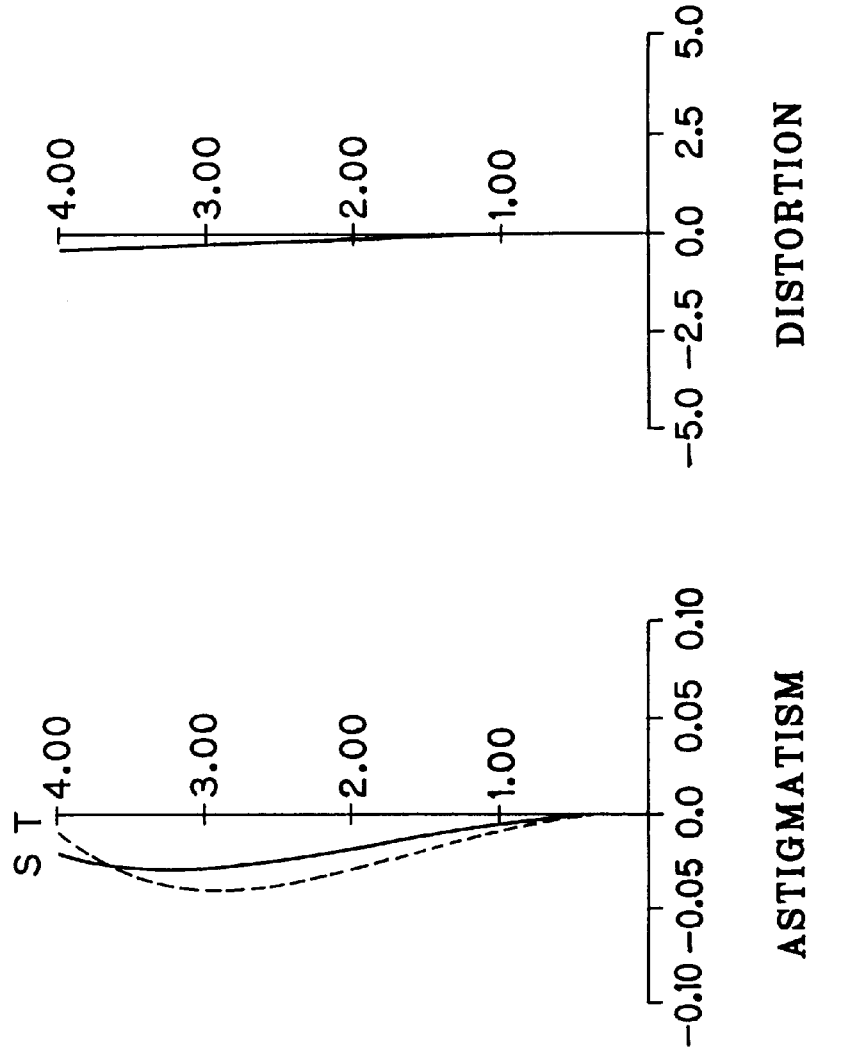
Figure 6A:
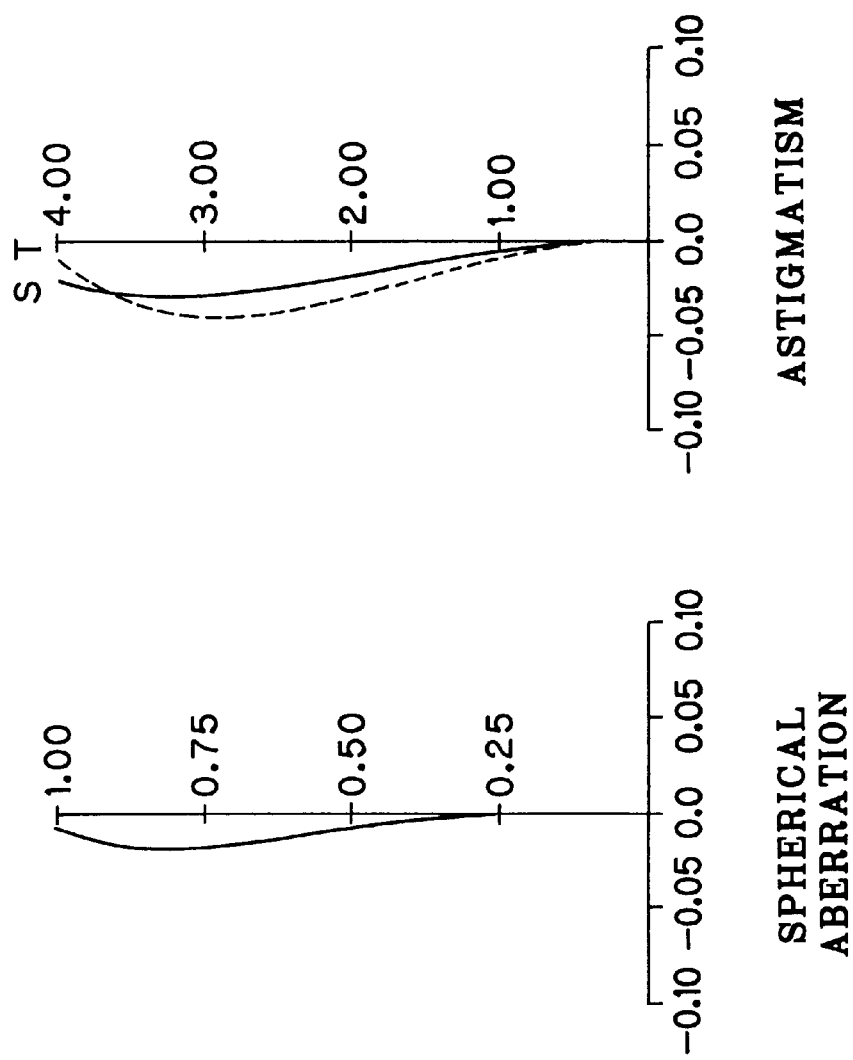
Figure 7C:
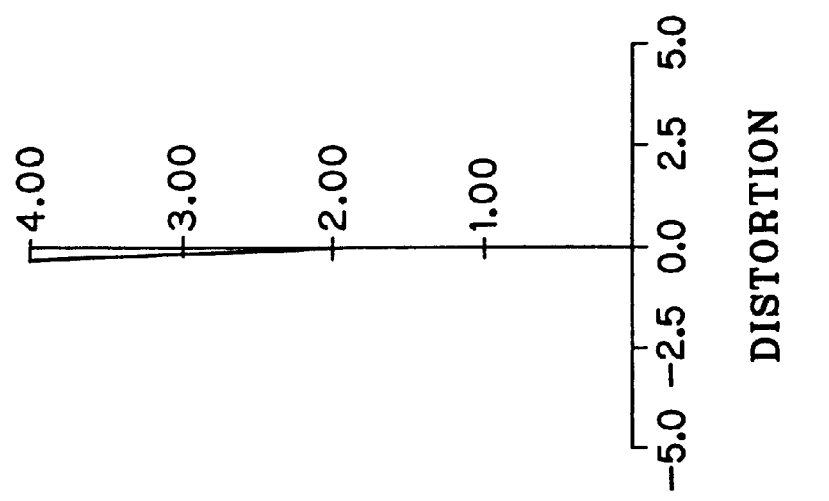
FIGS. 7A, 7B and 7C show aberration curves of the zoom lens of the first example in a position where the zoom lens is focused on the near subject at the telephoto terminal.
Figure 7B:
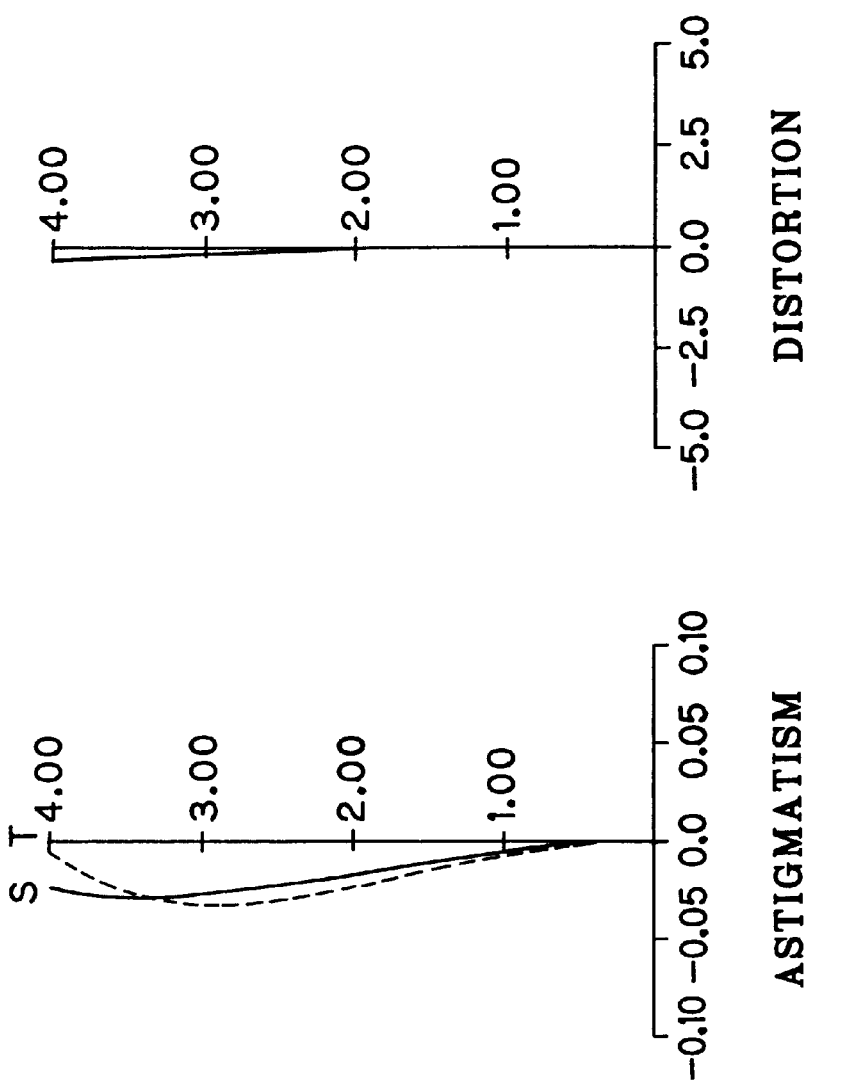
Figure 7A:
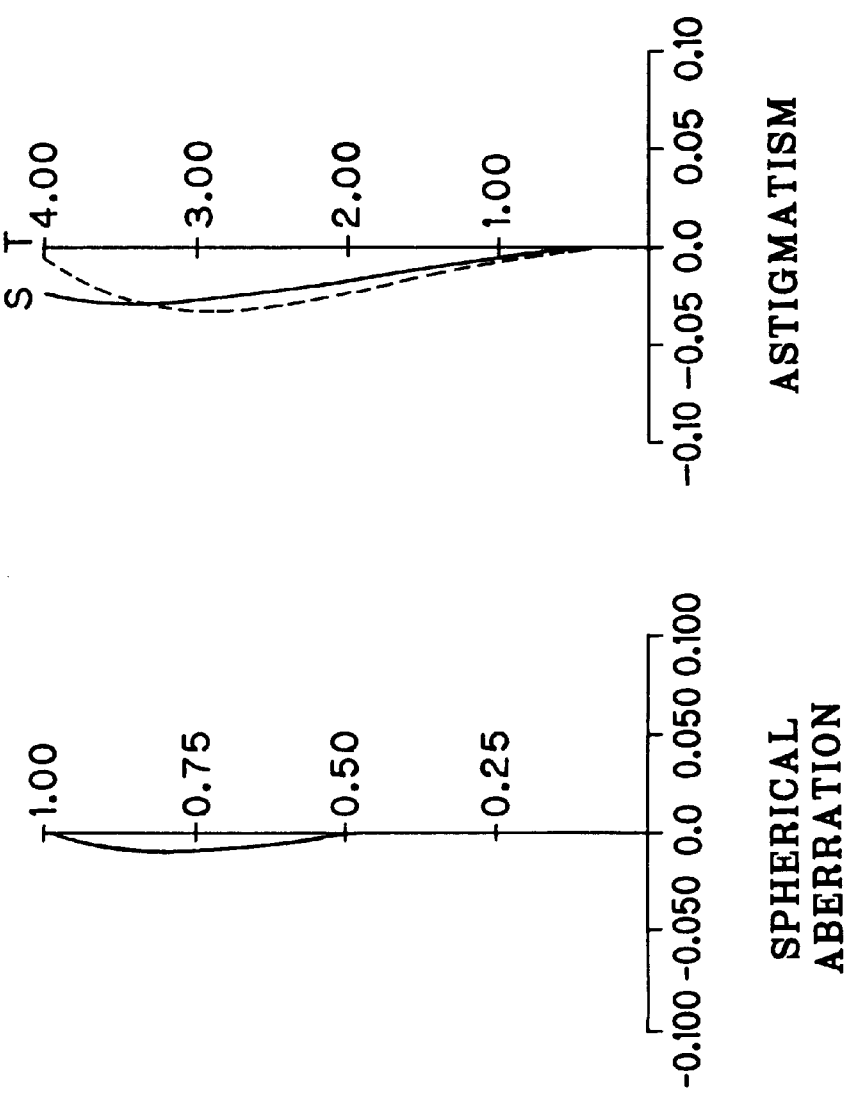

According to the first example shown in FIGS. 1A, 1B and 1C, the zoom lens 5 is composed of a front lens group 10 having a negative power as a whole and a rear lens group 20 having a positive power as a whole. A parallel glass plate 30 that serves as an optical low-pass filter is placed on the image side of the rear lens group 20. A stop 35 is included in the rear lens group 20.

The front lens group 10 is composed of a meniscus negative lens 11 whose object side surface is convex, and a positive lens 12 whose object side surface is convex, which are arranged in this order from the object side. The rear lens group 20 is composed of a positive lens 21 whose opposite surfaces are convex, a positive lens 22 whose object side surface is convex, a negative lens 23 whose opposite surfaces are concave, and a positive lens 25 whose opposite surfaces are convex, which are arranged in this order from the object side. The stop 35 is located in between the first and second positive lenses 21 and 22 of the rear lens group 20 from the object side.

To focus the zoom lens 5, only the rearmost positive lens 25 is moved on an optical axis of the zoom lens 5, whereas the front and rear lens groups 10 and 20 are moved relative to each other on the optical axis for zooming.

Numerical values for the first example are as set forth below.

fW=6.70393627333
fT=15.38048799
fF=−17.5727447096
fR=11.8943064918
ff=16.7710678773
FW=3.6
FT=4.9
ωW=30.8°
ωT=14.5° wherein fW represents the focal length of the zoom lens 5 at the wide-angle terminal, fT represents the focal length of the zoom lens 5 at the telephoto terminal, fF represents the synthetic focal length of the front lens group 10, fR represents the synthetic focal length of the rear lens group 20, ff represents the focal length of the rearmost positive lens 25, FW represents the f-number of the zoom lens 5 at the wide-angle terminal, FT represents the f-number of the zoom lens 5 at the telephoto terminal, ωW is the half angle of view at the wide-angle terminal, and ωT is the half angle of view at the telephoto terminal.

In the following Tables, i represents the surface serial number of the respective surfaces of the components in the order from the object side, Ri represents the radius of curvature of the respective surface, Di represents the distance between two adjacent surfaces, i.e. the thickness of the components or air space between the components in the unit of millimeter, Ni represents the refractive index, and υ represents the Abbe number. Also, an asterisk * is allocated to aspherical surfaces, and a double asterisk ** indicates that the surface distance is variable, though the Tables show the distance in the position where the zoom lens is focused on infinity at the wide-angle terminal.

TABLE 1

| i | Ri | Di | Ni | ν |
|---|---|---|---|---|
| 1* | 31.61388 | 0.800000 | 1.806104 | 40.73 |
| 2 | 6.69920 | 3.333658 | | |
| 3 | 9.75023 | 1.766650 | 1.844231 | 25.32 |
| 4 | 14.25825 | 18.685345** | | |
| 5 | 5.52754 | 1.803327 | 1.611211 | 60.58 |
| 6 | −90.92692 | 0.200000 | | |
| 7 | STOP | 1.300343 | | |
| 8* | 7.39258 | 1.382405 | 1.755120 | 45.60 |
| 9* | 25.97164 | 0.313509 | | |
| 10 | −36.86126 | 0.800000 | 1.846660 | 23.80 |
| 11 | 4.85096 | 4.881037** | | |
| 12 | 16.31553 | 1.774750 | 1.606357 | 41.22 |
| 13 | −26.28146 | 0.639076** | | |
| 14 | ∞ | 2.900000 | 1.516800 | 64.17 |
| 15 | ∞ | | | |

The aspherical surfaces satisfy the following definition:

$$Z=ch^2/[1+\sqrt{\{1-(1-K)c^2h^2\}}]+Ah^4+Bh^6+Ch^8+Dh^{10}$$

wherein Z represents a displacement from the surface peak, c the inverted number of the radius of curvature ©=1/R), and h the height of light beams from the optical axis. Table 2 shows aspherical coefficients K, A, B, C and D of the zoom lens 5 of the first example.

TABLE 2

| i | 1 | 8 | 9 |
|---|---|---|---|
| K | −0.001757 | 0.420381 | 0.007376 |
| A | 0.990873E−04 | −0.100168E−02 | 0.376257E−03 |
| B | −0.200869E−06 | −0.328953E−04 | 0.292713E−04 |
| C | 0.140207E−07 | −0.121162E−04 | −0.167233E−04 |
| D | 0.000000E+00 | 0.000000E+00 | 0.000000E+00 |

The surface distance D4 between the front lens group 10 and the rear lens group 20, the surface distance D11 between the negative lens 23 and the rearmost positive lens 25 of the rear lens group 20, and the surface distance D13 between the rear lens group 20 and the parallel glass plate 30 vary according to the zooming position as well as the focusing position of the zoom lens 5 as shown in Table 3. In Table 3 wherein W, M and T respectively represent the wide-angle terminal, the middle focal length position and the telephoto terminal; INF represents an infinity focusing position where the zoom lens 5 is focused on infinity; and NEAR represents a near range focusing position where the zoom lens 5 is focused on a subject placed 500 mm distant from the zoom lens 5. Table 3 also indicates image magnification βf of the rearmost positive lens 25 at the respective focusing and zooming positions.

TABLE 3

| | | D4 | D11 | D13 | βf |
|---|---|---|---|---|---|
| INF | W | 18.68535 | 4.88104 | 0.63908 | 0.7481 |
| | M | 6.42733 | 4.88104 | 3.57895 | 0.5728 |
| | T | 1.09696 | 4.88104 | 6.51190 | 0.3979 |
| NEAR | W | 18.68535 | 4.68233 | 0.83634 | 0.7363 |
| | M | 6.42733 | 4.52658 | 3.93174 | 0.5518 |
| | T | 1.09696 | 4.32696 | 7.06490 | 0.365 |

According to the first example, the synthetic focal length fR of the rear lens group 20, and the focal length ff of the rearmost positive lens 25 are:

fR=11.8943064918 ff=16.7710678773

Therefore, one of the characteristic values of the invention ff/fR is:

$$ff/fR=16.7710678773/11.8943064918≈1.41$$

So the first example satisfies the condition (1):

$$0.5<ff/fR<5.0 \quad (1)$$

As shown in Table 3, the image magnification βf of the rearmost positive lens 25 is:

$$0.365 \leq \beta f \leq 0.7481$$

Therefore, the first example satisfies the condition (2):

$$0.01<\beta f<1.00$$

As shown in Table 1, the radius of curvature r1 of the object side surface of the rearmost positive lens 25, and the radius of curvature r2 of the image side surface of the rearmost positive lens 25 are:

r1=R12=16.31553 r2=R13=−26.28146

Therefore, r1/r2, another characteristic value of the present invention, is:

$$r1/r2 = R12/R13$$

$$= 16.31553/(-26.28146) \approx -0.62$$

So the first example satisfies the condition (3):

$$-1.0 \leq r1/r2 \leq 0.3$$

Assuming that fW represents the focal length of the zoom lens 5 at the wide-angle terminal, and d represents the surface distance between the rearmost positive lens 25 and the negative lens 23 placed on the object side of the rearmost positive lens 25 at the infinity focusing position, these values fW and d of the first example are:

fW=6.70393627333 d=D11=4.88104

Therefore, $$d/fW = D11/fW$$

$$= 4.88104/6.70393627333 \approx 0.73$$

So the first example satisfies the condition (4):

$$0.3 \leq d/fW \leq 1.5$$

Aberration curves of the zoom lens 5 of the first example in the infinity focusing position at the wide-angle terminal, at the middle focal length position and at the telephoto terminal are shown in FIGS. 2A to 2C, 3A to 3C and 4A to 4C respectively. Aberration curves of the zoom lens 5 of the first example in the near range focusing position at the wide-angle terminal, at the middle focal length position and at the telephoto terminal are shown in FIGS. 5A to 5C, 6A to 6C and 7A to 7C respectively.

EXAMPLE 2

Figure 8A:
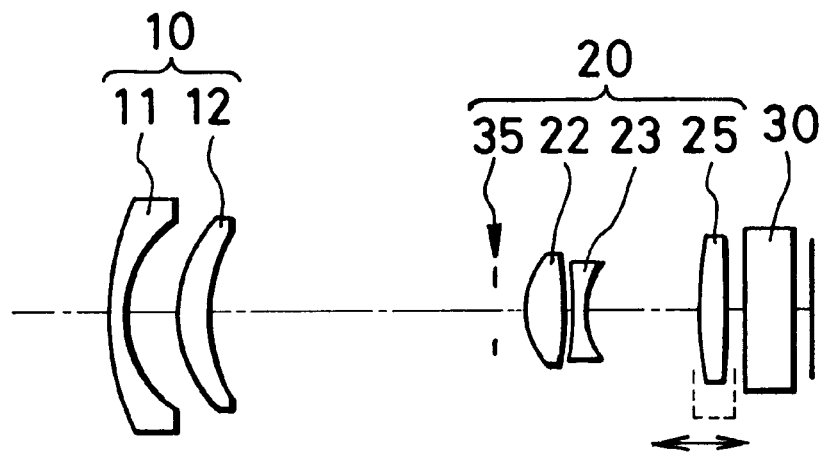
FIGS. 8A, 8B and 8C show a zoom lens according to a second example of the invention at a wide-angle terminal, a middle focal length position and a telephoto terminal respectively.
Figure 8B:
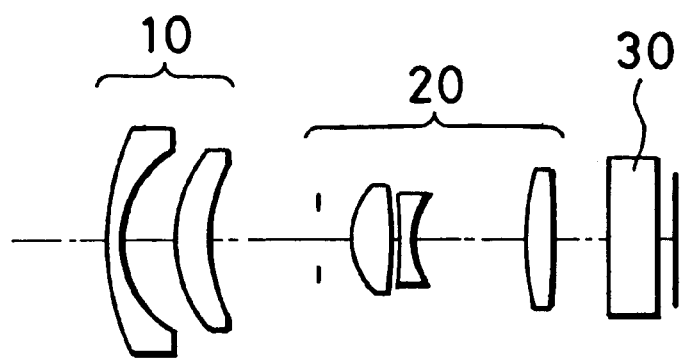
Figure 8C:
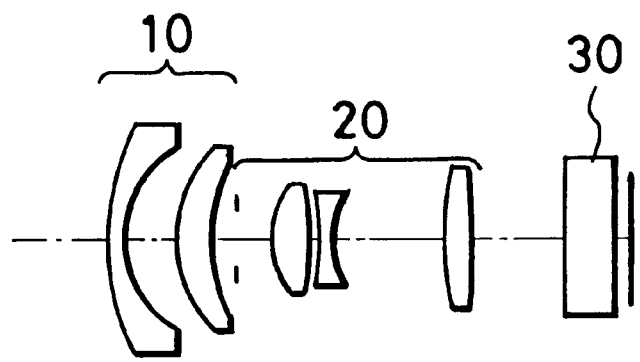
Figure 9C:
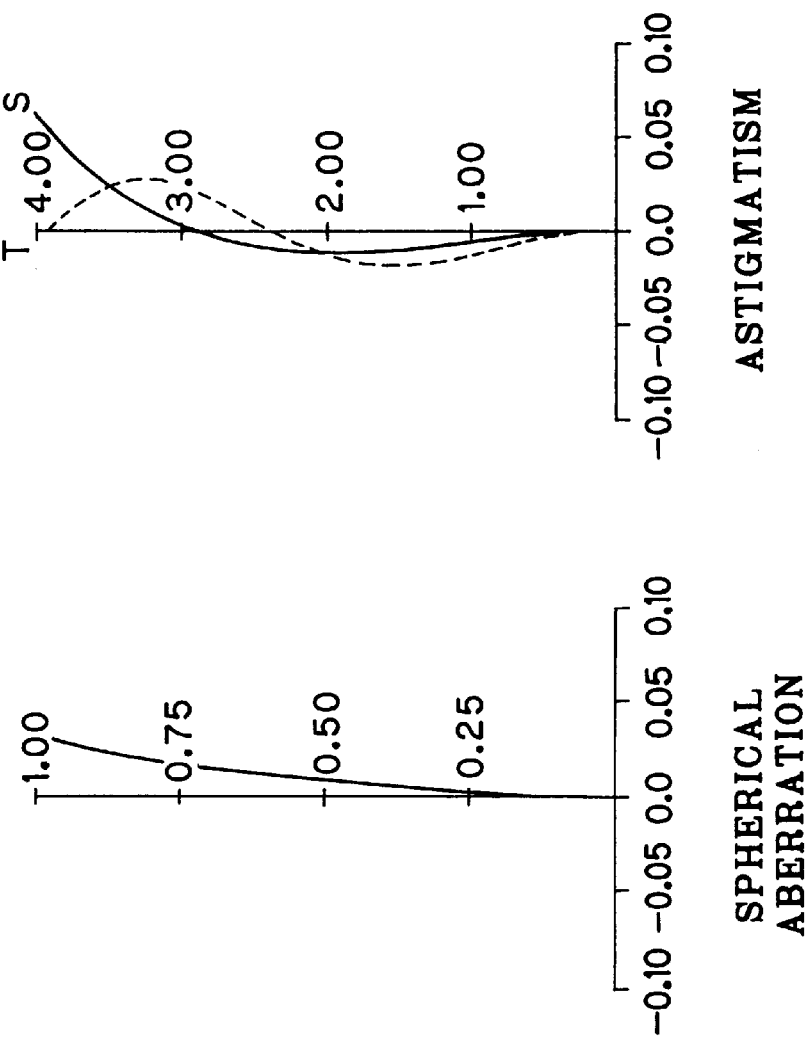
FIGS. 9A, 9B and 9C show aberration curves of the zoom lens of the second example in a position where the zoom lens is focused on infinity at the wide-angle terminal.
Figure 9B:
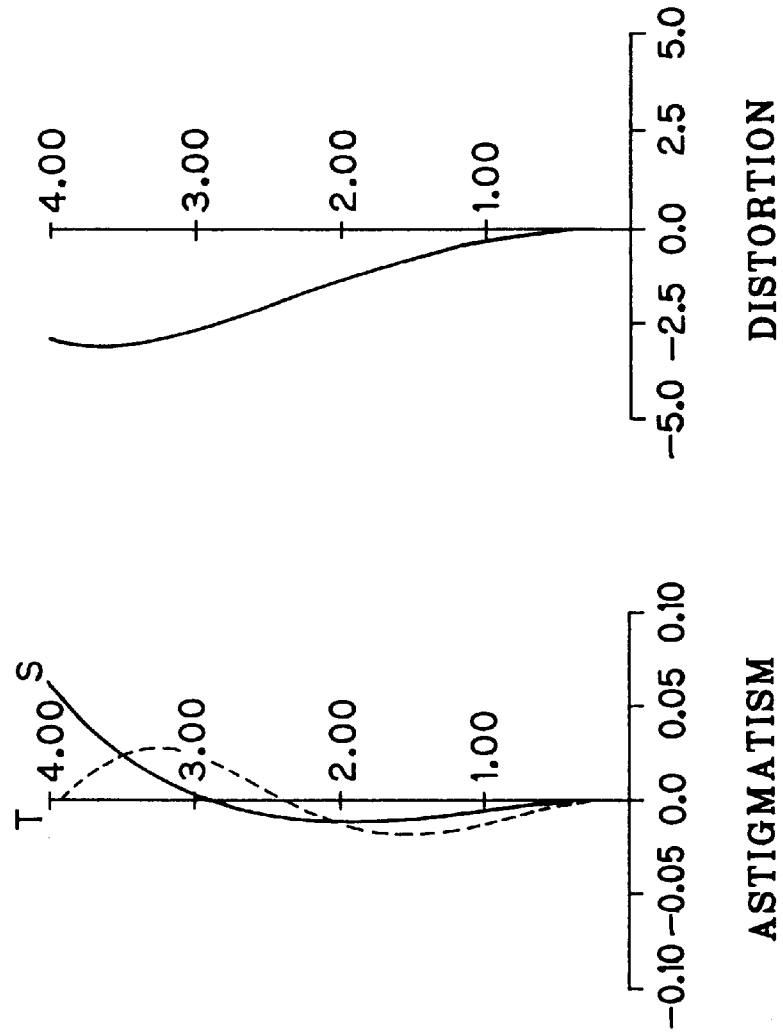
Figure 9A:
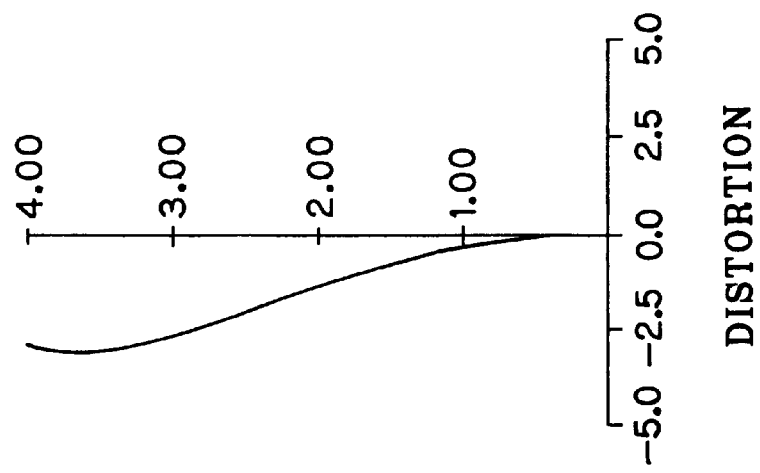
Figure 11C:
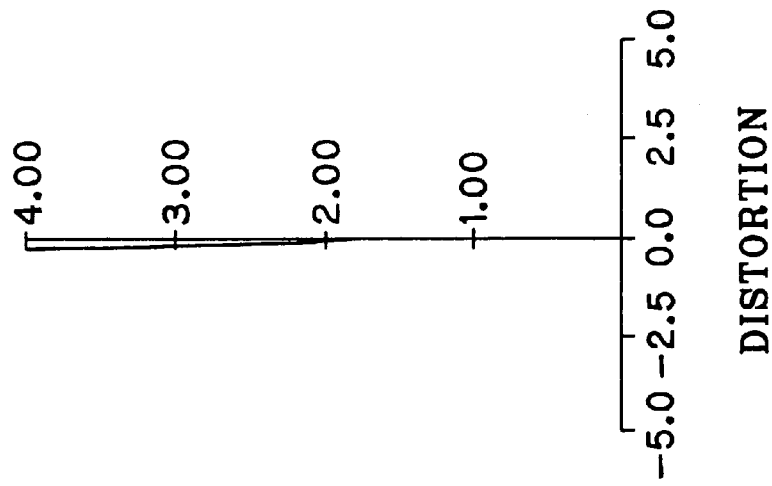
FIGS. 11A, 11B and 11C show aberration curves of the zoom lens of the second example in a position where the zoom lens is focused on infinity at the telephoto terminal.
Figure 11B:
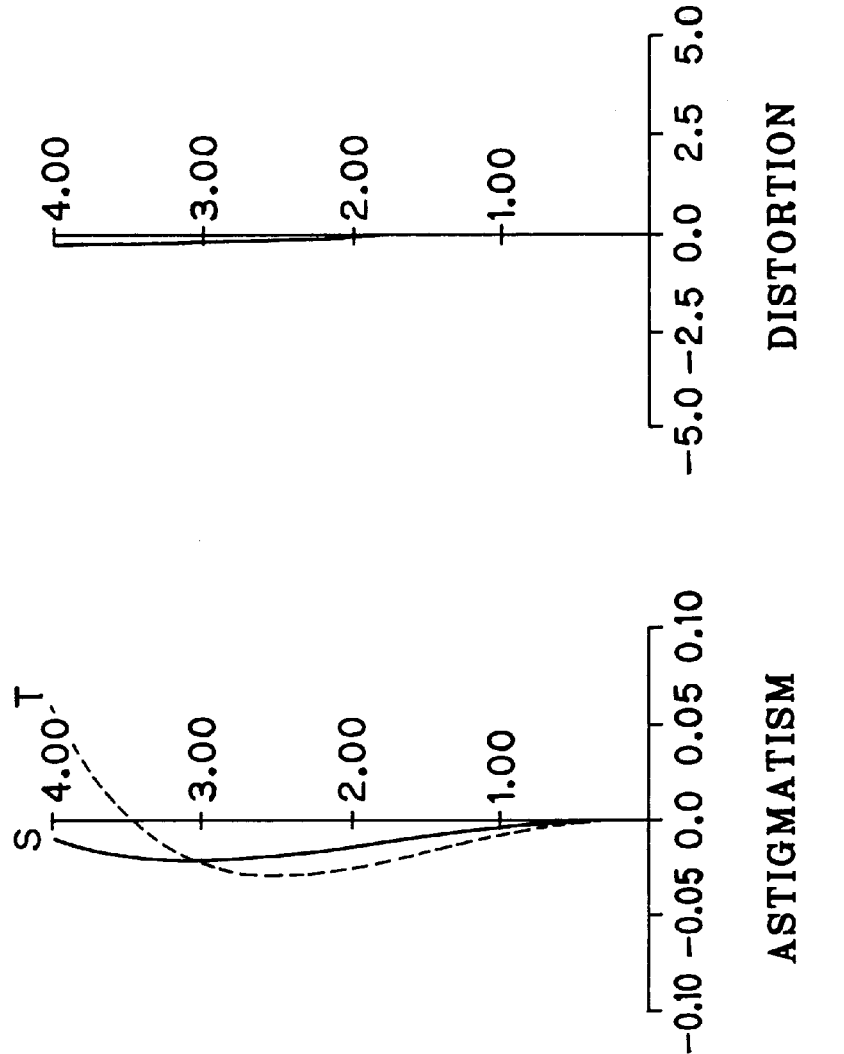
Figure 11A:
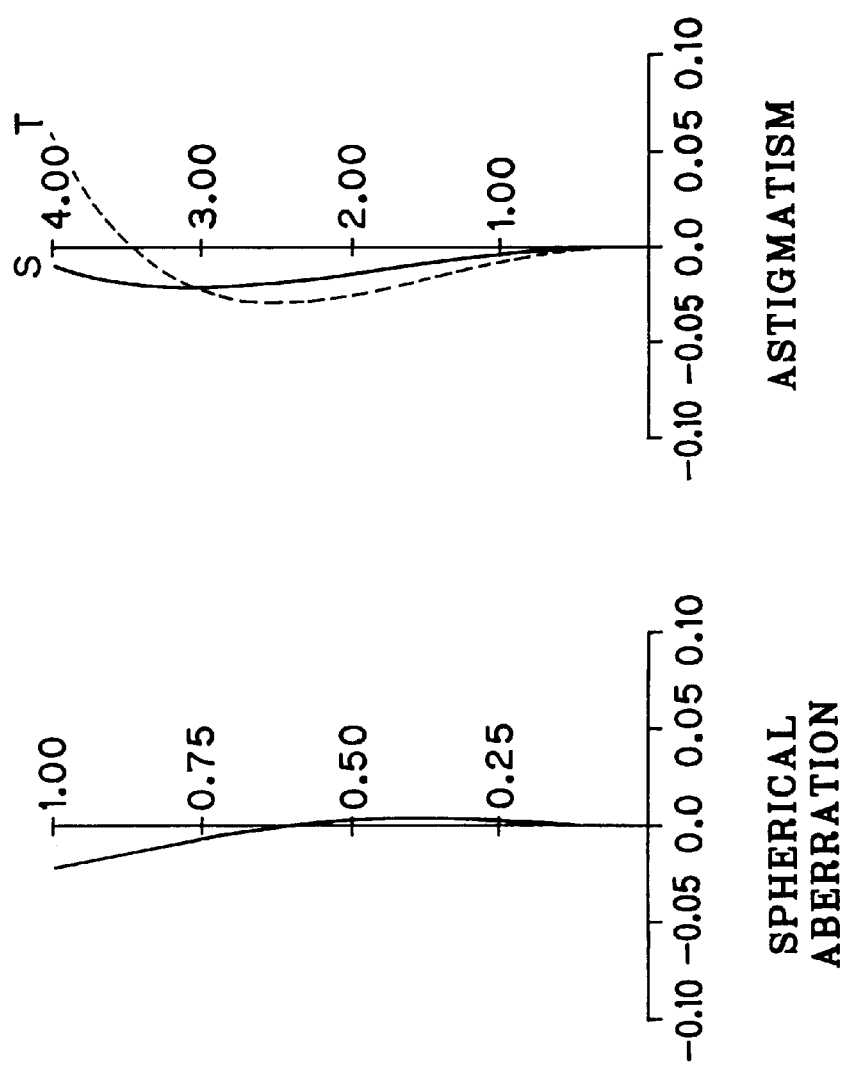
Figure 14C:
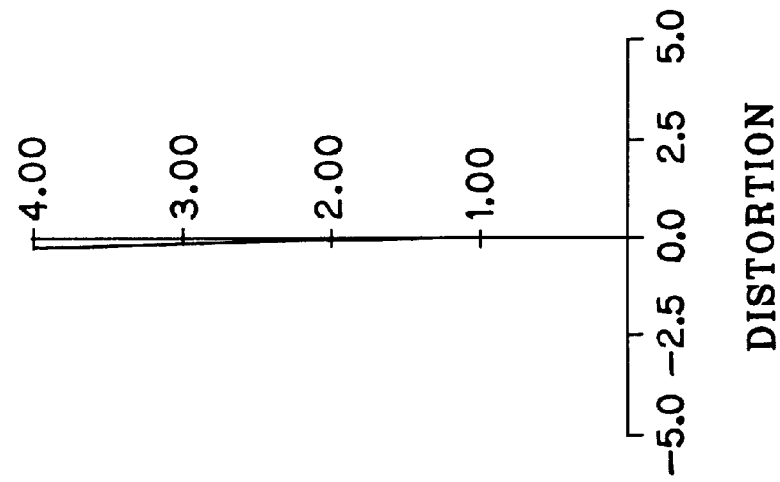
FIGS. 14A, 14B and 14C show aberration curves of the zoom lens of the second example in a position where the zoom lens is focused on the near subject at the telephoto terminal.
Figure 14B:
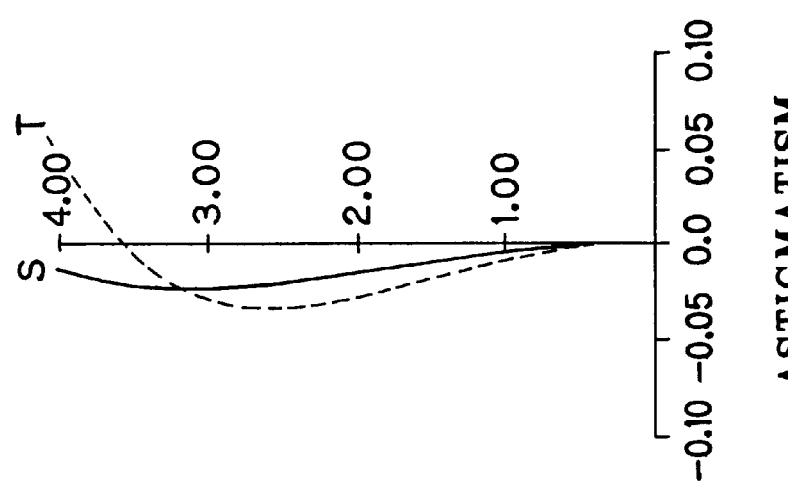
Figure 14A:
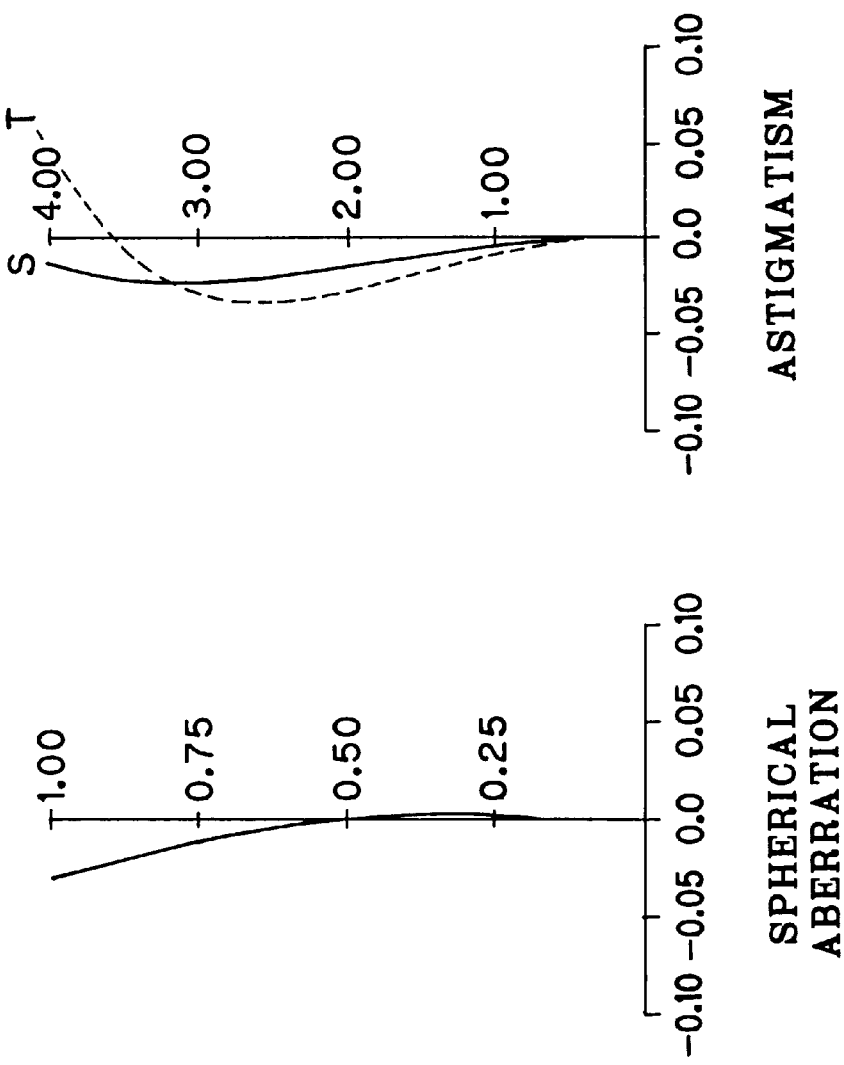

According to the second example shown in FIGS. 8A, 8B and 8C, a zoom lens 5 is composed of a front lens group 10, a rear lens group 20 including a stop 35, and a parallel glass plate 30. The front lens group 10 is composed of a meniscus negative lens 11 whose object side surface is convex, and a positive lens 12 whose object side surface is convex, arranged in this order from the object side. The rear lens group 20 of the zoom lens 5 of the second example is composed of a positive lens 22 whose opposite surfaces are convex, a negative lens 23 whose opposite surfaces are concave, and a positive lens 25 whose opposite surfaces are convex, arranged in this order from the object side. The stop 35 is located on the object side of the positive lens 22. To focus the zoom lens 5, only the rearmost positive lens 25 is moved on an optical axis of the zoom lens 5.

Numerical values for the second example are as set forth below. Table 4 shows lens data of the second example.

fW=6.91068288897 fT=13.7492800137 fF=−18.031960105 fR=11.2207017691 ff=28.8890513082

FW=3.8

FT=4.7

ωW=30.1°

ωT=16.2°

TABLE 4

| i | Ri | Di | Ni | ν |
|---|---|---|---|---|
| 1* | 17.92282 | 0.800000 | 1.806104 | 40.73 |
| 2 | 5.91626 | 3.106986 | | |
| 3 | 7.50599 | 1.885743 | 1.803701 | 25.12 |
| 4 | 9.58776 | 16.106595** | | |
| 5 | STOP | 1.920920 | | |
| 6 | 4.47326 | 2.302781 | 1.766277 | 48.35 |
| 7 | −23.91380 | 0.391185 | | |
| 8* | −37.05972 | 0.800000 | 1.806450 | 24.40 |
| 9* | 5.37284 | 6.454154** | | |
| 10 | 19.87692 | 1.598789 | 1.549100 | 51.10 |
| 11 | −78.09830 | 0.974673** | | |
| 12 | ∞ | 2.900000 | 1.516800 | 64.17 |
| 13 | ∞ | | | |

Aspherical coefficients for the second example are shown in Table 5.

TABLE 5

| i | 1 | 8 | 9 |
|---|---|---|---|
| K | 0.062688 | 0.002297 | 0.005156 |
| A | 0.105326E−03 | −0.739471E−03 | 0.303835E−02 |
| B | 0.859420E−07 | −0.526376E−04 | 0.134683E−03 |
| C | 0.245358E−07 | −0.757457E−06 | 0.261054E−04 |
| D | 0.000000E+00 | 0.000000E+00 | 0.000000E+00 |

The surface distance D4 between the front lens group 10 and the rear lens group 20, the surface distance D9 between the negative lens 23 and the rearmost positive lens 25 of the rear lens group 20, and the surface distance D11 between the rear lens group 20 and the parallel glass plate 30 vary according to the zooming position as well as the focusing position of the zoom lens 5 as shown in Table 6. In Table 6 W, M and T respectively represent the wide-angle terminal, the middle focal length position and the telephoto terminal; INF represents an infinity focusing position where the zoom lens 5 is focused on infinity; and NEAR represents a near range focusing position where the zoom lens 5 is focused on a subject placed 500 mm distant from the zoom lens 5.

TABLE 6

| | | D4 | D9 | D11 | βf |
|---|---|---|---|---|---|
| INF | W | 16.10659 | 6.45415 | 0.97467 | 0.8386 |
| | M | 6.38314 | 6.45415 | 3.11298 | 0.7646 |
| | T | 1.54433 | 6.45415 | 5.23011 | 0.6913 |
| NEAR | W | 16.10659 | 6.14064 | 1.28558 | 0.8278 |
| | M | 6.38314 | 5.95247 | 3.61017 | 0.7474 |
| | T | 1.54433 | 5.74784 | 5.93037 | 0.6671 |

According to the second example, $ff/fR = 28.8890513082/11.2207017691 \approx 2.57$ $0.6671 \leq \beta f \leq 0.8386$ $r1/r2 = R10/R11$
$= 19.87692/(−78.09830) \approx −0.25$ $d/fW = D9/fW$
$= 6.45415/6.91068288897 \approx 0.93$ Therefore, the second example satisfies the conditions (1) to (4):

$0.5 < ff/fR < 5.0$     (1)

$0.01 < \beta f < 1.00$     (2)

$-1.0 \leq r1/r2 \leq 0.3$     (3)

$0.3 \leq d/fW \leq 1.5$     (4)

Aberration curves of the zoom lens 5 of the second example in the infinity focusing position at the wide-angle terminal, at the middle focal length position and at the telephoto terminal are shown in FIGS. 9A to 9C, 10A to 10C and 11A to 11C respectively. Aberration curves of the zoom lens 5 of the second example in the near range focusing position at the wide-angle terminal, at the middle focal length position and at the telephoto terminal are shown in FIGS. 12A to 12C, 13A to 13C and 14A to 14C respectively.

EXAMPLE 3

Figure 15A:
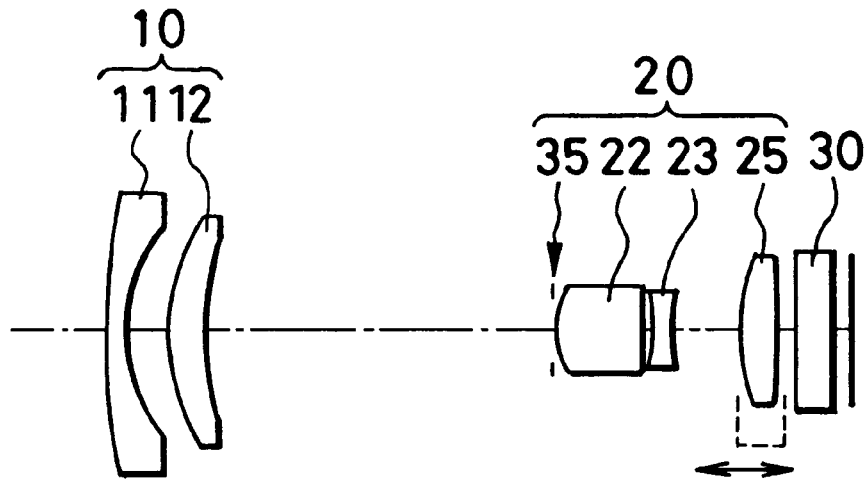
FIGS. 15A, 15B and 15C show a zoom lens according to a third example of the invention at a wide-angle terminal, a middle focal length position and a telephoto terminal respectively.
Figure 15B:
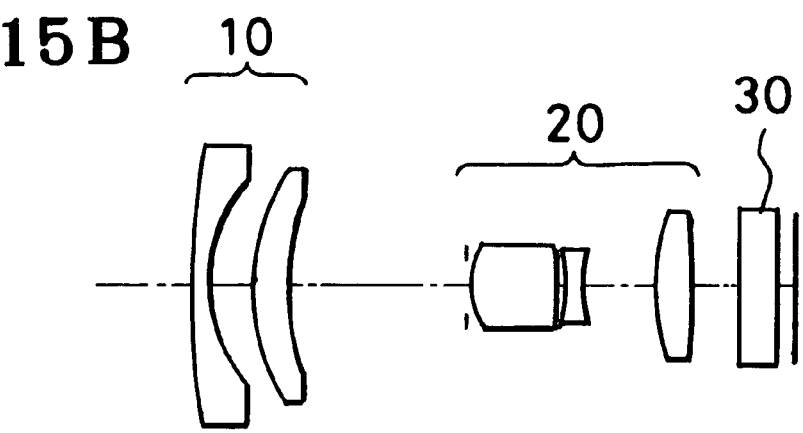
Figure 15C:
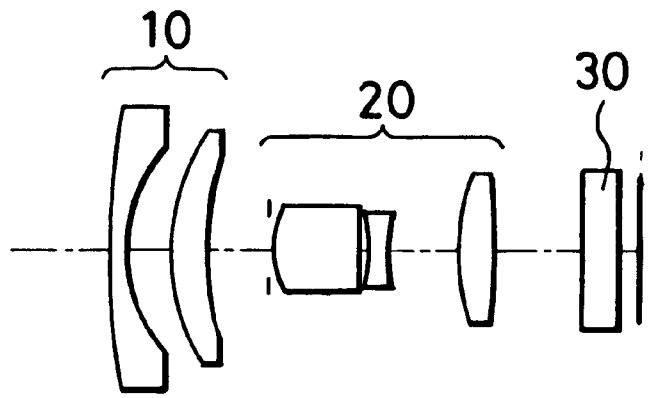
Figure 16A:
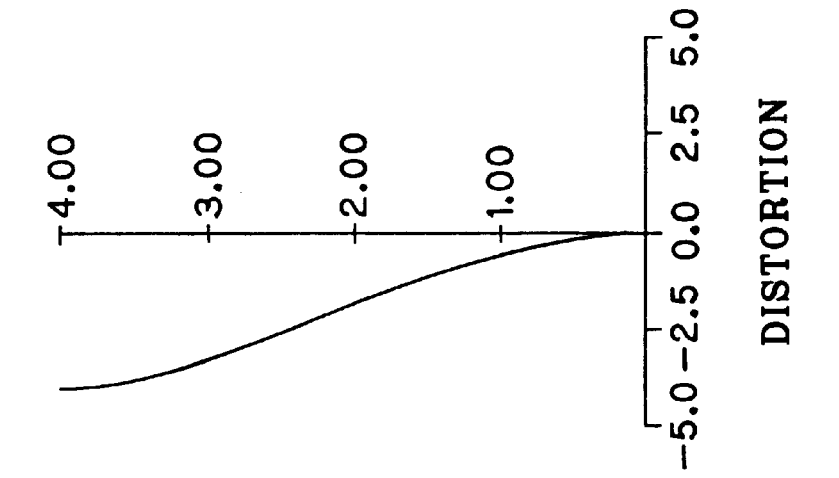
FIGS. 16A, 16B and 16C show aberration curves of the zoom lens of the third example in a position where the zoom lens is focused on infinity at the wide-angle terminal.
Figure 16B:
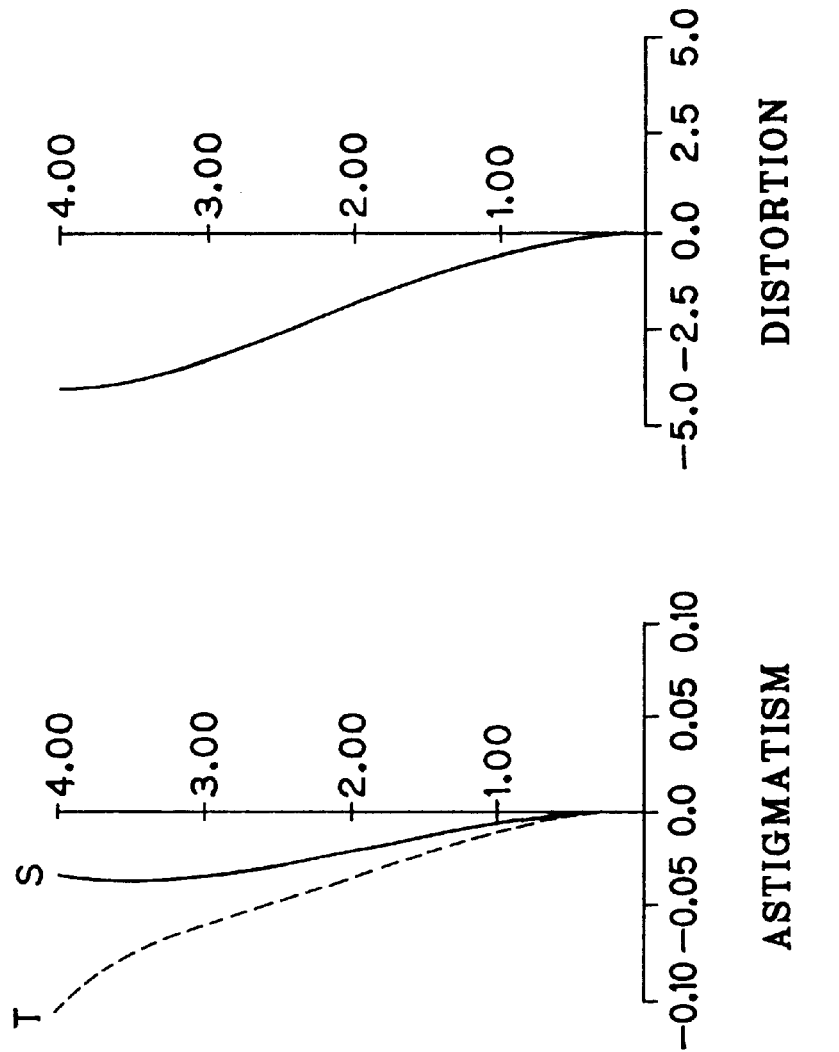
Figure 16C:
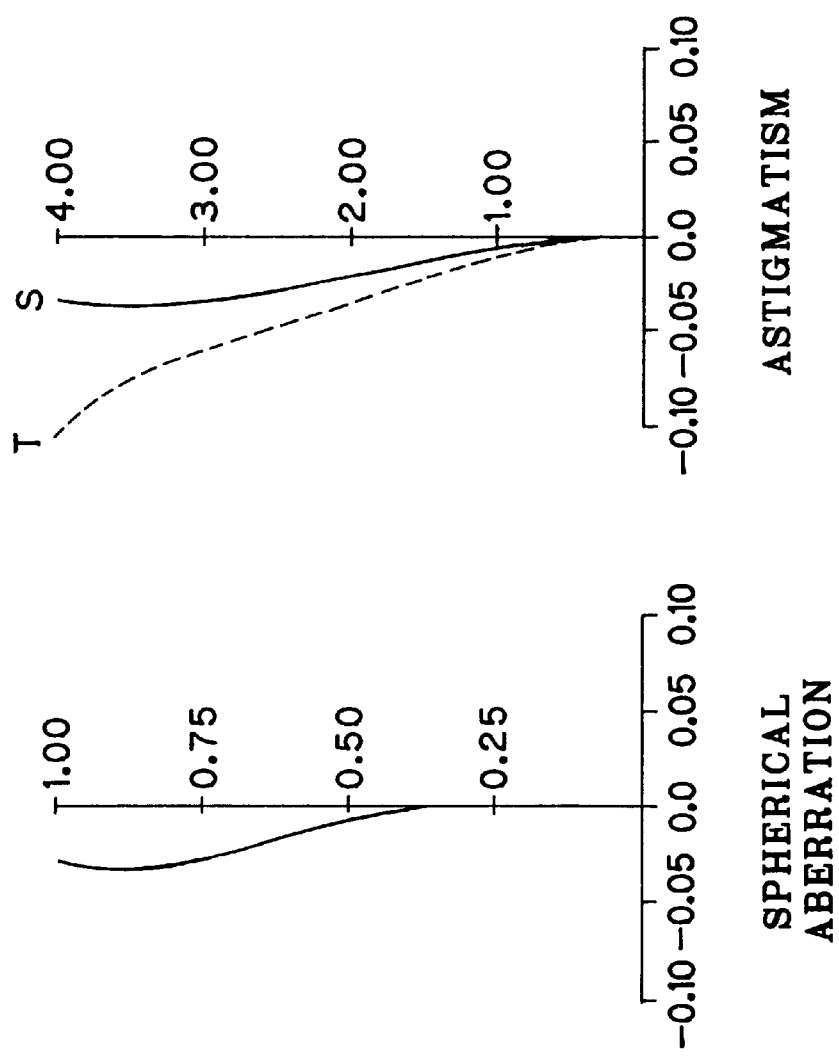
Figure 19C:
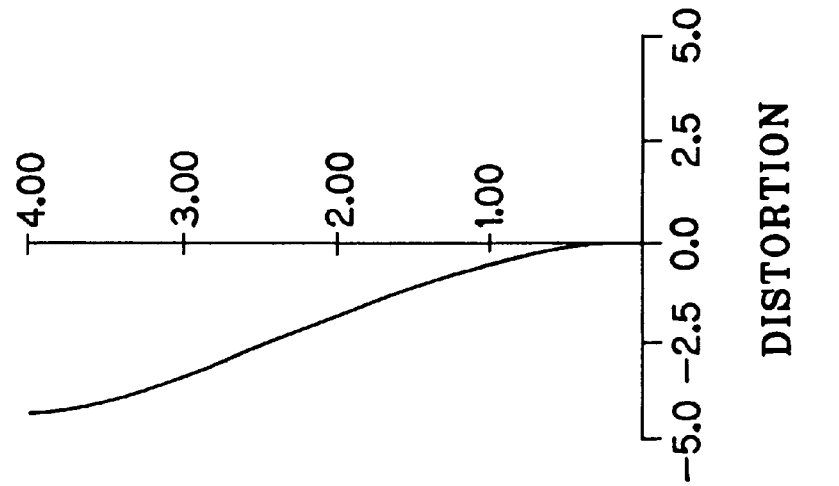
FIGS. 19A, 19B and 19C show aberration curves of the zoom lens of the third example in a position where the zoom lens is focused on the near subject at the wide-angle terminal.
Figure 19B:
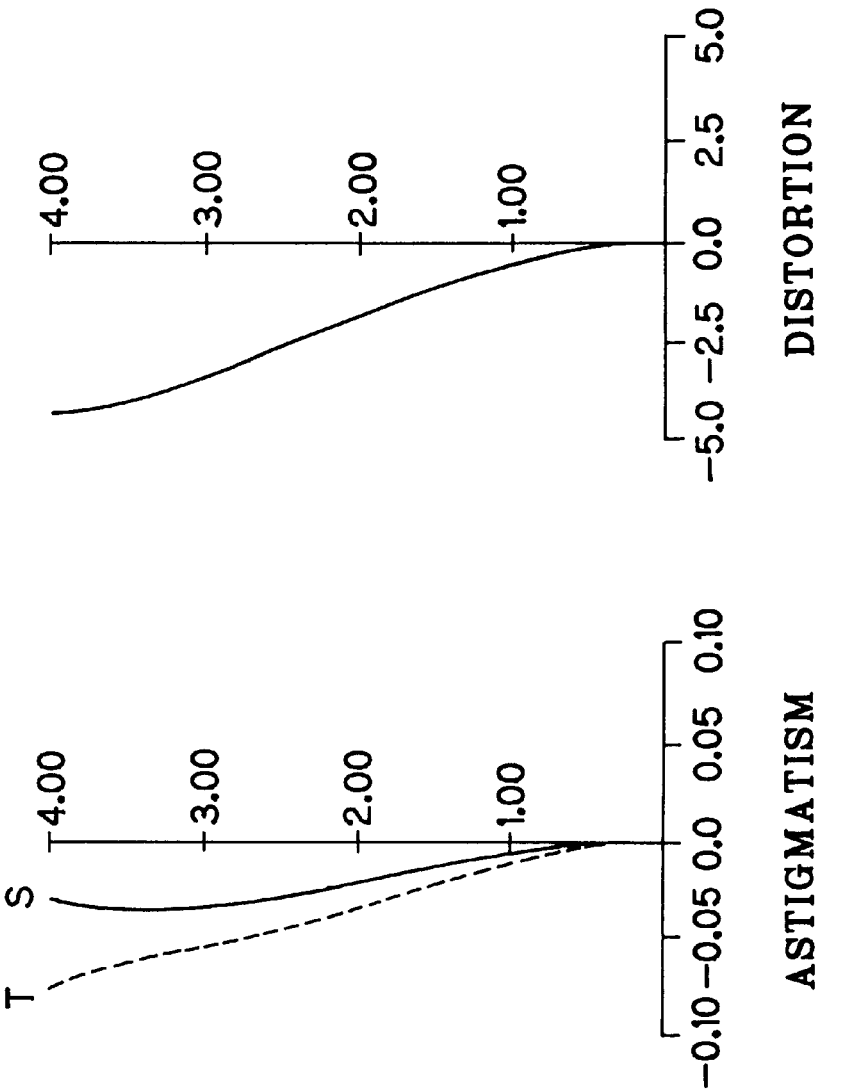
Figure 19A:
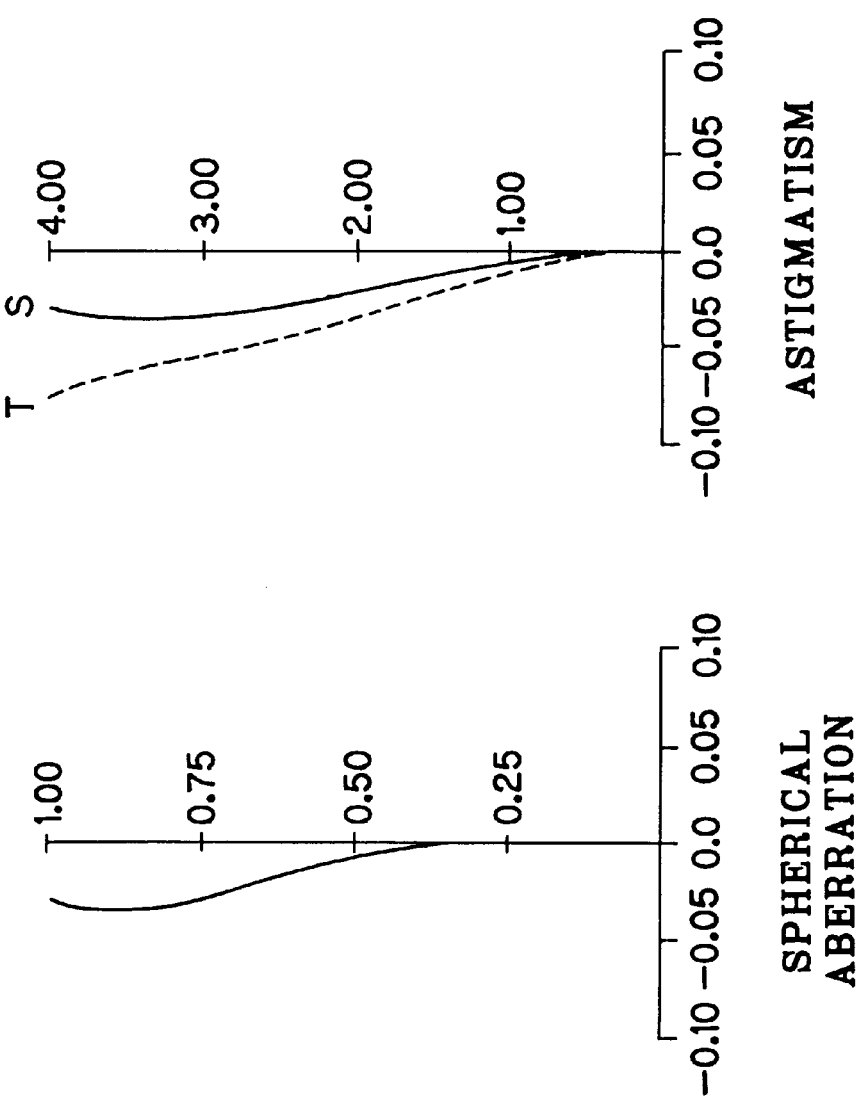
Figure 20C:
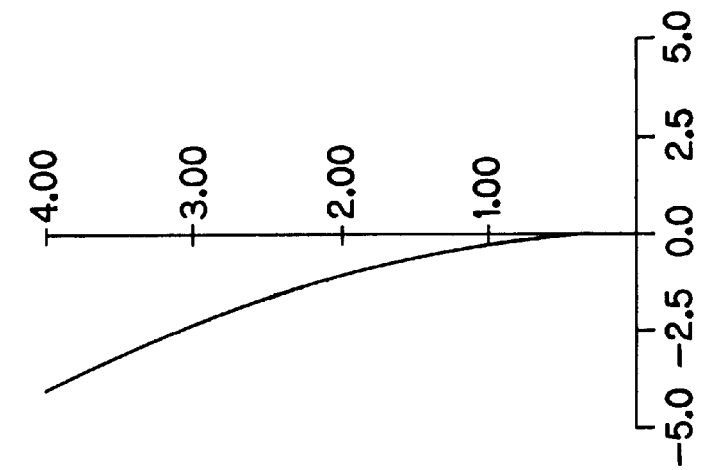
FIGS. 20A, 20B and 20C show aberration curves of the zoom lens of the third example in a position where the zoom lens is focused on the near subject at the middle focal length position.
Figure 20B:
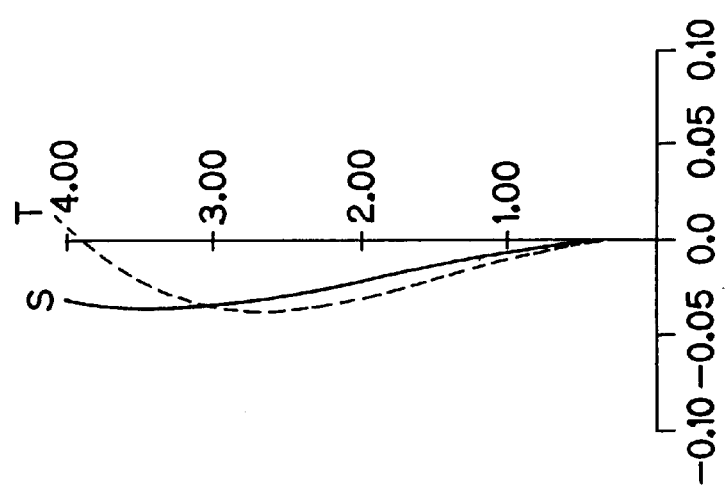
Figure 20A:
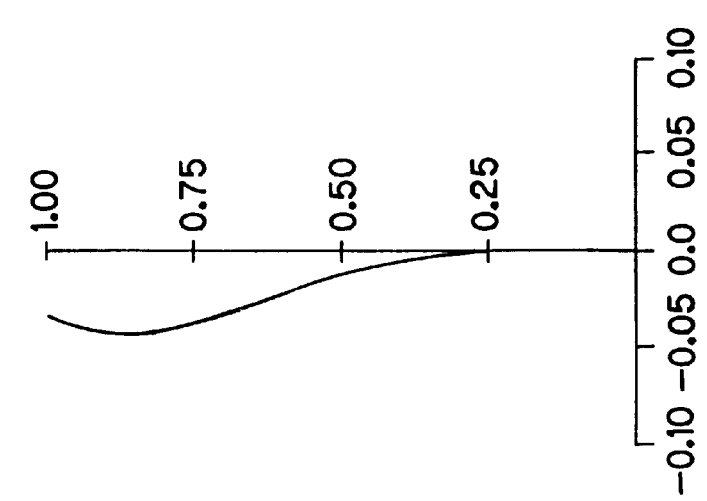

FIGS. 15A to 15C show a zoom lens 5 according to a third example of the present invention. The third example has the same lens construction as the second example. For focusing, only the rearmost positive lens 25 is moved on the optical axis.

Numerical values of the third example are as set forth below. Table 7 shows lens data of the third example.
fW=6.45927747561
fT=12.8782544418
fF=−18.3056925722
fR=11.3877644801
ff=12.5463922717
FW=4.0
FT=4.9
ωW=31.7°
ωT=17.3°

TABLE 7

| i | Ri | Di | Ni | ν |
|---|---|---|---|---|
| 1* | 69.80119 | 1.000000 | 1.804200 | 46.50 |
| 2 | 8.49340 | 2.410246 | | |
| 3 | 11.56729 | 2.054898 | 1.846660 | 23.80 |
| 4 | 16.96132 | 19.684101** | | |
| 5 | STOP | 0.200000 | | |
| 6* | 4.38995 | 4.971531 | 1.691196 | 53.22 |
| 7* | −15.84793 | 0.400921 | | |
| 8 | −7.99712 | 1.000000 | 1.846660 | 23.80 |
| 9 | 7.06382 | 3.981090** | | |
| 10 | 11.16281 | 2.198045 | 1.765872 | 43.47 |
| 11 | −65.67787 | 1.000000** | | |
| 12 | ∞ | 2.300000 | 1.516000 | 64.10 |
| 13 | ∞ | | | |

Aspherical coefficients of the third example are as shown in Table 8.

TABLE 8

| i | 1 | 6 | 7 |
|---|---|---|---|
| K | −0.073232 | 0.308006 | −1.707609 |
| A | 0.538199E−04 | −0.582135E−03 | 0.381186E−02 |
| E | 0.136522E−06 | 0.235505E−04 | 0.475326E−03 |
| C | −0.348150E−10 | −0.953787E−05 | −0.403714E−04 |
| D | 0.190786E−11 | 0.526313E−06 | 0.127667E−04 |

The surface distance D4 between the front lens group 10 and the rear lens group 20, the surface distance D9 between the negative lens 23 and the rearmost positive lens 25 of the rear lens group 20, and the surface distance D11 between the rear lens group 20 and the parallel glass plate 30 vary according to the zooming position as well as the focusing position of the zoom lens 5, as shown in Table 9, In Table 9 W, M and T respectively represent the wide-angle terminal, the middle focal length position and the telephoto terminal; INF represents an infinity focusing position where the zoom lens 5 is focused on infinity; and NEAR represents a near range focusing position where the zoom lens 5 is focused on a subject placed 500 mm distant from the zoom lens 5.

TABLE 9

|      |   | D4       | D9      | D11     | βf     |
|------|---|----------|---------|---------|--------|
| INF  | W | 19.68410 | 3.98109 | 1.00000 | 0.6441 |
|      | M | 10.09022 | 3.98109 | 2.69982 | 0.5086 |
|      | T | 3.59805  | 3.98109 | 4.99317 | 0.3258 |
| NEAR | W | 19.68410 | 3.84235 | 1.13806 | 0.6331 |
|      | M | 10.09022 | 3.75870 | 2.92151 | 0.4909 |
|      | T | 3.59805  | 3.61528 | 5.35863 | 0.2967 |

According to the third example, $ff/fR = 12.5463922717/11.3877644801 \approx 1.10$ $0.2967 \leq \beta f \leq 0.6441$ $r1/r2 = R10/R11$
$= 11.16281/(-65.67787) \approx -0.17$ $d/fW = D9/fW$
$= 3.98109/6.45927747561 \approx 0.62$ Therefore, the third example satisfies the conditions (1) to (4).

Aberration curves of the zoom lens 5 of the third example in the infinity focusing position at the wide-angle terminal, at the middle focal length position and at the telephoto terminal are shown in FIGS. 16A to 16C, 17A to 17C and 18A to 18C respectively. Aberration curves of the zoom lens 5 of the second example in the near range focusing position at the wide-angle terminal, at the middle focal length position and at the telephoto terminal are shown in FIGS. 19A to 19C, 20A to 20C and 21A to 21C respectively.

EXAMPLE 4

Figure 22A:
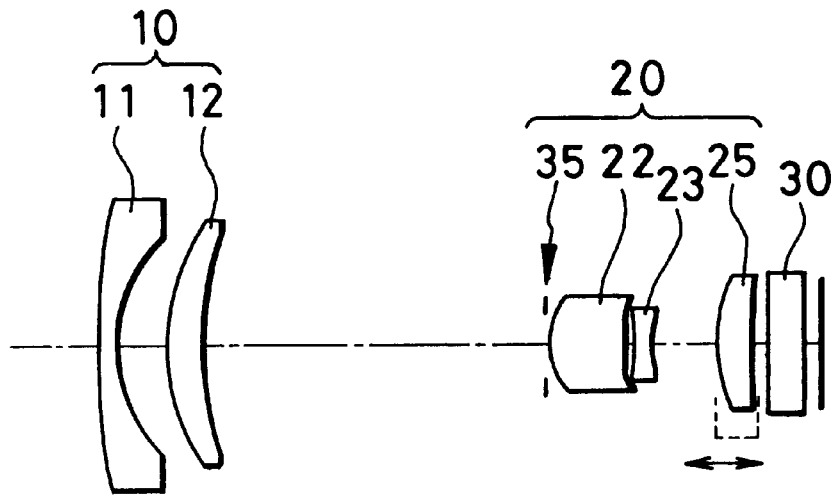
FIGS. 22A, 22B and 22C show a zoom lens according to a fourth example of the invention at a wide-angle terminal, a middle focal length position and a telephoto terminal respectively.
Figure 22B:
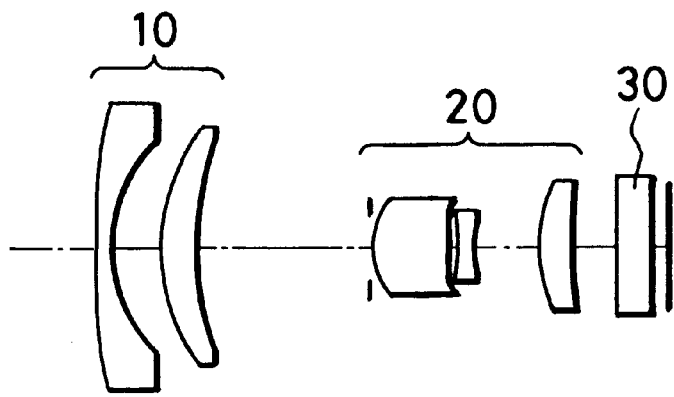
Figure 22C:
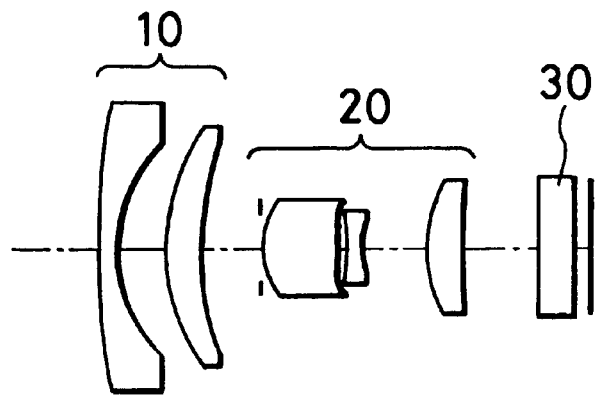
Figure 23C:
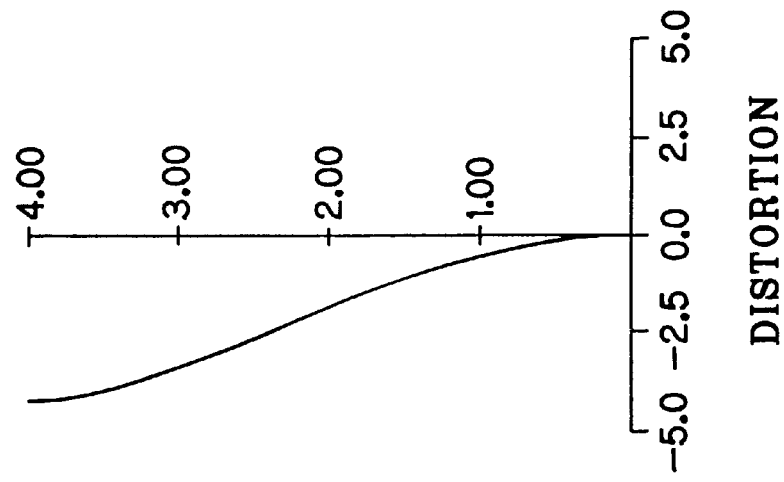
FIGS. 23A, 23B and 23C show aberration curves of the zoom lens of the fourth example in a position where the zoom lens is focused on infinity at the wide-angle terminal.
Figure 23B:
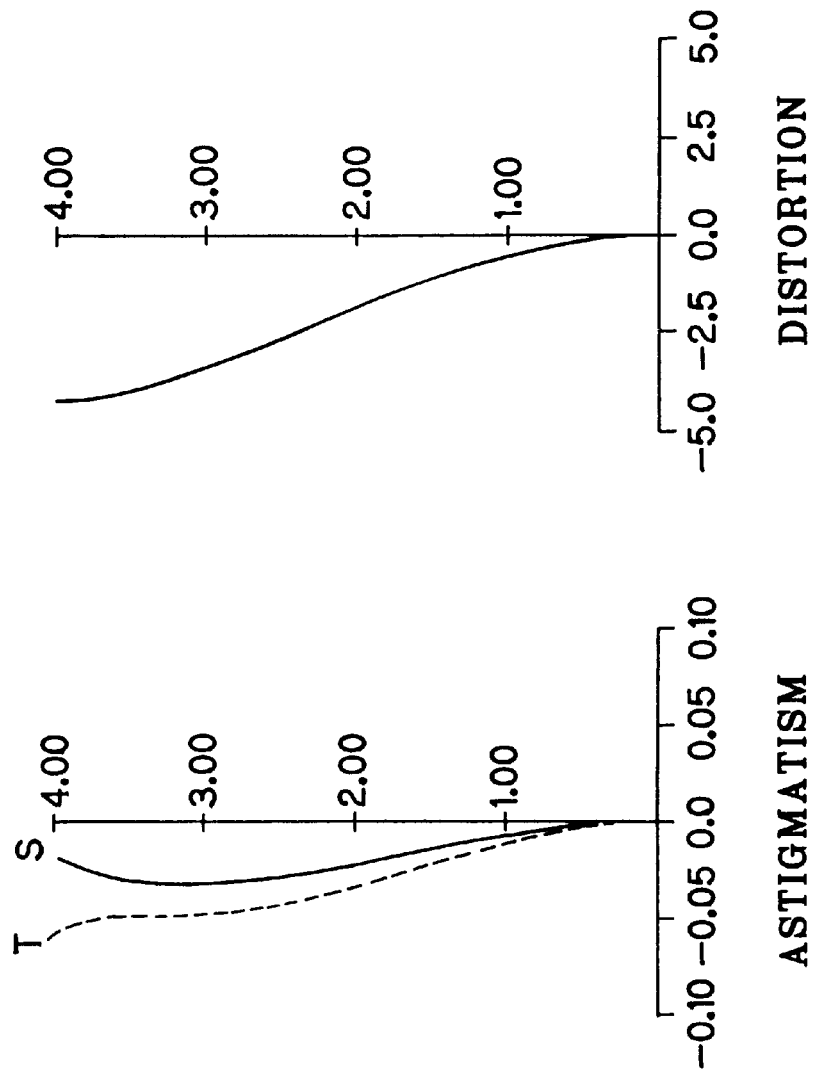
Figure 23A:
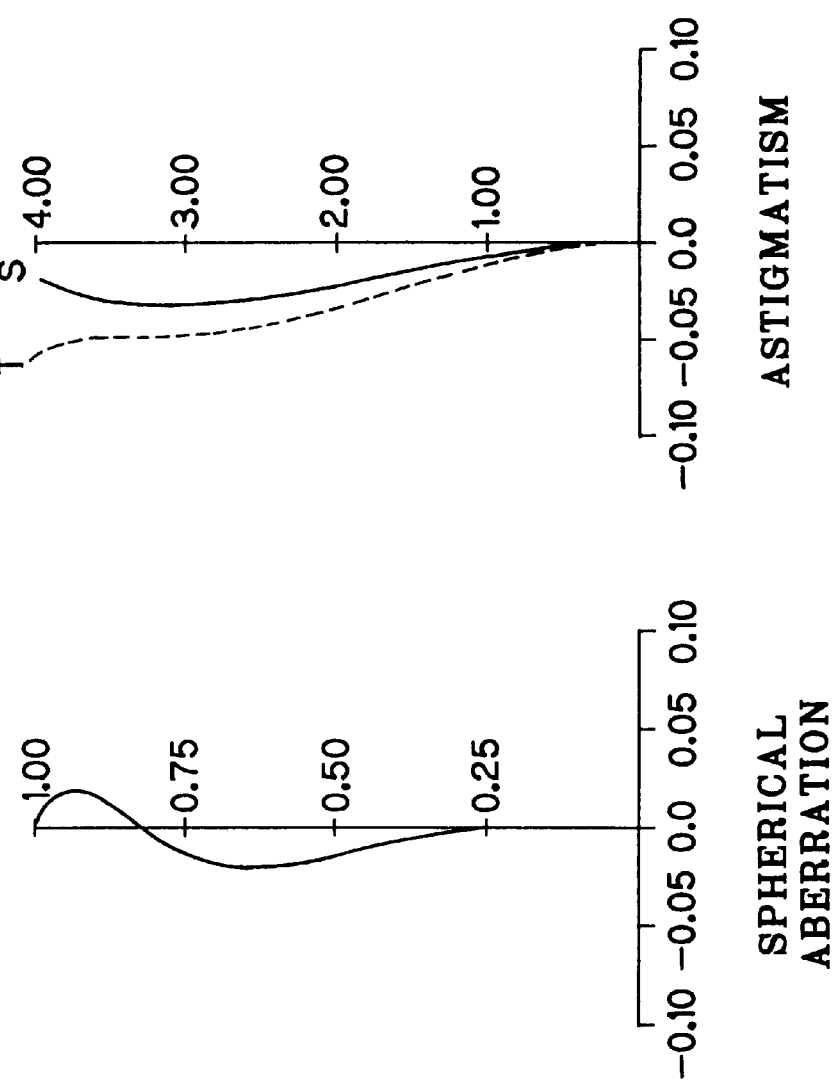
Figure 24C:
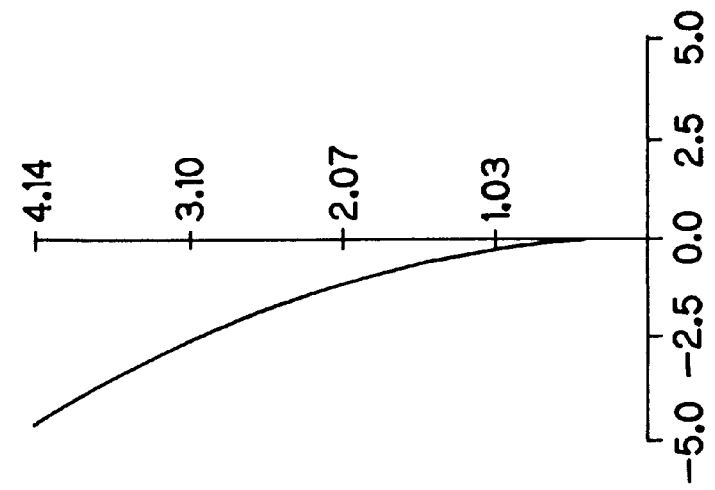
FIGS. 24A, 24B and 24C show aberration curves of the zoom lens of the fourth example in a position where the zoom lens is focused on infinity at the middle focal length position.
Figure 24B:
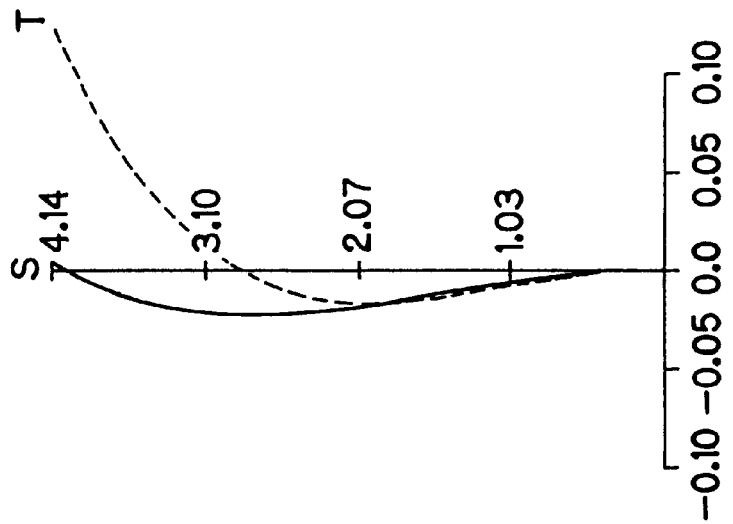
Figure 24A:
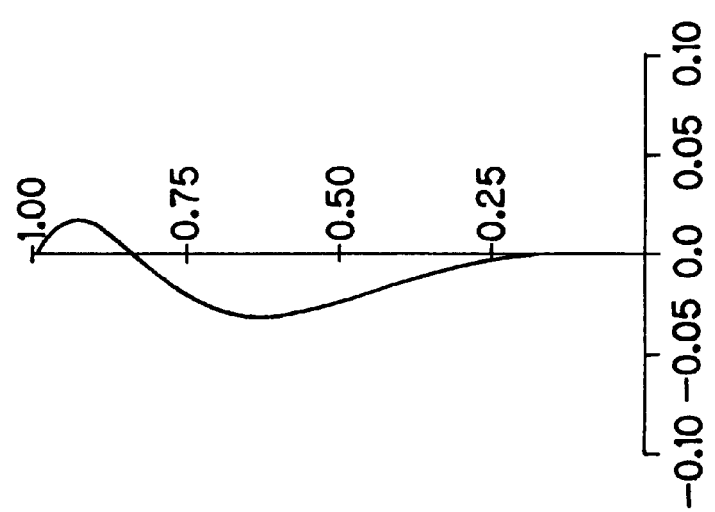
Figure 25C:
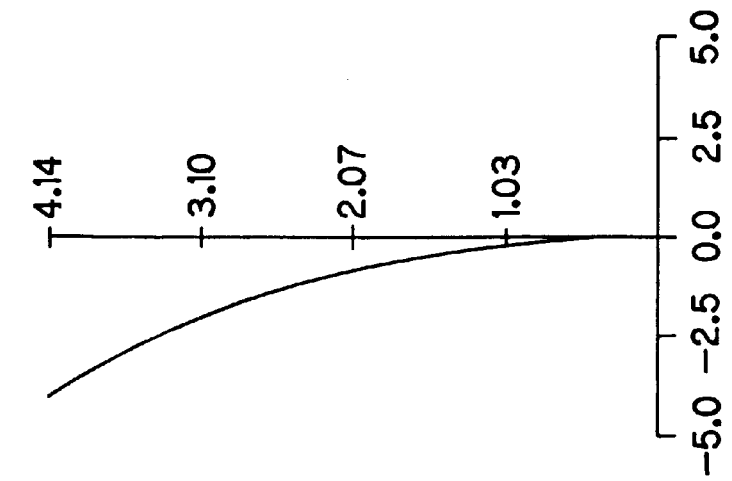
FIGS. 25A, 25B and 25C show aberration curves of the zoom lens of the fourth example in a position where the zoom lens is focused on infinity at the telephoto terminal.
Figure 25B:
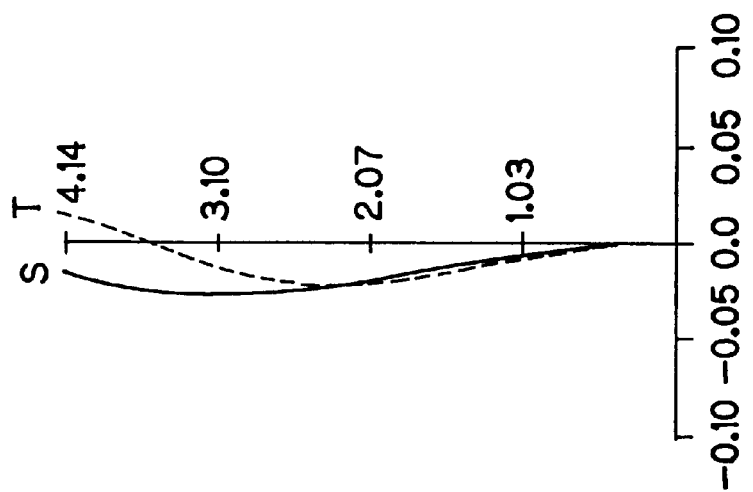
Figure 25A:
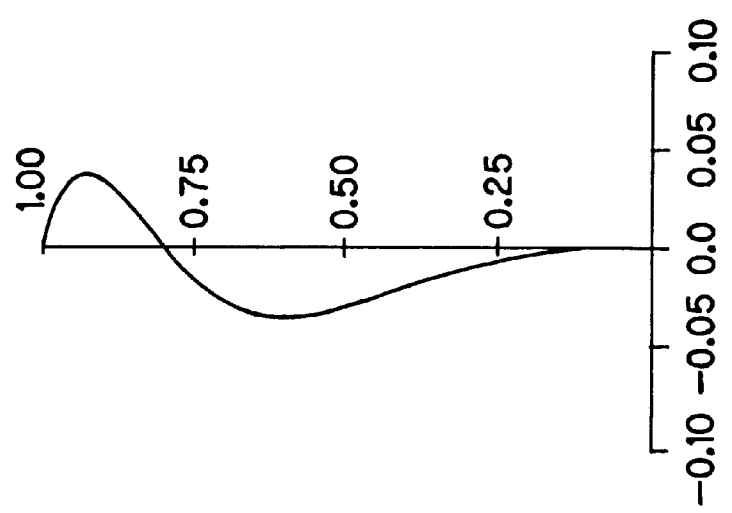
Figures 27A, 27B, 27C:
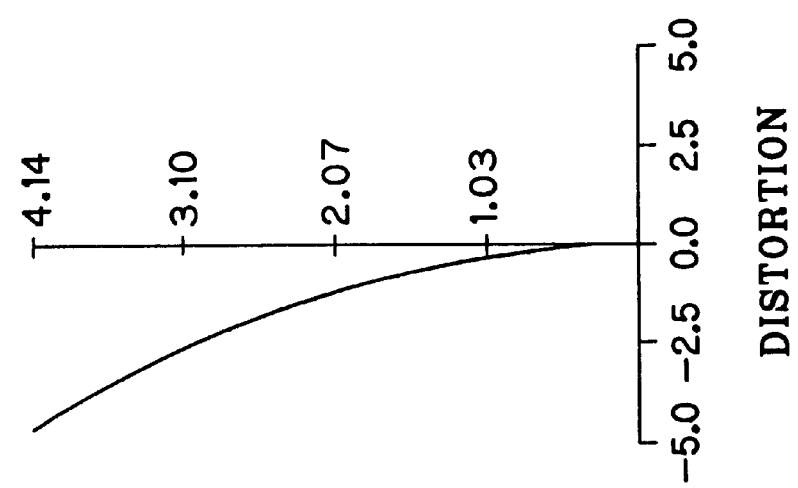
FIGS. 27A, 27B and 27C show aberration curves of the zoom lens of the fourth example in a position where the zoom lens is focused on the near subject at the middle focal length position.
Figure 28C:
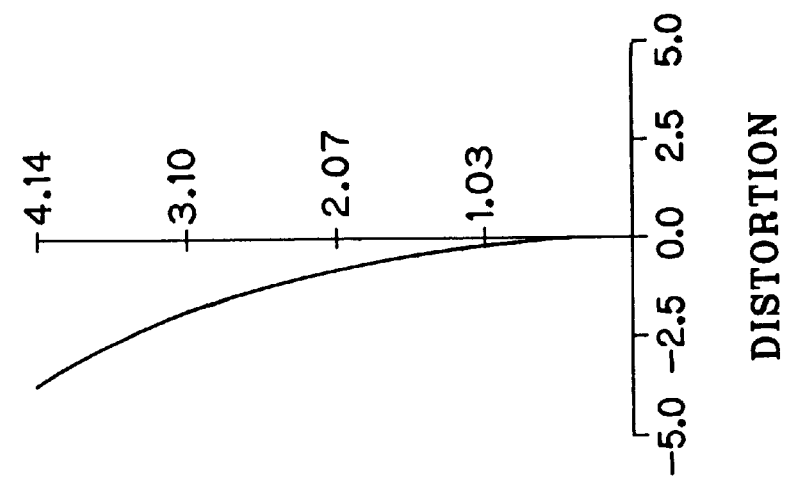
FIGS. 28A, 28B and 28C show aberration curves of the zoom lens of the fourth example in a position where the zoom lens is focused on the near subject at the telephoto terminal.
Figure 28B:
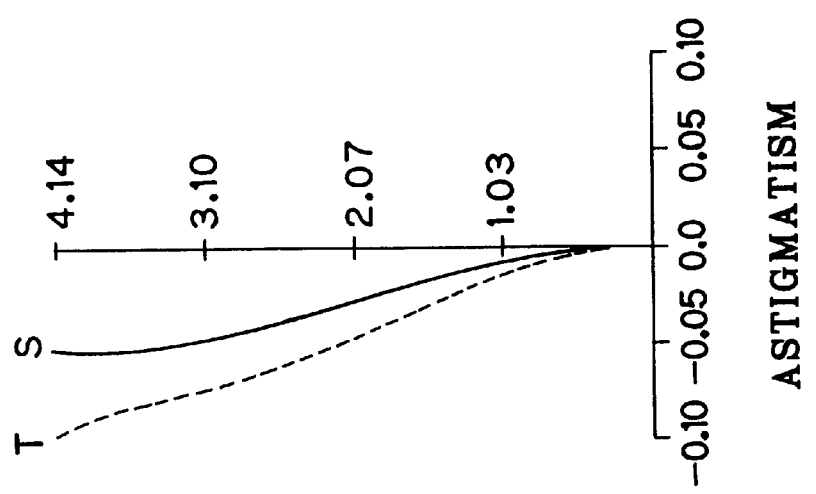
Figure 28A:
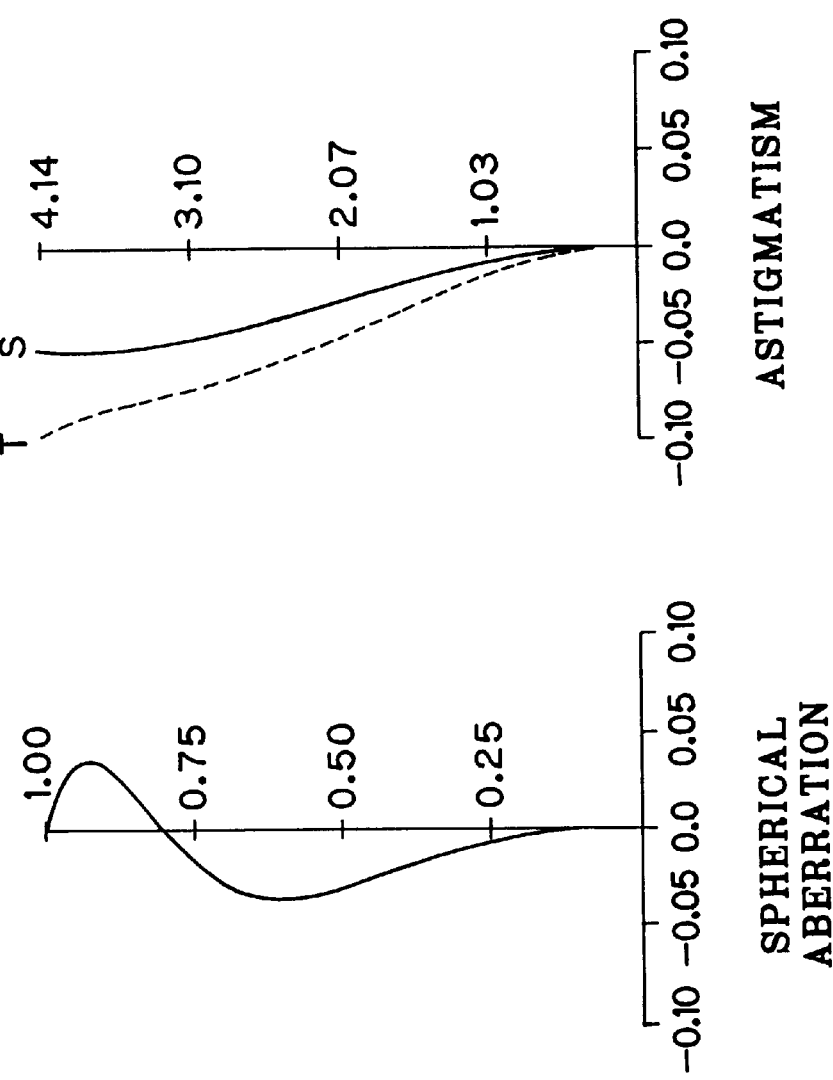

FIGS. 22A, 22B and 22C show a zoom lens 5 according a fourth example of the present invention, wherein a front lens group 10 is composed of a meniscus negative lens 11 whose object side surface is convex, and a positive lens 12 whose object side surface is convex, arranged in this order from the object side, whereas a rear lens group 20 is composed of a positive lens 22 whose opposite surfaces are convex, a negative lens 23 whose opposite surfaces are concave, and a positive lens 25 whose object side surface is convex, arranged in this order from the object side. A stop 35 is located on the object side of the positive lens 22. To focus the zoom lens 5, only the rearmost positive lens 25 is moved on an optical axis of the zoom lens 5.

Numerical values for the fourth example are as set forth below. Table 10 shows lens data of the fourth example.

fW=6.4576554989
fT=12.8878039532
fF=−20.2830191705
fR=11.2000344087
ff=15.1090519247
FW=3.1
FT=3.8
ωW=31.8°
ωT=17.8°

TABLE 10

| i   | Ri       | Di          | Ni       | ν     |
|-----|----------|-------------|----------|-------|
| 1*  | 91.72368 | 1.000000    | 1.804200 | 46.50 |
| 2   | 9.19127  | 2.973668    |          |       |
| 3   | 12.47048 | 2.155528    | 1.846660 | 23.80 |
| 4   | 19.05040 | 21.150474** |          |       |
| 5   | STOP     | 0.200000    |          |       |
| 6*  | 4.57962  | 4.758498    | 1.679690 | 54.17 |
| 7*  | −15.84793| 0.447248    |          |       |
| 8   | −14.67994| 1.000000    | 1.846660 | 23.80 |
| 9   | 5.70119  | 3.971179**  |          |       |
| 10  | 9.01692  | 2.116799    | 1.694861 | 39.64 |
| 11  | 55.70163 | 1.000000**  |          |       |
| 12  | ∞        | 2.300000    | 1.516000 | 64.10 |
| 13  | ∞        |             |          |       |

Aspherical coefficients of the fourth example are as shown in Table 11.

TABLE 11

| i | 1            | 6             | 7             |
|---|--------------|---------------|---------------|
| K | −0.023356    | 0.297869      | −0.493209     |
| A | 0.461270E−04 | −0.609241E−03 | 0.305335E−02  |
| B | 0.132652E−06 | 0.311555E−04  | 0.484476E−03  |
| C | −0.525054E−09| −0.908983E−05 | −0.919806E−04 |
| D | 0.427477E−11 | 0.529995E−06  | 0.138207E−04  |

The surface distance D4 between the front lens group 10 and the rear lens group 20, the surface distance D9 between the negative lens 23 and the rearmost positive lens 25 of the rear lens group 20, and the surface distance D11 between the rear lens group 20 and the parallel glass plate 30 vary according to the zooming position as well as the focusing position of the zoom lens 5 as shown in Table 12. In Table 12 W, M and T respectively represent the wide-angle terminal, the middle focal length position and the telephoto terminal; INF represents an infinity focusing position where the zoom lens 5 is focused on infinity; and NEAR represents a near range focusing position where the zoom lens 5 is focused on a subject placed 500 mm distant from the zoom lens 5.

TABLE 12

|      |   | D4       | D9      | D11     | βf     |
|------|---|----------|---------|---------|--------|
| INF  | W | 21.15047 | 3.97118 | 1.00000 | 0.6763 |
|      | M | 10.68957 | 3.97118 | 2.50912 | 0.5764 |
|      | T | 3.59877  | 3.97118 | 4.55065 | 0.4413 |
| NEAR | W | 21.15047 | 3.82156 | 1.14887 | 0.6664 |
|      | M | 10.68957 | 3.72430 | 2.75499 | 0.5601 |
|      | T | 3.59877  | 3.56552 | 4.95532 | 0.4145 |

According to the fourth example, $ff/fR = 15.1090519247/11.2000344087 \approx 1.35$ $0.4145 \leq \beta f \leq 0.6763$ $r1/r2 = R10/R11$
$= 9.01692/(55.70163) \approx 0.16$ $d/fW = D9/fW$
$= 3.97118/6.4576554989 \approx 0.61$ Therefore, the fourth example satisfies the conditions (1) to (4).

Aberration curves of the zoom lens 5 of the fourth example in the infinity focusing position at the wide-angle terminal, at the middle focal length position and at the telephoto terminal are shown in FIGS. 23A to 23C, 24A to 24C and 25A to 25C respectively. Aberration curves of the zoom lens 5 of the second example in the near range focusing position at the wide-angle terminal, at the middle focal length position and at the telephoto terminal are shown in FIGS. 26A to 26C, 27A to 27C and 28A to 28C respectively.

EXAMPLE 5

Figure 29A:
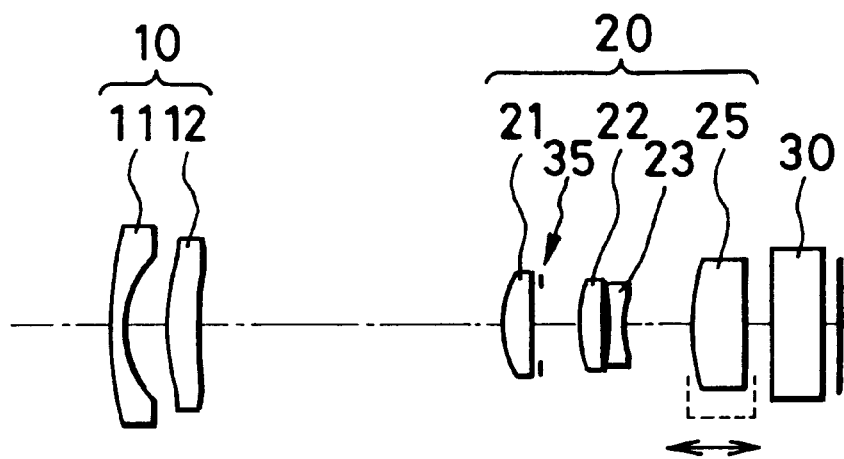
FIGS. 29A, 29B and 29C show a zoom lens according to a fifth example of the invention at a wide-angle terminal, a middle focal length position and a telephoto terminal respectively.
Figure 29B:
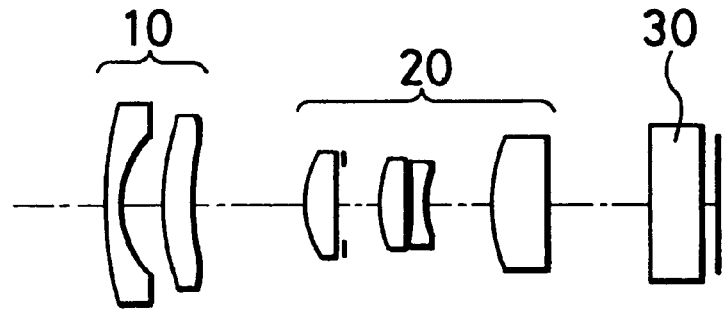
Figure 29C:
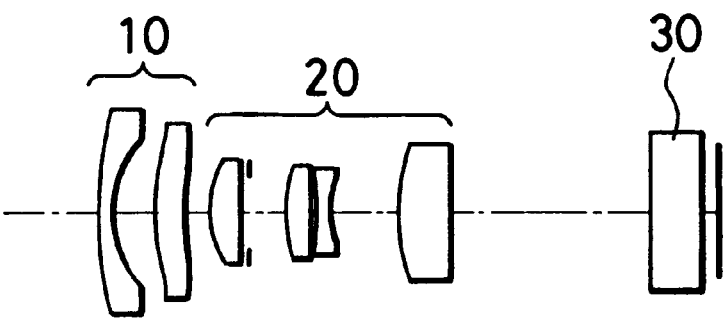
Figure 30C:
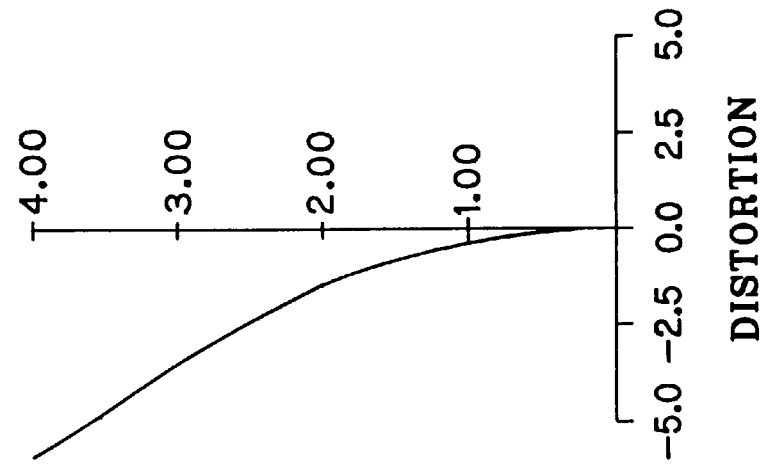
FIGS. 30A, 30B and 30C show aberration curves of the zoom lens of the fifth example in a position where the zoom lens is focused on infinity at the wide-angle terminal.
Figure 30B:
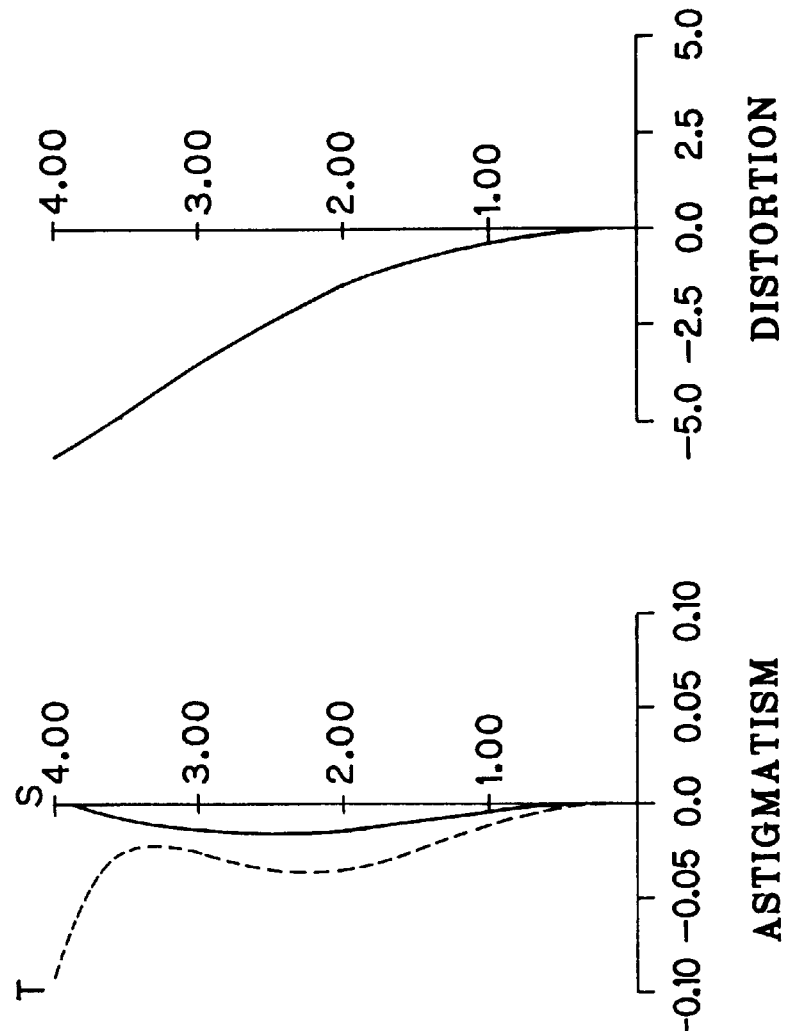
Figure 30A:
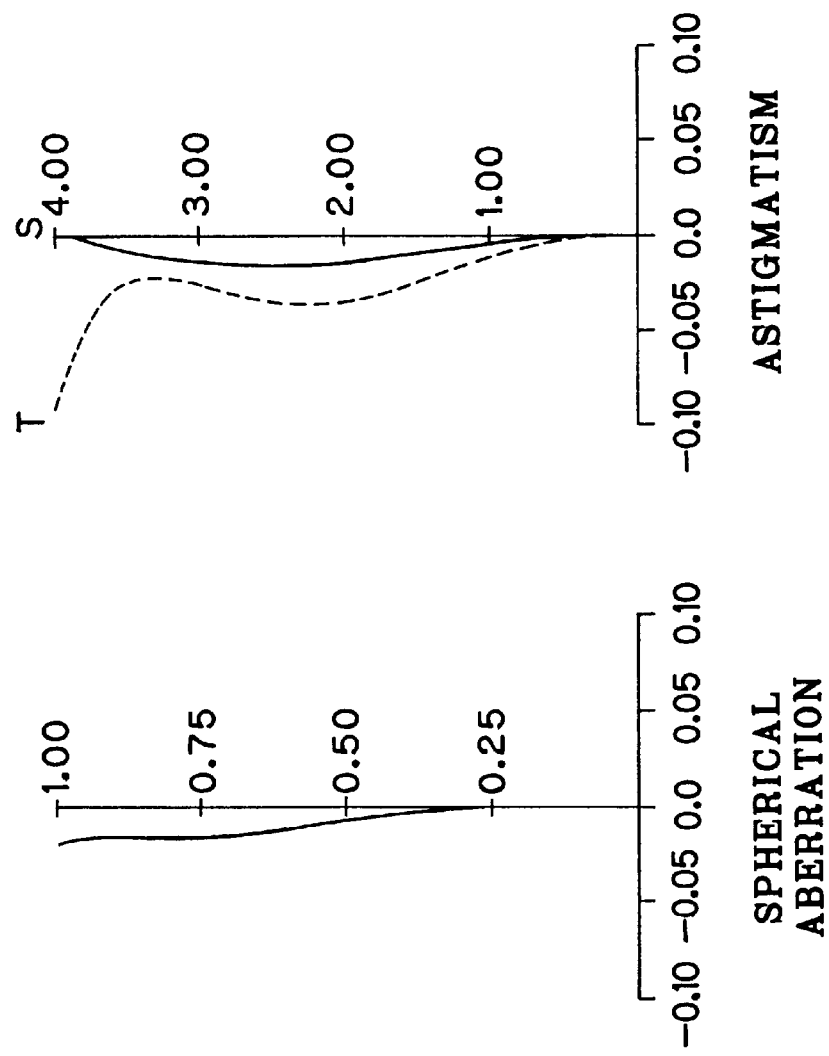
Figures 32A, 32B, 32C:
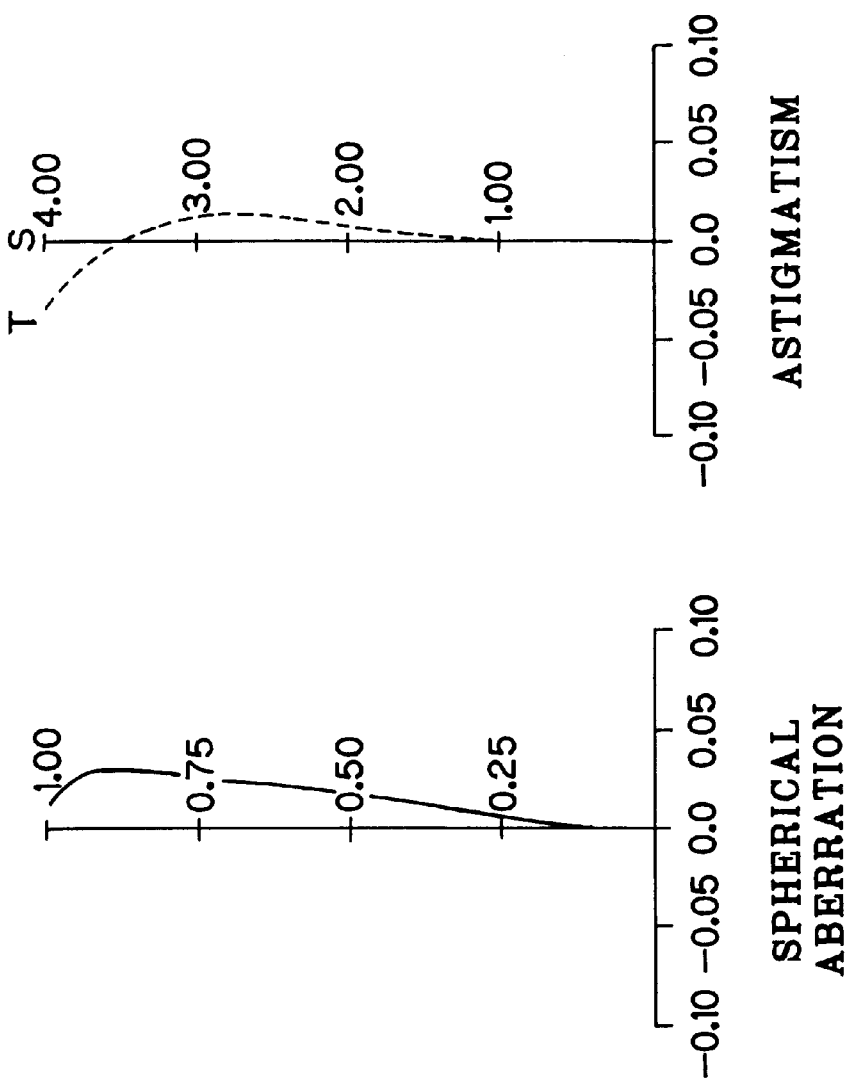
FIGS. 32A, 32B and 32C show aberration curves of the zoom lens of the fifth example in a position where the zoom lens is focused on infinity at the telephoto terminal.
Figures 34A, 34B, 34C:
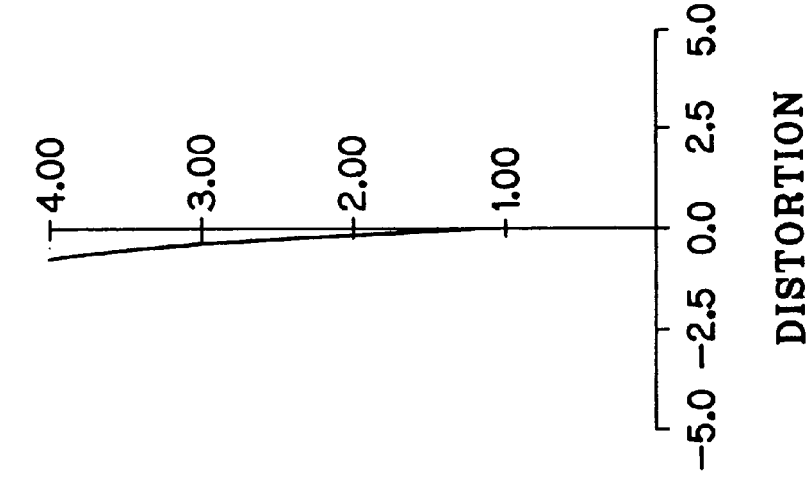
FIGS. 34A, 34B and 34C show aberration curves of the zoom lens of the fifth example in a position where the zoom lens is focused on the near subject at the middle focal length position.
Figure 35A:
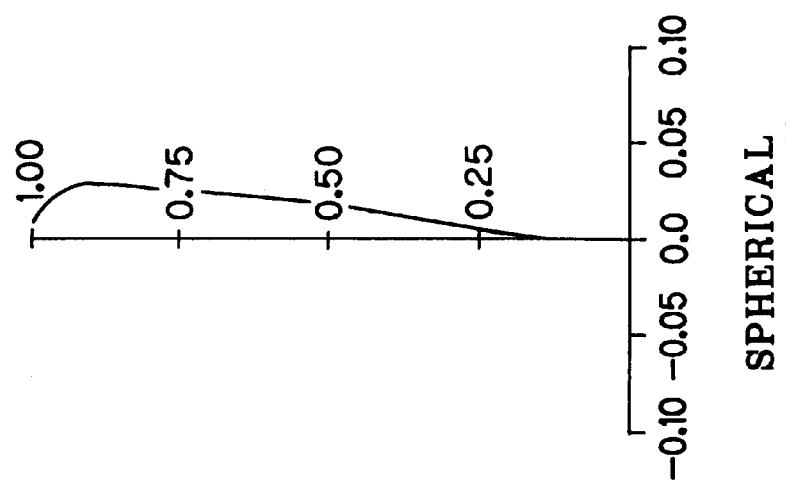
FIGS. 35A, 35B and 35C show aberration curves of the zoom lens of the fifth example in a position where the zoom lens is focused on the near subject at the telephoto terminal.
Figure 35B:
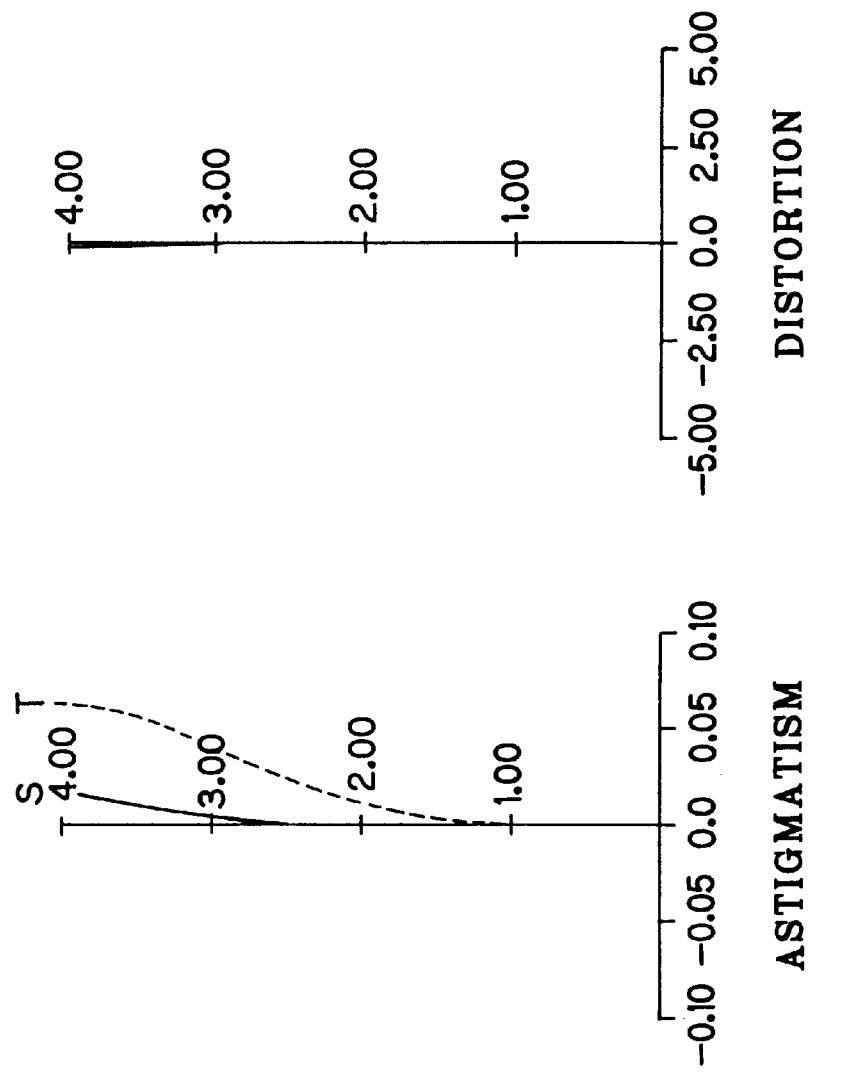
Figure 35C:
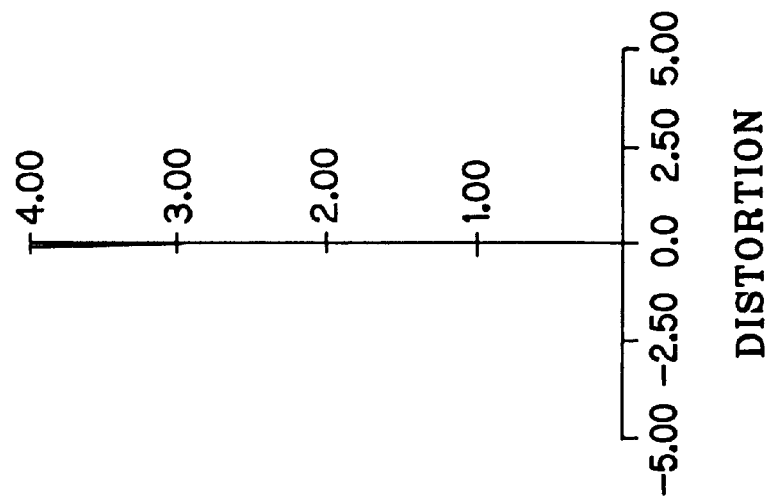

FIGS. 29A to 29C show a zoom lens 5 according to a fifth example of the invention, wherein a front lens group 10 is composed of a meniscus negative lens 11 whose object side surface is convex, and a positive lens 12 whose object side surface is convex, arranged in this order from the object side, whereas a rear lens group 20 is composed of a positive lens 21 whose object side surface is convex, a positive lens 22 whose object side surface is convex, a negative lens 23 whose opposite surfaces are concave, and a positive lens 25 whose opposite surfaces are convex, which are arranged in this order from the object side. The stop 35 is located in between the first and second positive lenses 21 and 22 of the rear lens group 20 from the object side. For focusing, only the rearmost positive lens 25 is moved on the optical axis.

Numerical values of the fifth example are as set forth below. Table 13 shows lens data of the fifth example.

fW=6.70300866587
fT=18.7313921996
fF=−14.469713375
fR=11.6807804558
ff=17.5523236077
FW=3.5
FT=5.6
ωW=30.8°
ωT=12.1°

TABLE 13

| i | Ri | Di | Ni | ν |
|---|---|---|---|---|
| 1* | 35.75967 | 0.800000 | 1.804200 | 46.50 |
| 2 | 6.12408 | 2.413288 | | |
| 3* | 10.57.180 | 1.781654 | 1.846660 | 23.80 |
| 4* | 17.28300 | 17.689409** | | |
| 5* | 6.12247 | 1.796105 | 1.598696 | 60.97 |
| 6* | 217.91165 | 0.270118 | | |
| 7 | STOP | 2.229062 | | |
| 8* | 6.75668 | 1.505886 | 1.721780 | 51.00 |
| 9* | 37.21486 | 0.322557 | | |
| 10 | −32.11284 | 0.800000 | 1.846660 | 23.80 |
| 11 | 5.51958 | 3.905364** | | |
| 12* | 13.30602 | 3.086894 | 1.674753 | 31.78 |

TABLE 13-continued

| i | Ri | Di | Ni | ν |
|---|---|---|---|---|
| 13* | −104.66604 | 1.500157** | | |
| 14 | ∞ | 2.900000 | 1.516800 | 64.17 |
| 15 | ∞ | | | |

Aspherical coefficients of the fifth example are as shown in Tables 14 to 16.

TABLE 14

| i | 1 | 3 | 4 |
|---|---|---|---|
| K | 0.011310 | −0.156196 | 0.038156 |
| A | 0.360401E−03 | −0.735250E−03 | −0.771077E−03 |
| B | −0.108100E−04 | 0.280241E−05 | −0.603721E−06 |
| C | 0.207464E−06 | 0.157238E−07 | −0.113844E−06 |
| D | −0.152878E−08 | −0.912428E−08 | −0.434769E−08 |

TABLE 15

| i | 5 | 6 | 8 |
|---|---|---|---|
| K | −0.055479 | −0.000012 | 0.136297 |
| A | −0.486257E−04 | −0.149226E−03 | −0.932601E−03 |
| B | 0.467089E−05 | 0.494609E−05 | −0.473757E−04 |
| C | 0.216689E−06 | 0.183529E−05 | −0.383467E−05 |
| D | −0.110684E−06 | −0.354009E−06 | −0.121256E−05 |

TABLE 16

| i | 9 | 12 | 13 |
|---|---|---|---|
| K | 0.000627 | 0.011900 | −0.000021 |
| A | 0.689030E−04 | 0.168580E−03 | 0.226226E−03 |
| B | −0.468294E−05 | 0.298986E−04 | 0.218076E−04 |
| C | −0.183805E−04 | −0.357074E−05 | −0.216609E−05 |
| D | −0.185506E−06 | 0.156336E−06 | 0.820725E−07 |

The surface distance D4 between the front lens group 10 and the rear lens group 20, the surface distance D11 between the negative lens 23 and the rearmost positive lens 25 of the rear lens group 20, and the surface distance D13 between the rear lens group 20 and the parallel glass plate 30 vary according to the zooming position as well as the focusing position of the zoom lens 5 as shown in Table 17. In Table 17 W, M and T respectively represent the wide-angle terminal, the middle focal length position and the telephoto terminal; INF represents an infinity focusing position where the zoom lens 5 is focused on infinity; and NEAR represents a near range focusing position where the zoom lens 5 is focused on a subject placed 500 mm distant from the zoom lens 5.

TABLE 17

| | | D4 | D11 | D13 | βf |
|---|---|---|---|---|---|
| INF | W | 17.68941 | 3.90536 | 1.50016 | 0.6554 |
| | M | 6.48512 | 3.90536 | 5.82729 | 0.4089 |
| | T | 1.49746 | 3.90536 | 11.21016 | 0.1022 |
| NEAR | W | 17.68941 | 3.75113 | 1.65378 | 0.6467 |
| | M | 6.48512 | 3.56094 | 6.17119 | 0.3893 |
| | T | 1.49746 | 3.18851 | 11.92700 | 0.0614 |

According to the fifth example, $ff/fR = 17.5523236077/11.6807804558 \approx 1.50$ $0.0614 \leq \beta f \leq 0.6554$ $r1/r2 = R12/R13$
$= 13.30602/(-104.66604) \approx -0.13$ $d/fW = D11/fW$
$= 3.90536/6.70300866587 \approx 0.58$ Therefore, the fifth example satisfies the conditions (1) to (4).

Aberration curves of the zoom lens 5 of the fifth example in the infinity focusing position at the wide-angle terminal, at the middle focal length position and at the telephoto terminal are shown in FIGS. 30A to 30C, 31A to 31C and 32A to 32C respectively. Aberration curves of the zoom lens 5 of the second example in the near range focusing position at the wide-angle terminal, at the middle focal length position and at the telephoto terminal are shown in FIGS. 33A to 33C, 34A to 34C and 35A to 35C respectively.

EXAMPLE 6

Figure 36A:
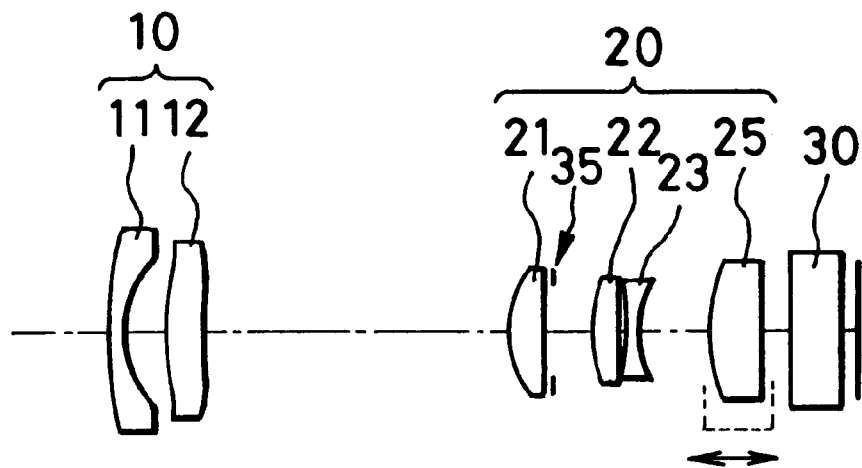
FIGS. 36A, 36B and 36C show a zoom lens according to a sixth example of the invention at a wide-angle terminal, a middle focal length position and a telephoto terminal respectively.
Figure 36B:
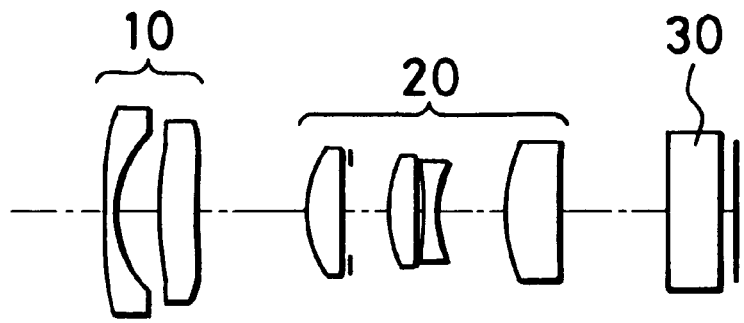
Figure 36C:
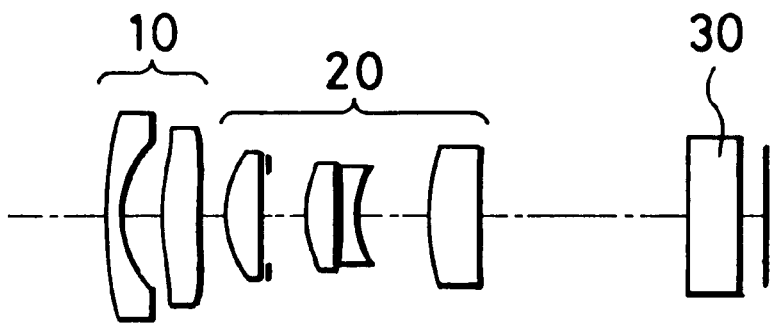
Figure 39C:
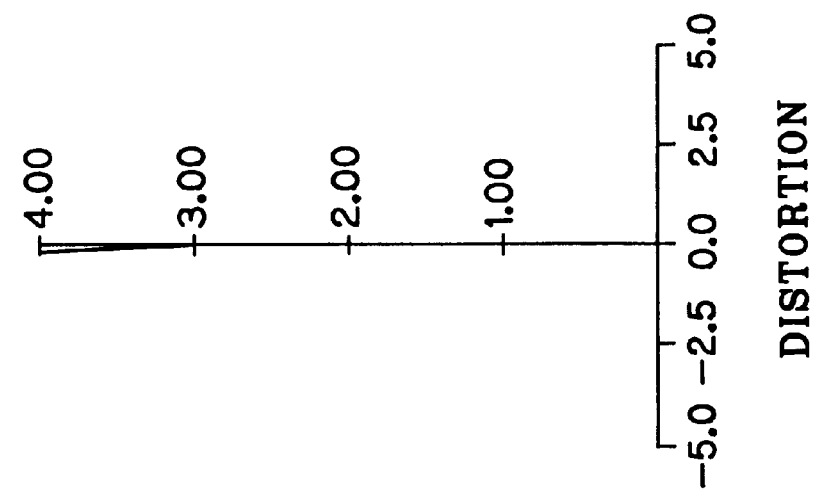
FIGS. 39A, 39B and 39C show aberration curves of the zoom lens of the sixth example in a position where the zoom lens is focused on infinity at the telephoto terminal.
Figure 39B:
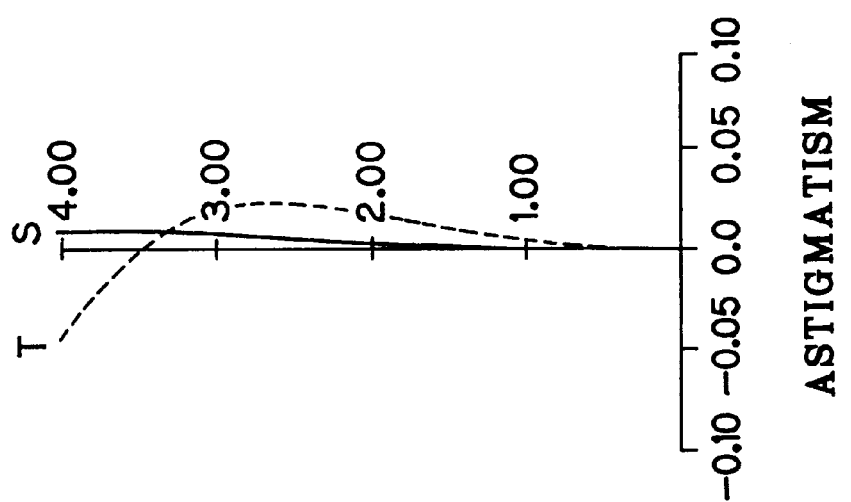
Figure 39A:
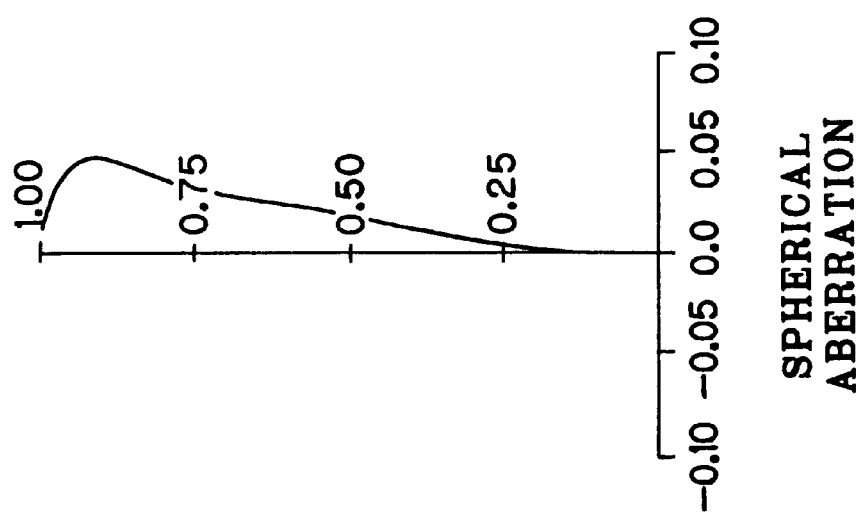
Figures 40B, 40C:
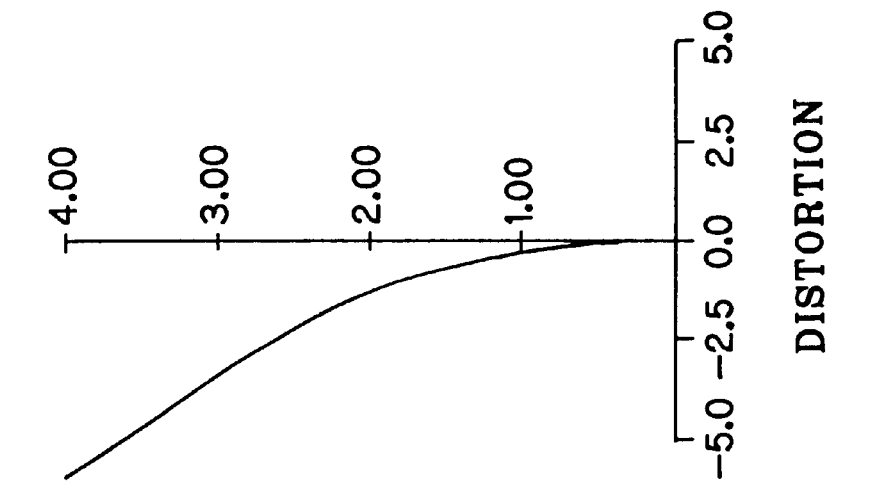
FIGS. 40A, 40B and 40C show aberration curves of the zoom lens of the sixth example in a position where the zoom lens is focused on the near subject at the wide-angle terminal.
Figure 40A:
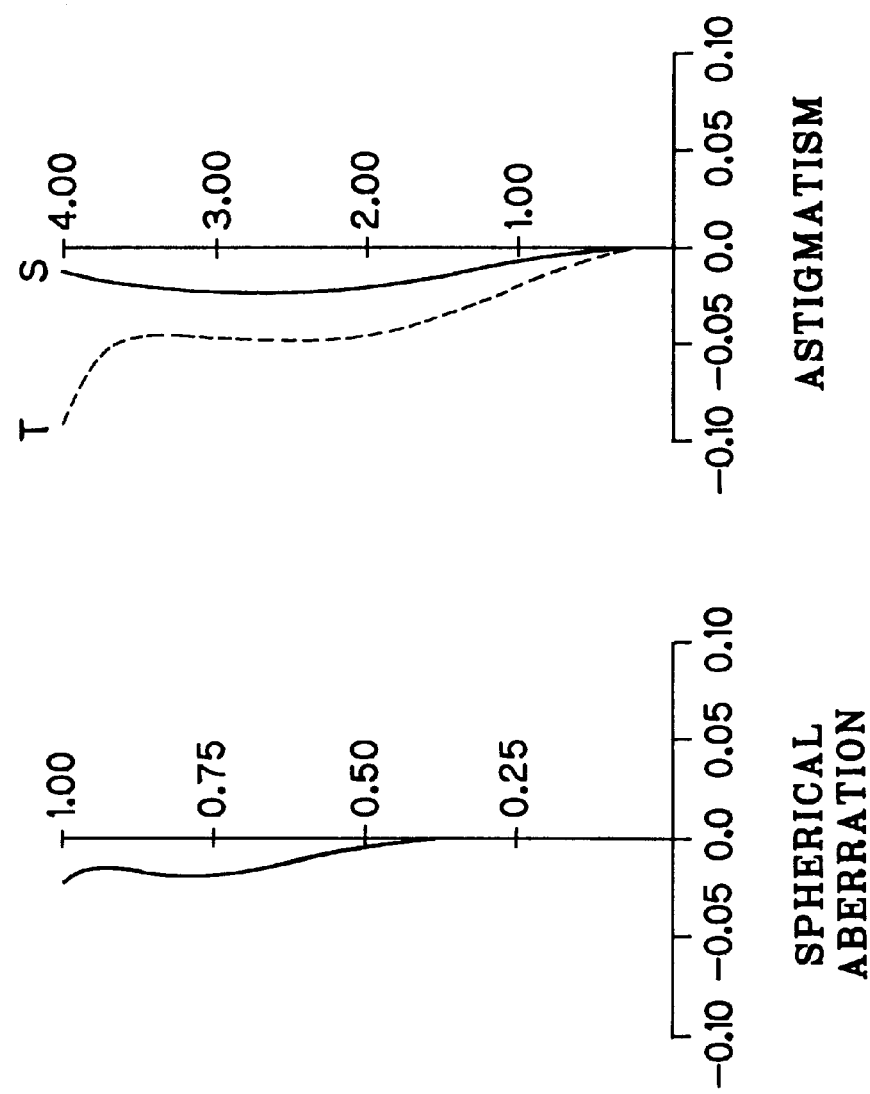

FIGS. 36A to 36C show a zoom lens 5 according to a sixth example of the invention, which has the same lens construction as the fifth example.

Numerical values of the sixth example are as set forth below. Table 18 shows lens data of the sixth example.

fW=6.70612978398
fT=18.6782379317
fF=-14.0588144642
fR=11.6713919436
ff=17.7647119346
FW=2.9
FT=4.7
ωW=30.8°
ωT=12.1°

TABLE 18

| i | Ri | Di | Ni | ν |
|---|---|---|---|---|
| 1* | 41.03035 | 0.800000 | 1.804200 | 46.50 |
| 2 | 6.17918 | 2.328578 | | |
| 3* | 13.34897 | 2.034413 | 1.846660 | 23.80 |
| 4* | 26.66507 | 17.177930** | | |
| 5* | 6.39363 | 2.051355 | 1.595841 | 61.06 |
| 6* | 1731.37898 | 0.200042 | | |
| 7 | STOP | 2.298918 | | |
| 8* | 6.80296 | 1.617210 | 1.716975 | 51.32 |
| 9* | 40.82105 | 0.327082 | | |
| 10 | -37.77417 | 0.800000 | 1.846660 | 23.80 |
| 11 | 5.47070 | 3.948628** | | |
| 12* | 12.71762 | 3.016403 | 1.673289 | 31.90 |
| 13* | -207.35833 | 1.500380** | | |
| 14 | ∞ | 2.900000 | 1.516800 | 64.17 |
| 15 | ∞ | | | |

Aspherical coefficients of the fifth example are as shown in Tables 19 to 21.

TABLE 19

| i | 1 | 3 | 4 |
|---|---|---|---|
| K | 0.017592 | -0.472999 | -0.046049 |
| A | 0.412829E-03 | -0.828729E-03 | -0.857675E-03 |

TABLE 19-continued

| i | 1 | 3 | 4 |
|---|---|---|---|
| B | -0.139883E-04 | 0.627939E-05 | 0.518895E-05 |
| C | 0.265921E-06 | 0.124250E-06 | -0.258998E-06 |
| D | -0.181305E-08 | -0.150934E-07 | -0.276120E-08 |

TABLE 20

| i | 5 | 6 | 8 |
|---|---|---|---|
| K | -0.074618 | -0.609892e-7 | 0.095177 |
| A | -0.606079E-04 | -0.156773E-03 | -0.956957E-03 |
| B | 0.631403E-06 | 0.718881E-06 | -0.433607E-04 |
| C | 0.776812E-06 | 0.193463E-05 | -0.343505E-05 |
| D | -0.757451E-07 | -0.183474E-06 | -0.636908E-06 |

TABLE 21

| i | 9 | 12 | 13 |
|---|---|---|---|
| K | -0.002725 | -0.031177 | -0.000002 |
| A | -0.176801E-03 | 0.160253E-03 | 0.263175E-03 |
| B | -0.208501E-05 | 0.244100E-04 | 0.170260E-04 |
| C | -0.182401E-04 | -0.345630E-05 | -0.239111E-05 |
| D | 0.535074E-06 | 0.169326E-06 | 0.117168E-06 |

The surface distance D4 between the front lens group 10 and the rear lens group 20, the surface distance D11 between the negative lens 23 and the rearmost positive lens 25 of the rear lens group 20, and the surface distance D13 between the rear lens group 20 and the parallel glass plate 30 vary according to the zooming position as well as the focusing position of the zoom lens 5 as shown in Table 22.

TABLE 22

| | | D4 | D11 | D13 | βf |
|---|---|---|---|---|---|
| INF | W | 17.17793 | 3.94863 | 1.50038 | 0.6561 |
| | M | 6.31519 | 3.94863 | 5.94543 | 0.4059 |
| | T | 1.49475 | 3.94863 | 11.43942 | 0.0966 |
| NEAR | W | 17.17793 | 3.79391 | 1.65449 | 0.6474 |
| | M | 6.31519 | 3.60520 | 6.28835 | 0.3866 |
| | T | 1.49475 | 3.23652 | 12.15153 | 0.0565 |

According to the sixth example, $ff/fR = 17.7647119346/11.6713919436 \approx 1.52$ $0.0565 \leq \beta f \leq 0.6561$ $r1/r2 = R12/R13$
$= 12.71762/(-207.35833) \approx -0.06$ $d/fW = D11/fW$
$= 3.94863/6.70612978398 \approx 0.59$ Therefore, the sixth example satisfies the conditions (1) to (4).

Aberration curves of the zoom lens 5 of the sixth example in the infinity focusing position at the wide-angle terminal, at the middle focal length position and at the telephoto terminal are shown in FIGS. 37A to 37C, 38A to 38C and 39A to 39C respectively. Aberration curves of the zoom lens 5 of the second example in the near range focusing position at the wide-angle terminal, at the middle focal length position and at the telephoto terminal are shown in FIGS. 40A to 40C, 41A to 41C and 42A to 42C respectively.

Although the present invention has been described with respect to the examples shown in the drawings, the present invention is not to be limited to the above embodiments but, on the contrary, various modifications are possible without departing from the scope of appended claims.

What is claimed is:

1. A zoom lens consisting of a front lens group having a negative power as a whole, and a rear lens group having a positive power as a whole and including a stop therein, arranged in this order from an object side, wherein the front and rear lens groups are moved relative to each other on an optical axis for zooming, whereas only a positive lens placed at a rearmost position of the rear lens group in the order from the object side is moved for focusing, and the zoom lens satisfies the following conditions:

$$0.5 < ff/fR < 5.0$$
$$0.01 < \beta f < 1.00$$
$$-1.0 \leq r1/r2 \leq 0.3$$

wherein fR represents a synthetic focal length of the rear lens group, ff represents a focal length of the rearmost positive lens, βf represents an image magnification of the rearmost positive lens, r1 represents a radius of curvature of an object side surface of the rearmost positive lens, and r2 represents a radius of curvature of an image side surface of the rearmost positive lens.

2. A zoom lens according to claim 1, wherein the zoom lens satisfies the following condition:

$$0.3 \leq d/fW \leq 1.5$$

wherein d represents a surface distance between the rearmost positive lens and a lens placed on the object side of the rearmost positive lens in a position where the zoom lens is focused on infinity, and fW represents a focal length of the zoom lens as a whole at a wide-angle terminal.

3. A zoom lens according to claim 1 or 2, wherein the front lens group includes a negative lens and a positive lens, arranged in this order from the object side, and the negative lens has an aspherical surface.

4. A zoom lens, comprising:
a front lens group having a meniscus negative lens and a positive lens, arranged in this order from an object side, wherein the meniscus negative lens and positive lens are convex on the object side; and
a rear lens group having first and second positive lenses, a negative lens having concave surfaces on opposite sides, and a rearmost positive lens, arranged in this order from an object side, and including a stop therein,
wherein the front and rear lens groups are moved relative to each other on an optical axis for zooming,
wherein only said positive lens located at a rearmost position of the rear lens group in the order from the object side is moved for focusing, and
wherein the zoom lens satisfies the following conditions:

$$0.5 < ff/fR < 5.0$$
$$0.01 < \beta f < 1.00$$
$$-1.0 \leq r1/r2 \leq 0.3$$

where fR represents a synthetic focal length of the rear lens group, ff represents a focal length of the rearmost positive lens, βf represents an image magnification of the rearmost positive lens, r1 represents a radius of curvature of an object side surface of the rearmost positive lens, and r2 represents a radius of curvature of an image side surface of the rearmost positive lens.

5. A zoom lens according to claim 4, wherein the stop is located in between the first and second positive lens of the rear lens group.

6. A zoom lens according to claim 5, wherein the first positive lens is convex on opposite sides, the second positive lens is convex on the object side, and the rearmost positive lens are convex on opposite sides.

7. A zoom lens according to claim 6, wherein the object side surface of the meniscus negative lens, and the opposite side surfaces of the second positive lens of the rear lens group are aspherical.

8. A zoom lens according to claim 5, wherein the first and second positive lenses are convex on the object side, and the rearmost positive lens are convex on opposite sides.

9. A zoom lens according to claim 8, wherein the object side surface of the meniscus negative lens, the opposite side surfaces of the positive lens of the front lens group, and the opposite side surfaces of the first, second and rearmost positive lenses of the rear lens group are aspherical.

10. A zoom lens, comprising:
a front lens group having a meniscus negative lens and a positive lens, arranged in this order from an object side, wherein the meniscus negative lens and positive lens are convex on the object side; and
a rear lens group having a first positive lens, a negative lens having concave surfaces on opposite sides, and a rearmost positive lens, arranged in this order from an object side, and including a stop therein,
wherein the front and rear lens groups are moved relative to each other on an optical axis for zooming,
wherein only said positive lens located at a rearmost position of the rear lens group in the order from the object side is moved for focusing, and
wherein the zoom lens satisfies the following conditions:

$$0.5 < ff/fR < 5.0$$
$$0.01 < \beta f < 1.00$$
$$-1.0 \leq r1/r2 \leq 0.3$$

where fR represents a synthetic focal length of the rear lens group, ff represents a focal length of the rearmost positive lens, βf represents an image magnification of the rearmost positive lens, r1 represents a radius of curvature of an object side surface of the rearmost positive lens, and r2 represents a radius of curvature of an image side surface of the rearmost positive lens.

11. A zoom lens according to claim 10, wherein the stop is located on the object side of the first positive lens of the rear lens group.

12. A zoom lens according to claim 11, wherein the first positive lens and the rearmost positive lens of the rear lens group are convex on opposite sides.

13. A zoom lens according to claim 12, wherein the object side surface of the meniscus negative lens, and the opposite surfaces of the negative lens of the rear lens group are aspherical.

14. A zoom lens according to claim 12, wherein the object side surface of the meniscus negative lens, and the opposite surfaces of the first positive lens of the rear lens group are aspherical.

15. A zoom lens according to claim 11, wherein the first positive lens of the rear lens group is convex on opposite sides, and the rearmost lens is convex on the object side.

16. A zoom lens according to claim 15, wherein the object side surface of the meniscus negative lens, and the opposite surfaces of the first positive lens of the rear lens group are aspherical.

* * * * *